US012333915B2

(12) United States Patent
Lert, Jr. et al.

(10) Patent No.: US 12,333,915 B2
(45) Date of Patent: Jun. 17, 2025

(54) METHODS AND APPARATUS FOR FACILITATING TRANSPORT OF ITEMS BETWEEN A STORE AND A CUSTOMER VIA A CUSTOMER ACCESS PORTAL

(71) Applicant: Symbotic LLC, Wilmington, MA (US)

(72) Inventors: John G. Lert, Jr., Wakefield, MA (US); William Fosnight, Windham, NH (US); Frederick Morgan, North Billerica, MA (US)

(73) Assignee: Symbotic LLC, Wilmington, MA (US)

(*) Notice: Subject to any disclaimer, the term of this patent is extended or adjusted under 35 U.S.C. 154(b) by 0 days.

(21) Appl. No.: 18/268,204

(22) PCT Filed: Dec. 12, 2021

(86) PCT No.: PCT/US2021/064424
§ 371 (c)(1),
(2) Date: Jun. 16, 2023

(87) PCT Pub. No.: WO2022/133353
PCT Pub. Date: Jun. 23, 2022

(65) Prior Publication Data
US 2024/0078861 A1    Mar. 7, 2024

Related U.S. Application Data

(60) Provisional application No. 63/127,762, filed on Dec. 18, 2020.

(51) Int. Cl.
*G07F 7/12*    (2006.01)
*G06Q 30/0601*    (2023.01)
(52) U.S. Cl.
CPC ......... *G07F 7/122* (2013.01); *G06Q 30/0601* (2013.01)

(58) Field of Classification Search
CPC .................. G07F 7/122; G06Q 30/0601
(Continued)

(56) References Cited

U.S. PATENT DOCUMENTS 8,467,897 B2 * 6/2013 Holmes .................. G07F 11/60
700/231
2011/0137457 A1    6/2011 Zini
(Continued)

FOREIGN PATENT DOCUMENTS

WO    2022133353    6/2022

OTHER PUBLICATIONS

PCT; App No. PCT/US2021/064424; International Preliminary Report on Patentability & Written Opinion mailed Jun. 13, 2023; (13 pages).
(Continued)

Primary Examiner — Daniel A Hess
(74) Attorney, Agent, or Firm — Perman & Green, LLP

(57) ABSTRACT

A customer access system includes one or more customer access portals to dispense ordered items to customers and/or receive returned items from customers. A tote transfer system transports one or more totes to carry the ordered items and the returned items to and from the customer access portals. The customer access system may also include a storage structure to temporarily store one or more totes to provide a buffer to reduce or mitigate customer wait times at the customer access portal and/or to more efficiently disposition items by consolidating returned items. The storage structure may further allow "asynchronous dispositioning" of returned items where the retrieval of a returned item from the customer and the dispositioning of the returned item occurs at different times. In some implementations, the
(Continued)

customer access portal includes one or more drawers to exchange of items with a customer in a safe and efficient manner.

19 Claims, 59 Drawing Sheets

(58) Field of Classification Search
USPC .................................................. 235/380, 383
See application file for complete search history.

(56) References Cited

U.S. PATENT DOCUMENTS

| | | |
|---|---|---|
| 2014/0288696 A1 | 9/2014 | Lert |
| 2016/0019633 A1 | 1/2016 | Waddington |
| 2016/0063604 A1 | 3/2016 | Shaffer |
| 2016/0325933 A1 | 11/2016 | Stiernagle |
| 2017/0046793 A1 | 2/2017 | Domey |
| 2017/0260010 A1 | 9/2017 | Bacallao |
| 2017/0313514 A1 | 11/2017 | Lert, Jr. |
| 2018/0134492 A1 | 5/2018 | Lert, Jr. |
| 2018/0150793 A1 | 5/2018 | Lert, Jr. |
| 2018/0194556 A1 | 7/2018 | Lert, Jr. |
| 2018/0247257 A1 | 8/2018 | Lert, Jr. |
| 2018/0305123 A1 | 10/2018 | Lert, Jr. |
| 2018/0341908 A1 | 11/2018 | Lert, Jr. |
| 2019/0047787 A1 | 2/2019 | Fosnight |
| 2019/0270591 A1 | 9/2019 | Lert, Jr. |
| 2020/0065791 A1 | 2/2020 | Patil |
| 2020/0071076 A1 | 3/2020 | Fosnight |
| 2020/0156871 A1 | 5/2020 | Fosnight |
| 2020/0223630 A1 | 7/2020 | Fosnight |
| 2021/0300664 A1 | 9/2021 | Fosnight |
| 2021/0323769 A1 | 10/2021 | Lert, Jr. |
| 2023/0230031 A1 | 7/2023 | Lert, Jr. |

OTHER PUBLICATIONS

PCT; App. No. PCT/US2021/064424; International Search Report mailed May 3, 2022; Docket No. ALRT-048WO01 (5 pages).

* cited by examiner

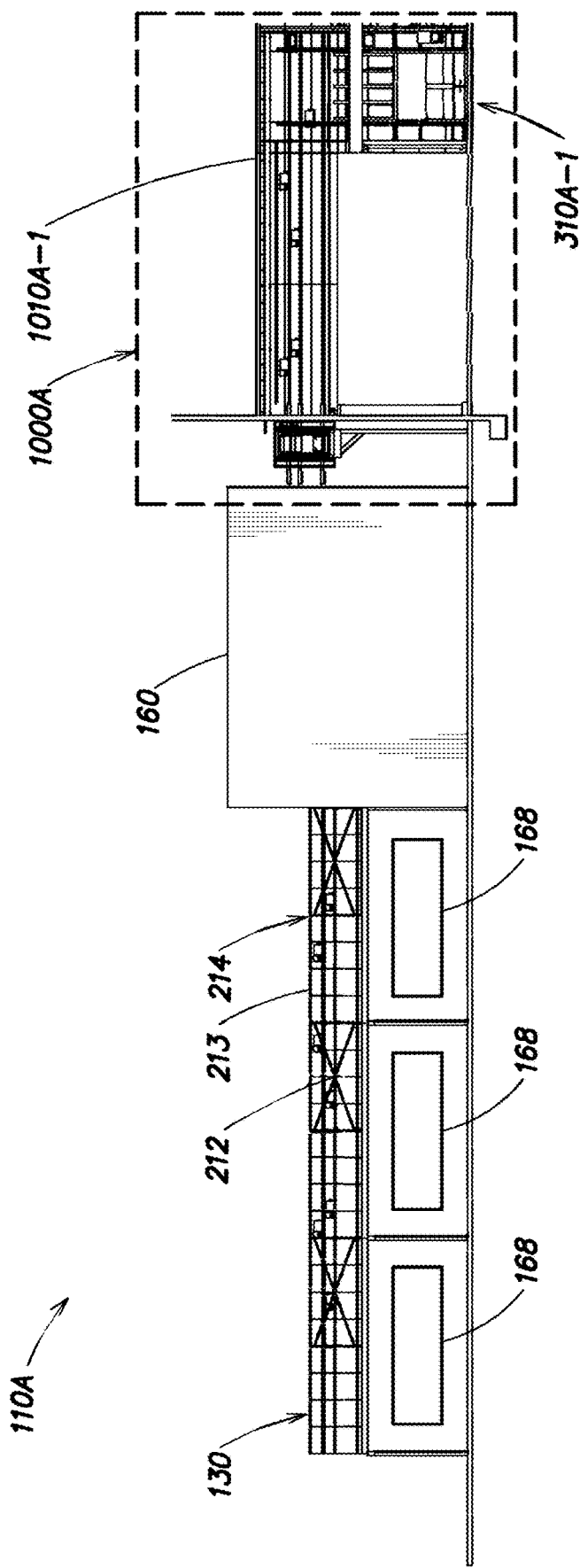

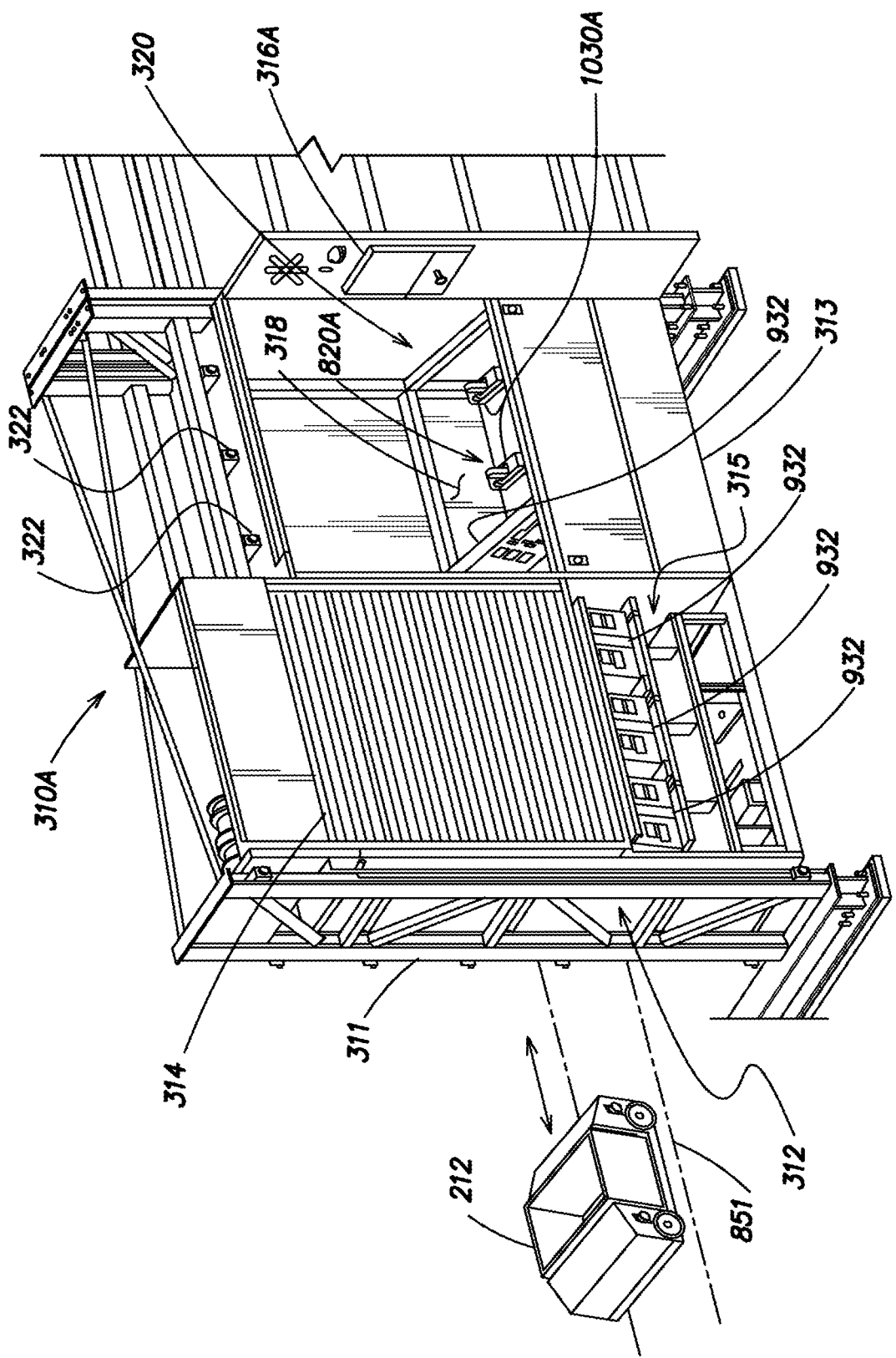

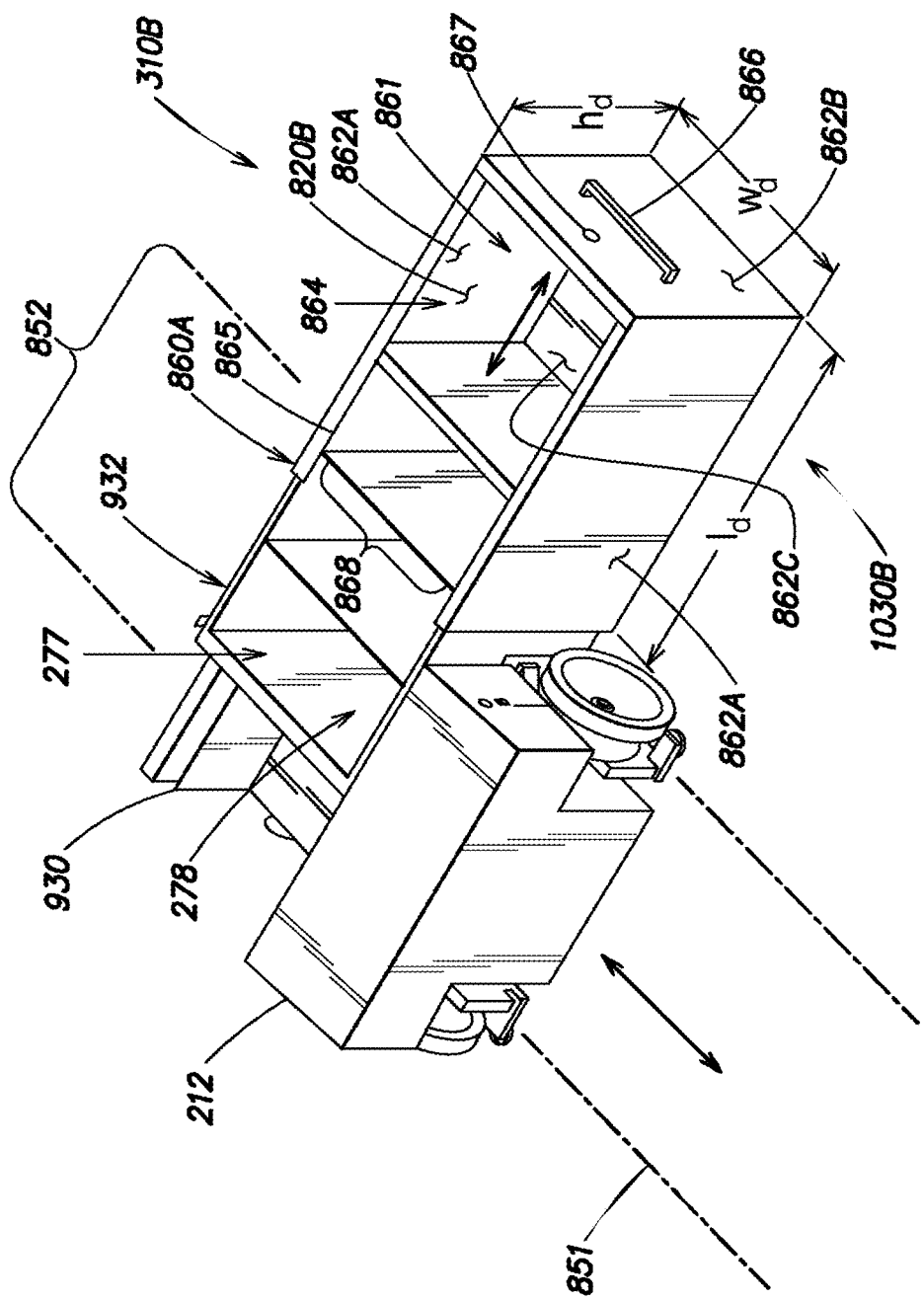

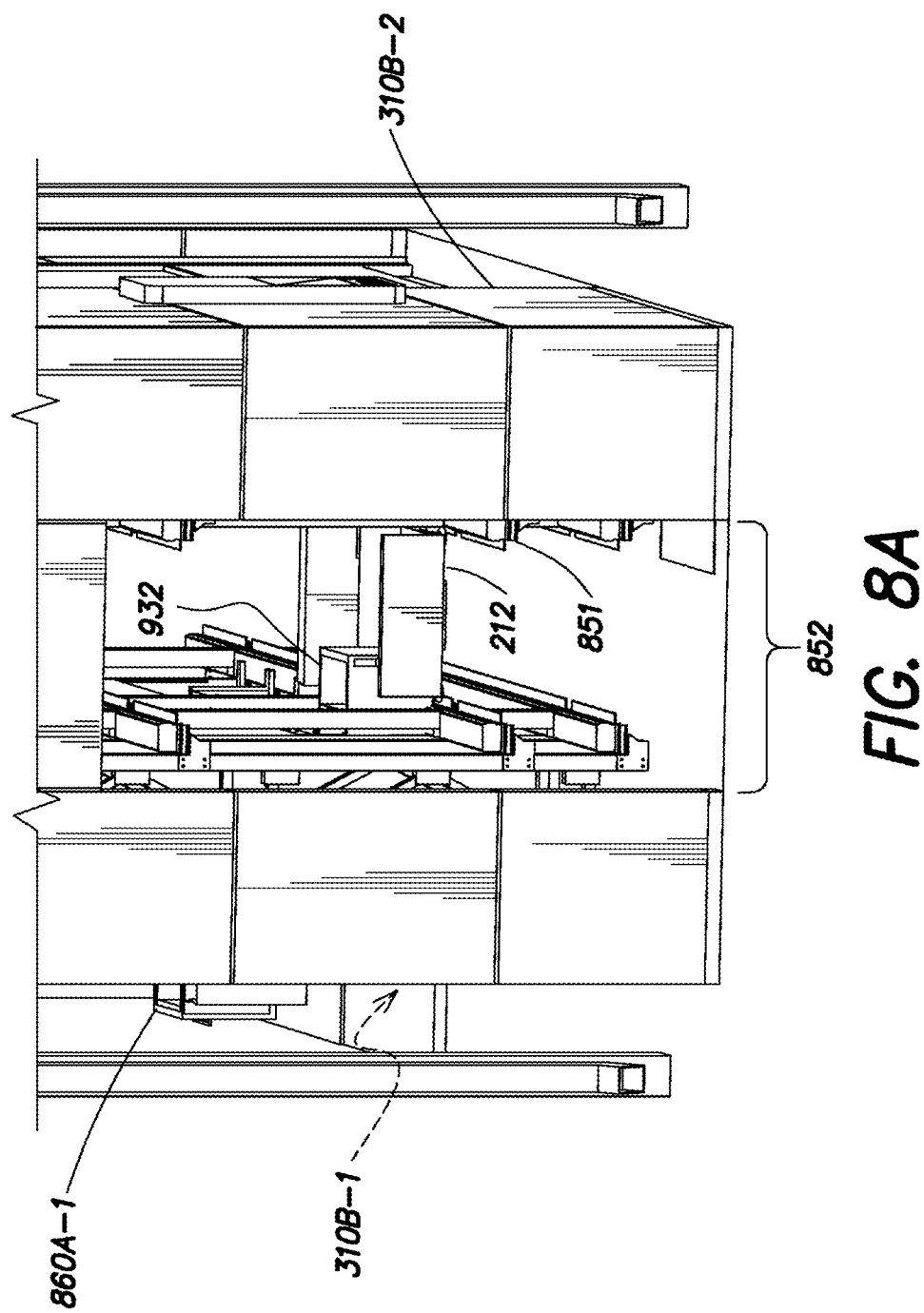

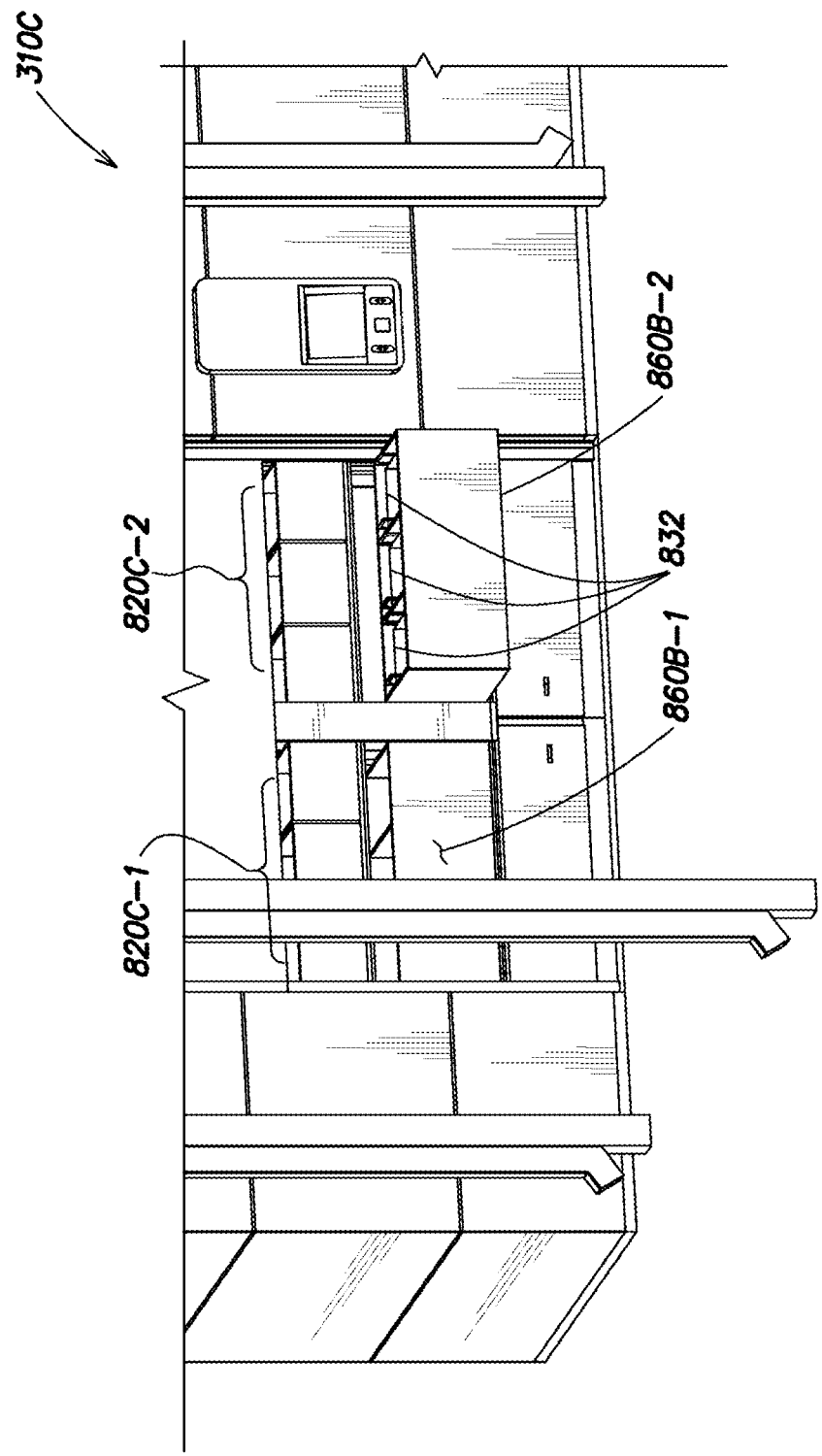

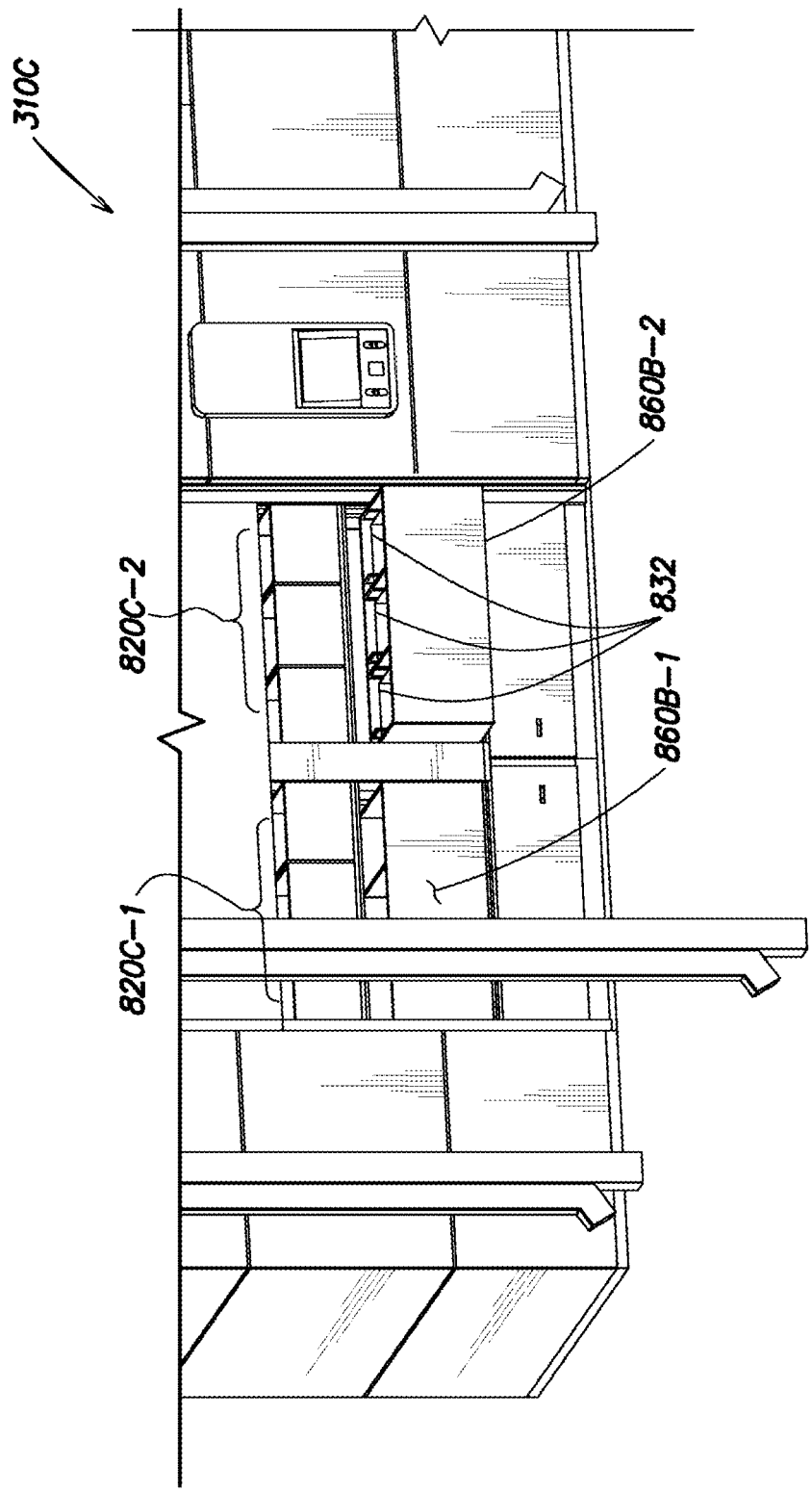

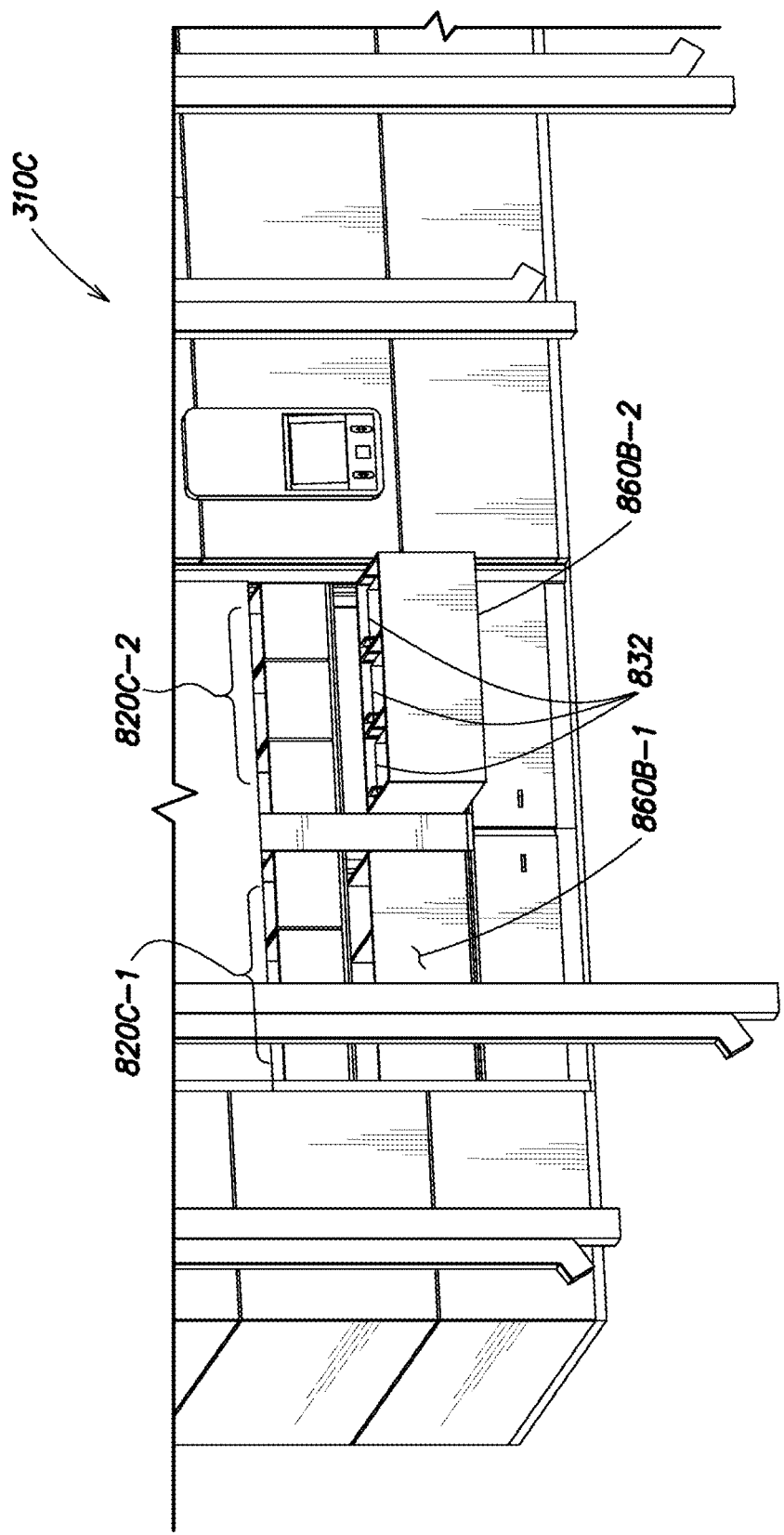

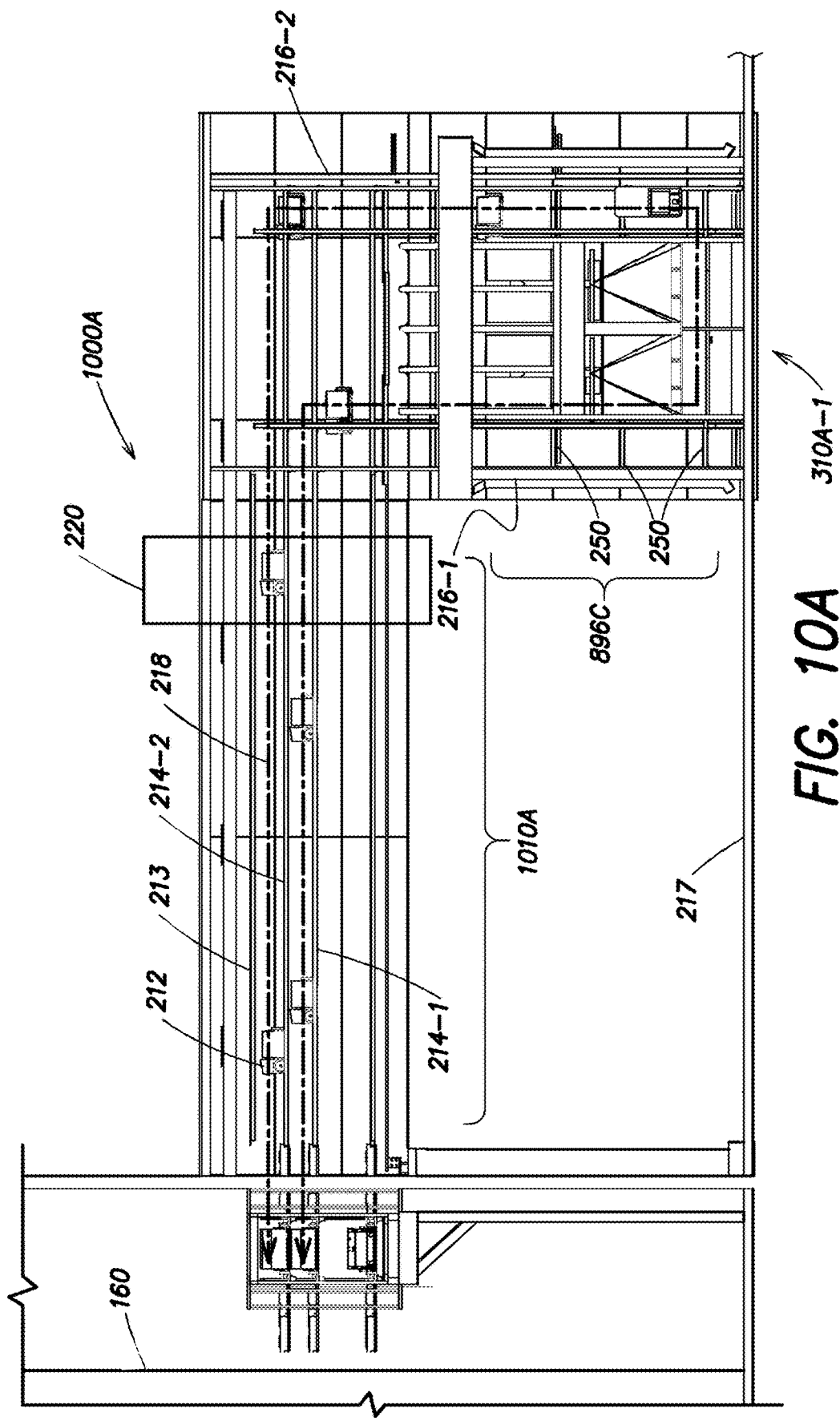

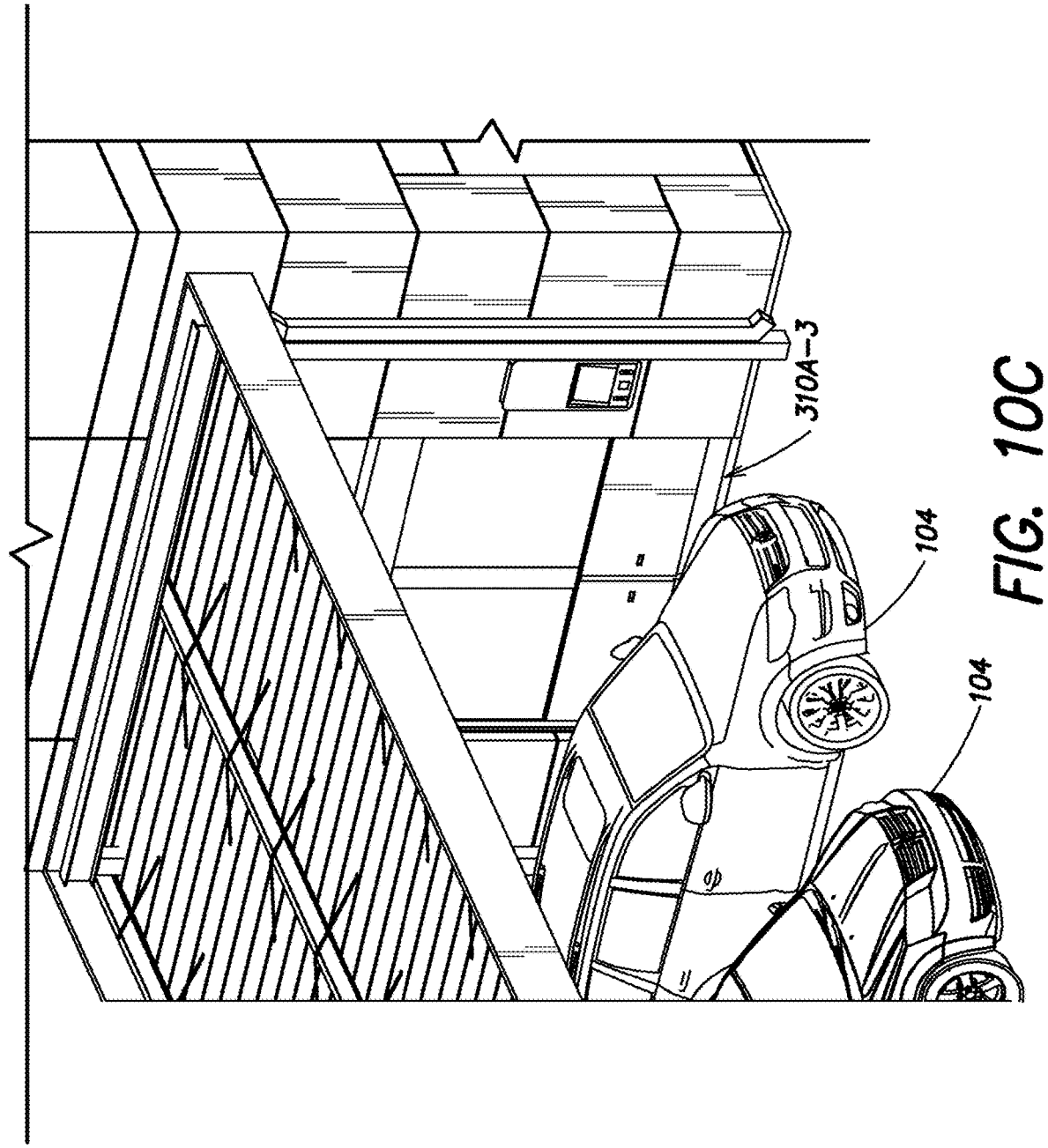

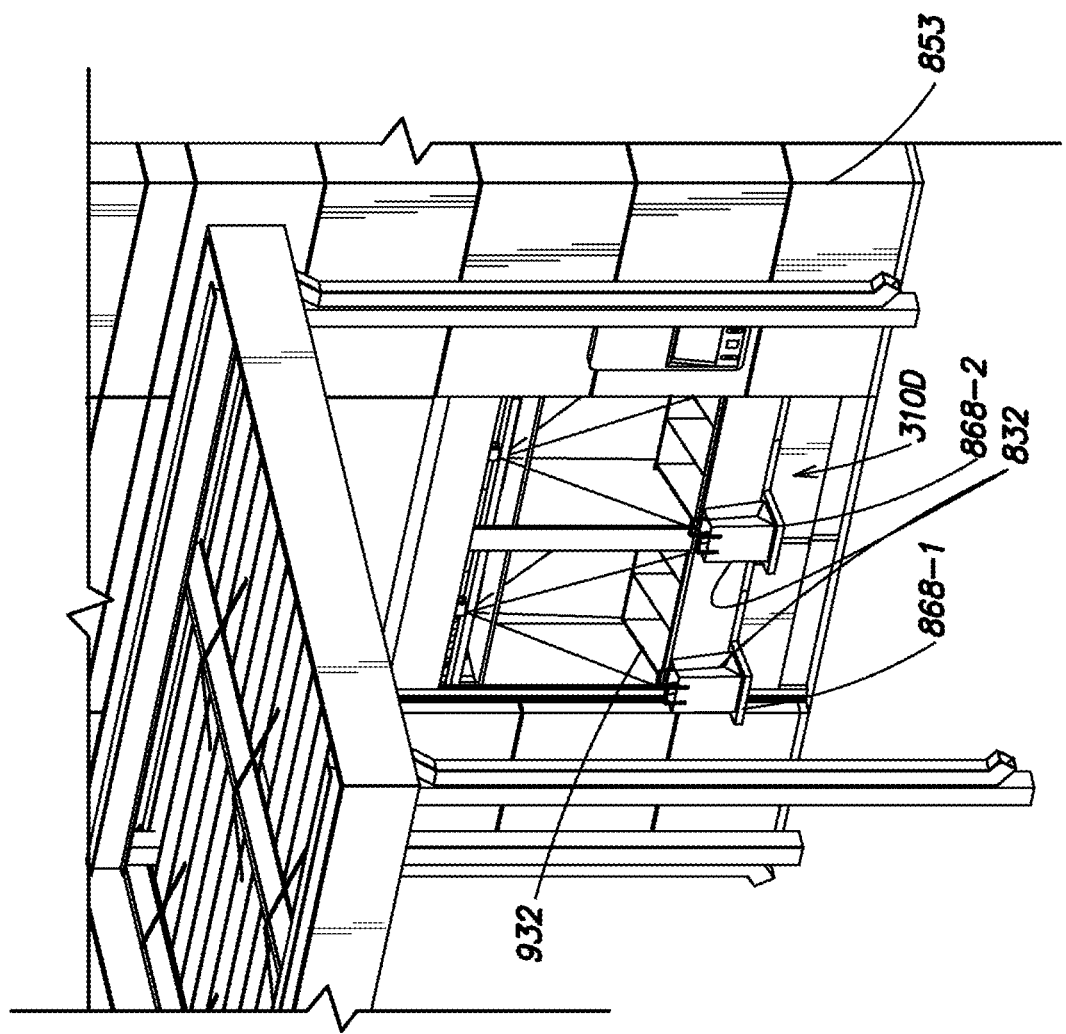

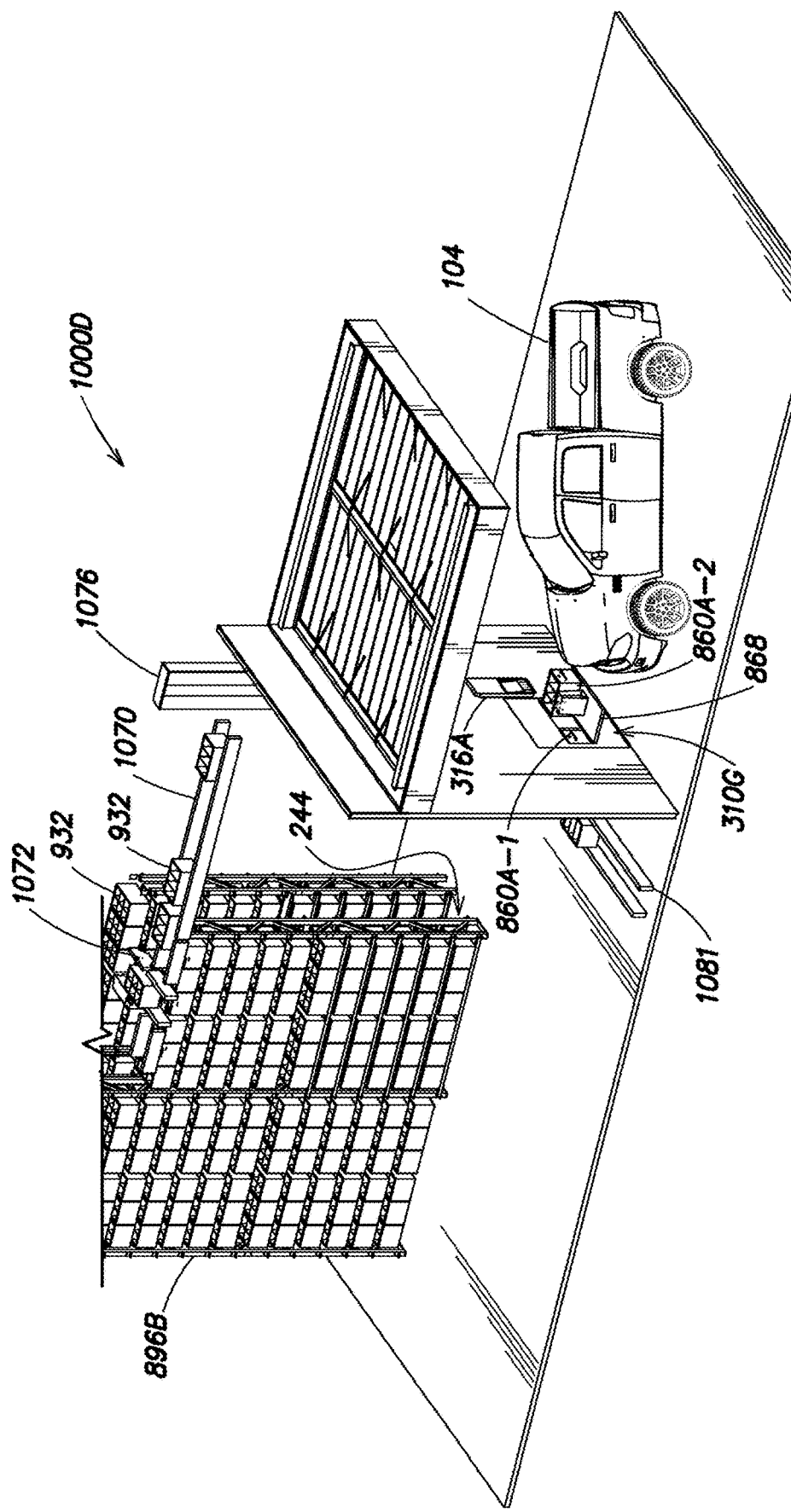

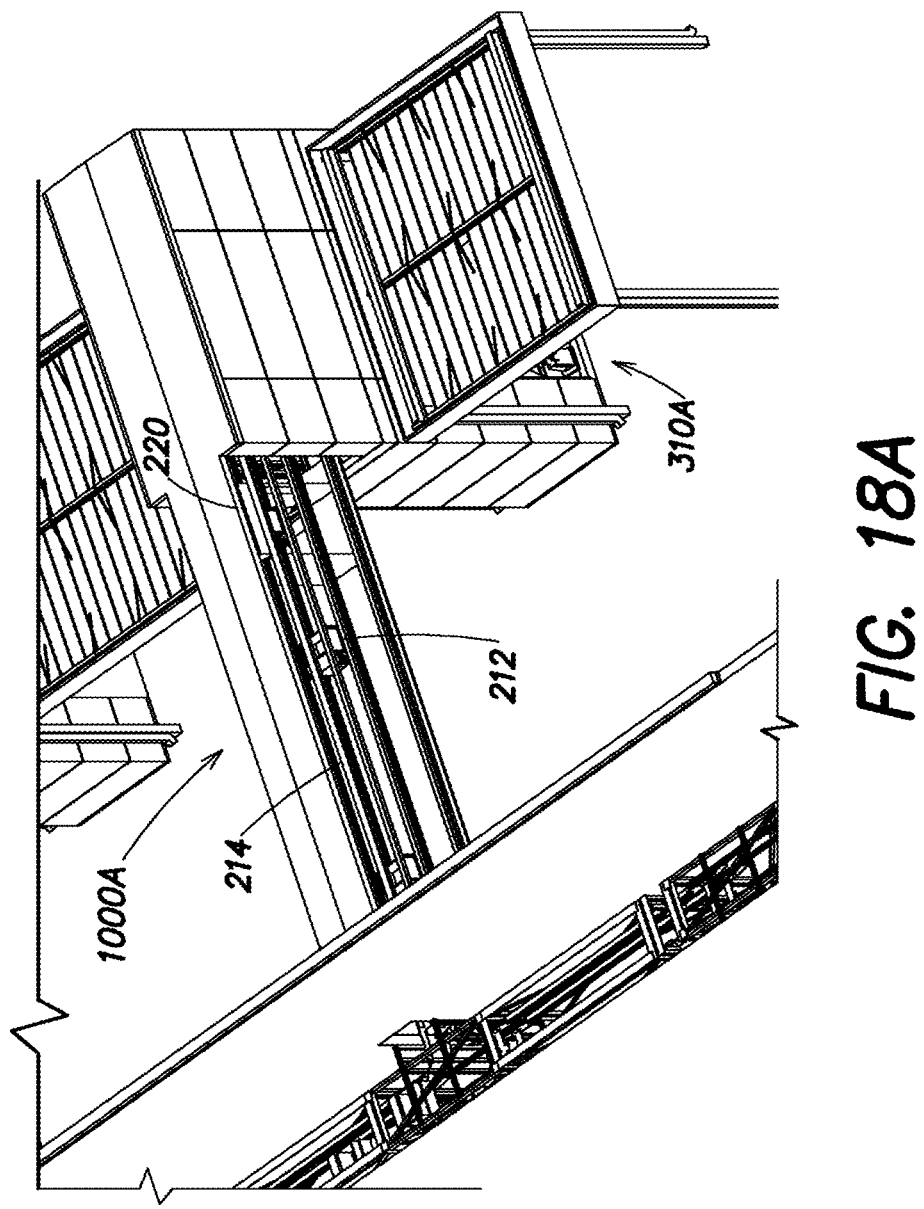

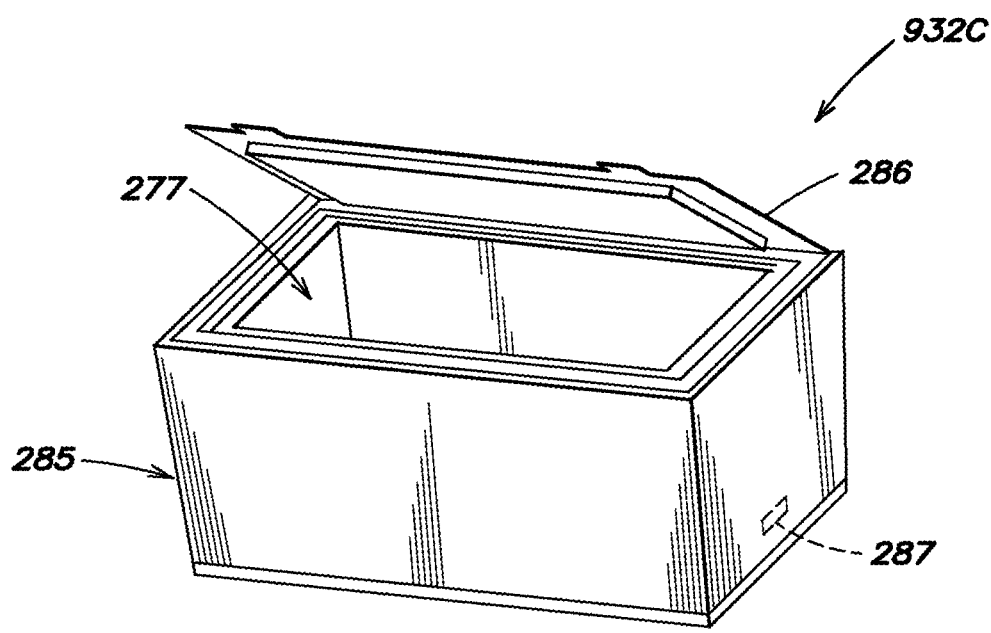
FIG. 20A
Amended

METHODS AND APPARATUS FOR FACILITATING TRANSPORT OF ITEMS BETWEEN A STORE AND A CUSTOMER VIA A CUSTOMER ACCESS PORTAL

CROSS-REFERENCE TO RELATED APPLICATION

This application is a U.S. national stage application of International Application No. PCT/US2021/064424, filed Dec. 20, 2021, designating the United States, which claims a priority benefit to U.S. Provisional Application No. 63/127,762, filed on Dec. 18, 2020, entitled, "MICRO-FULFILLMENT CENTER WITH AUTOMATED DISPENSE AND RETURN USING MOBILE ROBOTS AND METHOD OF OPERATING SAME," each of which is incorporated by reference herein in its entirety.

BACKGROUND

A conventional brick-and-mortar retail store is typically configured in a "self-serve" model where the store generally includes a range of products (also referred to herein as "items" or "goods") that are put on display for customers to browse and select for purchase. When a customer shops at a brick-and-mortar store, they typically drive to the store using a vehicle, enter the store and begin shopping for the desired item(s) for purchase, purchase the item(s) at a checkout counter or kiosk, then exit the store and carry the purchased item(s) to their vehicle. If the customer wants to return an item previously purchased during a prior transaction, they typically have to go to a separate designated counter or desk within the store and wait to interact with a customer service representative from the store. This in-store shopping and/or return experience may be time-consuming and frustrating for the customer, especially in larger retail stores that offer a wider selection of items (e.g., groceries, household goods, appliances and electronics, prescription and/or over-the-counter medicine). For example, respective products offered for sale in larger retail stores are dispersed over a larger floor space and may be difficult to find in the store without assistance, thus increasing the amount of time the customer spends in the store.

In some respects, the above inconveniences experienced by a customer in a conventional brick-and-mortar store has led many retailers (also referred to herein as "store operators") to adopt an "E-commerce" model to provide an option for customers to purchase their products online. In the "E-commerce" model, a customer browses and purchases items using a software application or a website on a computing device (e.g., a desktop computer, a smartphone). Thus, customers may readily place an order for items from their home or other convenient location, which often saves the customer an appreciable amount of time compared to shopping at a brick-and-mortar store. Additionally, retailers that offer an E-commerce option may in some instances offer customers an even wider selection of items for purchase online compared to brick-and-mortar retail stores. Moreover, some retailers operate stores that provide customers with both a brick-and-mortar experience and an E-commerce option (a "hybrid" model); thus, customers may purchase some items online, while selecting other items in the store as they browse displayed products.

Conventionally there are multiple manners in which one or more items purchased in an online order are delivered to the customer. For example, online-only retailers may ship an order directly to the customer. However, this approach often increases the overall cost of an order since the customer is typically required to pay an additional shipping or membership fee or buy additional items so that the total cost of the order meets a specific threshold (e.g., to reduce or avoid a shipping fee). In another example, retailers that support an "E-commerce" model and also have brick-and-mortar stores (i.e., a "hybrid" model) may allow customers to pick up their online order directly at the store without any additional fees (e.g., when the customer goes to the store to select and purchase other items on display at the store).

If a customer wants to return a defective or unwanted item, retailers conventionally provide the customer a couple of options. In one example, if the retailer has a brick-and-mortar store, the customer may return the item(s) directly to the store (e.g., at a customer service desk or kiosk); in some instances, if the retailer operates under a hybrid model and also offers an E-commerce option, the customer may be able to do an in-store return regardless of whether the item was purchased in the store or online. In another example, for purchases from an online-only retailer, the customer may be required to mail an item for return to a location designated by the retailer, or in some instances may be required to mail the item directly back to a manufacturer. In these situations, the customer further may be required to package the item themselves for return (or bring the item to a packaging facility), and they may be provided with a mailing label and/or return confirmation code that needs to be affixed to the package for return.

SUMMARY

The Applicant has recognized and appreciated that the wider adoption of an "E-commerce" model amongst retailers has provided more ways for retailers to advertise and sell items to customers and more options for a customer to browse and purchase items. However, the Applicant has also recognized that various inefficiencies and significant overhead for retailers still exist in the processing and management of purchase and dispensing of items as well as returning unwanted or defective items, particularly at brick-and-mortar stores (whether or not these stores offer an E-commerce option under a hybrid model). These inefficiencies may detrimentally affect the sales of the retailer and the customer's shopping experience.

First, brick-and-mortar stores, including those that offer an E-commerce option, typically have one or more designated areas for customers to checkout or pickup ordered items, and a separate area for customers to return items. More specifically, these stores generally include one or more checkout counters or lanes where customers purchase items obtained from the sales floor, and they may also have one or more designed pickup areas for customers to retrieve online orders. But in addition, there is typically another separate customer service desk or return counter at which customers must return unwanted or defective items. This customer service desk or return counter thus occupies additional space in the store (in some instances at the expense of a larger sales floor area to sell items or a larger inventory area to store more items), and requires the customer to visit multiple different areas of the store if they have one or more items to purchase and/or pickup, and additionally have one or more items to return. Furthermore, the customer service desk or return counter typically requires dedicated staff to run, thus increasing operating costs for the retailer.

With respect to returned items, in many instances these items are processed by the retailer while the customer waits at the customer service desk or return counter to determine how the returned items ultimately should be dispositioned, e.g., whether the item should be restocked in the store's inventory, sent back to the manufacturer, or otherwise disposed (scrapped or trashed). More specifically, brick-and-mortar stores often require workers at the customer service desk or return counter to determine dispositioning of any returned items at the time the customer returns the item(s). The Applicant has recognized and appreciated that this process of "synchronous dispositioning" of a returned item (e.g., while the customer waits at a customer service desk or return counter) leads to longer wait times for the customer and longer lines at the customer service desk or return counter (especially if multiple customers are returning items at the same time). Moreover, some stores combine the functions of a return counter with a more general customer service counter to address other customer needs (e.g., account management, addressing incorrect orders, checking on inventory availability) while maintaining the same level of customer service staff, which may further exacerbate the long customer wait times for returning items. In view of the foregoing, as discussed in greater detail below, some of the inventive implementations disclosed herein relate to the asynchronous dispositioning of returned items to significantly mitigate (or virtually eliminate) customer wait times, improve overall customer experience, and improve efficiency for retailers in connection with customer returns (e.g., by significantly reducing staffing requirements and thereby mitigating staffing shortages).

For the respective processes of returning unwanted or defective items as well as purchase and/or pickup of ordered items, brick-and-mortar retail stores, whether or not they have an E-commerce option, are labor-intensive and expensive to operate due, in part, to the need to employ staff (also referred to herein as "store employees" and "workers"). This staff performs various functions including, but not limited to: intake of products from upstream suppliers (distribution centers) and stocking products in store inventory; processing customer orders, checkouts and/or pickups; processing returned items; and generally assisting customers in the store. For example, orders that are placed online typically require a worker to pick items from the sales floor or inventory to ultimately be dispensed to/picked up by the customer. Some retail stores may further offer a curbside pickup service to customers where the customer may drive to the store, park their vehicle in a designated area outside the store, and await a worker to bring an order to the customer. Although these options may be convenient for the customer, the added labor costs may appreciably reduce the profit made on each order for retailers. In another example, with respect to returned items, workers are often required to manually place returned items back into inventory or otherwise manually disposition the returned items (e.g., scrap or trash, return to manufacturer).

Previously, the Applicant has disclosed significant innovative improvements to retail stores, including those with an E-commerce option, to effectively automate certain portions of the store and thereby increase efficiency, reduce some aspects of overhead for the retailer, and improve customer experience (e.g., by significantly reducing the time it takes to fulfill a customer's order). Multiple published patent applications and issued patents covering these improvements are specifically incorporated by reference below. In one illustrative implementation, the Applicant has designed and implemented an Automated Storage and Retrieval System (ASRS) (also referred to herein as a goods to picker (G2P) system) to significantly automate order picking, particularly in an E-commerce retail model for various goods, such as groceries (i.e., in which a customer orders groceries online). As part of these automation-oriented solutions in a retail environment, the Applicant has devoted particular attention to addressing challenges associated with temperature-sensitive items, such as chilled or frozen food items which may spoil if stored at room temperature for prolonged periods of time.

In an exemplary ASRS previously designed and implemented by the Applicant, inventory for the store is kept in multi-level storage rack structures disposed in different temperature zones (to accommodate chilled and frozen food items, as well as other items that may be stored at room temperature). Respective products (e.g., having different stock keeping units, or SKUs) are stored in the multi-level storage rack structures in "totes," which are five-sided containers in the shape of a rectangular solid with an open top and one or more interior storage compartments. Multiple mobile robots traverse the storage rack structures in different temperature zones and readily access and transport products totes to one or more workstations, where respective items are picked to fulfill a given customer order. Each mobile robot is uniquely capable of navigating and traversing a given multi-level storage rack structure in all three dimensions (i.e., on any of multiple vertical levels, and along the horizontal width and length of the structure) so as to access any tote in a given storage rack structure; furthermore, each robot is specifically designed for effective and reliable operation across all of the different temperature zones occupied by respective storage rack structures. These automation-oriented improvements to retail stores have wide applicability over a range of diverse products (whether or not different temperature zones are required) and throughout different stages of a given supply chain.

As part of their automation-oriented solutions in a retail environment, in addition to the ASRS described above the Applicant also has contemplated and disclosed various innovative improvements particularly in connection with dispensing and pickup of customer orders (that may in some instances include chilled or frozen food items) via an automated customer access portal in the ASRS and coupled to the retail store. Examples of these improvements relating to an automated customer access portal are described in U.S. Patent Publication 2020/0223630 published Jul. 16, 2020, having U.S. Ser. No. 16/742,119, filed on Jan. 14, 2020, and entitled "System Having Workstation With Tote Retention and Release Mechanism", which publication is incorporated by reference herein in its entirety. Various designs of such a customer access portal as disclosed in this publication facilitate automated loading of picked items for a customer order into the portal (e.g., via a mobile robot) for easy access by the customer (e.g., the customer pulls right up to the portal with their vehicle and does not have to go into the store), while ensuring customer safety (e.g., by limiting customer access to automated portions of the portal).

The present disclosure relates generally to further innovative automation-oriented improvements associated with dispensing and pickup of customer orders via an automated customer access portal, with additional focus on facilitating the return of previously purchased products, as noted above. By providing for both dispensing/pickup of customer orders as well as effective return of one or more products, the improved customer access portal and associated methods of use and operation disclosed herein provide a convenient unified solution that enhances the customer's overall experience and process efficiency, and in some instances reduces labor requirements for the retailer as well.

More specifically, in some example implementations described in greater detail below, the Applicant discloses particular improvements to a process of returning one or more products via a customer access portal by employing "asynchronous dispositioning" of returned products. With asynchronous dispositioning, a customer may quickly, easily and safely return a product at a customer access portal (e.g., with a scan of a product bar code and identification of a previous order number or a credit card used to purchase the product), and the product is then transported (e.g., via a mobile robot) to a returned item storage area where it is temporarily stored and dispositioned at a later time. By providing a returned item storage area that is isolated from other inventory in the store area, and decoupling dispositioning of the returned product from the customer's return of the product itself, any customer waiting period or other customer burden associated with a product return is significantly reduced, if not virtually eliminated. Furthermore, by providing a returned item storage area that allows for the consolidation of multiple returned products (from the same or different customers) over time and then later dispositioning once multiple products are accumulated (rather than dispositioning each returned product one at a time), the returned item storage area serves as an effective buffer to flexibly accommodate significant changes in customer return volume over the course of a given time period and thereby increase efficiency of the retailer's operations.

In other inventive implementations disclosed herein, the Applicant addresses particular challenges relating to higher customer volume or "peak hours" where, for example, many customers may arrive at a given customer access portal at or around the same time to pick up ordered items and/or return one or more items. Various innovative solutions described herein address the efficient staging and transport of picked orders in an automated retail environment, including grocery orders that may contain chilled and/or frozen food items, to accommodate significant fluctuations in customer volume at a given customer access portal. In one example implementation, totes containing picked items for respective orders are stored in one or more vertical racks that may be flexibly transported between an Automated Storage and Retrieval System (ASRS) (e.g., via one or more mobile robots) to one or more staging areas proximate to one or more customer access portals. The "pre-loaded" vertical racks of order totes serve as an effective buffer to flexibly accommodate significant changes in customer pickup volume over the course of a given time period. The totes are then effectively loaded into a given customer access portal for customer pickup, and any returned products may be readily transported from the customer access portal (e.g., via one or more mobile robots) to one or more vertical racks (e.g., located in a returned item storage area) to significantly reduce or mitigate customer wait times and thereby improve customer experience in a return process. In some examples, totes stored in vertical racks may be transferred to or from a customer access portal via an automated tote transfer mechanism. In other examples, one or more chilled totes (e.g., totes that preserve reduced chilled/frozen temperatures inside the tote for extended periods of time) may be used, alone or in combination with one or more vertical racks, to facilitate effective and safe dispensing of chilled or frozen food items over periods of varying customer pickup volume.

In yet other inventive implementations disclosed herein, the Applicant provides alternative designs for a customer access portal that include multiple drawers, and in some cases integrated shelving, to significantly facilitate customer transport of dispensed items between the portal and a customer's vehicle. In some examples, totes containing items from a customer order are automatically loaded into the portal (e.g., via mobile robots), respective drawers of a given portal are automatically provisioned with bags, the contents of the totes (i.e., ordered items) are automatically dispensed into the bags in the drawers (e.g., via hopper doors on the bottoms of the totes), and the drawers are made accessible to the customer for easy transport of the bags from the drawers to the customer's vehicle. In yet another example, totes containing items from a customer order are automatically loaded directly into corresponding drawers of the portal to mitigate any provisioning of bags; instead, in this example, a customer may provide their own bag, which may be conveniently placed on a shelf integrated with the portal and disposed proximate to the drawers, and which may be filled by the customer directly from the drawer to transport dispensed order items to the customer's vehicle.

This application incorporates by reference the entirety of each of the following U.S. patent publications: U.S. Publication No. 2014/0288696 published Sep. 25, 2014, having U.S. application Ser. No. 14/213,187, filed on Mar. 14, 2014, and entitled "Automated system for transporting payloads"; U.S. Patent Publication No. 2017/0313514 published Nov. 2, 2017, having U.S. application Ser. No. 15/591,956, filed on May 10, 2017, and entitled "Order fulfillment system"; U.S. Patent Publication No. 2019/0270591 published Sep. 5, 2019, having U.S. application Ser. No. 16/419,910, filed on May 22, 2019, and entitled "Order fulfillment system"; U.S. Patent Publication No. 2018/0134492 published May 17, 2018, having U.S. application Ser. No. 15/816,832, filed on Nov. 17, 2017, and entitled "Automated-service retail system and method"; U.S. Patent Publication No. 2018/0194556 published Jul. 12, 2018, having U.S. application Ser. No. 15/867,373, filed on Jan. 10, 2018, and entitled "Interchangeable automated mobile robots with a plurality of operating modes configuring a plurality of different robot task capabilities"; U.S. Patent Publication No. 2018/0150793 published May 31, 2018, having U.S. application Ser. No. 15/826,045, filed on Nov. 29, 2017, and entitled "Automated retail supply chain and inventory management system"; U.S. Patent Publication No. 2018/0305123 published Oct. 25, 2018, having U.S. application Ser. No. 15/956,346, filed on Apr. 18, 2018, and entitled "Picking workstation with mobile robots & machine vision verification of each transfers performed by human operators"; U.S. Patent Publication No. 2018/0247257 published Aug. 30, 2018, having U.S. application Ser. No. 15/903,993, filed on Feb. 23, 2018, and entitled "Inventory management system and method"; U.S. Patent Publication No. 2018/0341908 published Nov. 29, 2018, having U.S. application Ser. No. 15/987,736, filed on May 23, 2018, and entitled "Fully automated self-service store"; U.S. Patent Publication No. 2019/0047787 published Feb. 14, 2019, having U.S. application Ser. No. 16/058,065, filed on Aug. 8, 2018, and entitled "Universal gripper for tote and sub-tote transport"; U.S. Patent Publication No. 2020/071076 published Mar. 5, 2020, having U.S. application Ser. No. 16/554,512, filed on Aug. 28, 2019, and entitled "Tote handling for chilled or frozen goods"; U.S. Patent Publication No. 2020/0156871 published May 21, 2020, having U.S. application Ser. No. 16/676,732, filed on Nov. 7, 2019, and entitled "System having robotic workstation"; U. S. Patent Publication No. 2020/0223630 published Jul. 16, 2020, having U.S. application Ser. No. 16/742,119, filed on Jan. 14, 2020, and entitled "System having workstation with tote retention and release mechanism"; U.S. Patent Publication No. 2021/0300664 published Sep. 30, 2021, having U.S. application Ser. No. 16/831,468, filed on Mar. 26, 2020, and entitled "Tote handling for chilled or frozen goods"; U.S. Provisional Application Ser. No. 63/013,504, filed on Apr. 21, 2020, and entitled "Transport Rack Cartridge"; and U.S. Provisional Application Ser. No. 63/067,759, filed on Aug. 19, 202, and entitled "High Density Micro Fulfillment Center "HD-MFC" with Nightly G2P Storage Batch Pick Replenishment from Store Floor and Method of Operating Same".

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 3C shows a front view of the store of FIG. 3A.

FIG. 6A shows a perspective view of an example customer access portal with an interior safety door and an external customer access portal door according to various inventive implementations of the present application.

FIG. 7 shows a perspective view of an example robot and a tote being transported between the robot and a drawer according to various inventive implementations of the present application.

FIG. 8A shows an interior perspective view of an example customer access portal that includes the robot and the drawer of FIG. 7 according to various inventive implementations of the present application.

FIG. 9C shows the exterior perspective view of the customer access portal of FIG. 9B where multiple bags are loaded into the drawer.

FIG. 9D shows the exterior perspective view of the customer access portal of FIG. 9C where the drawer is in the process of moving from the open position to the closed position.

FIG. 9F shows the exterior perspective view of the customer access portal of FIG. 9E where the drawer is moved to the open position for the customer to retrieve the bags with the items.

FIG. 10A shows a front view of an example customer access system with a tote transfer system that includes multiple rails to support one or more bots to transport totes to and from a customer access portal according to various inventive implementations of the present application.

FIG. 10C shows a perspective view of the customer access portal coupled to the tote transfer system of FIG. 10A.

FIG. 11 shows a perspective view of another example customer access portal with a shelf coupled to the tote transfer system of FIG. 10A.

FIG. 16A shows an exterior perspective view of another example customer access system with a tote transfer system that transports totes to and from a customer access portal via a conveyor system according to various inventive implementations of the present application. The conveyor system includes a rotary indexer to transfer totes from a storage structure to the conveyor system.

FIG. 18A shows a perspective view of the tote transfer system of FIG. 10A with a decontamination module according to various inventive implementations of the present application.

FIG. 20A shows a perspective view of an example tote configured to maintain items at or below a chilled temperature or a frozen temperature according to various inventive implementations of the present application.

DETAILED DESCRIPTION

Figure 1A:
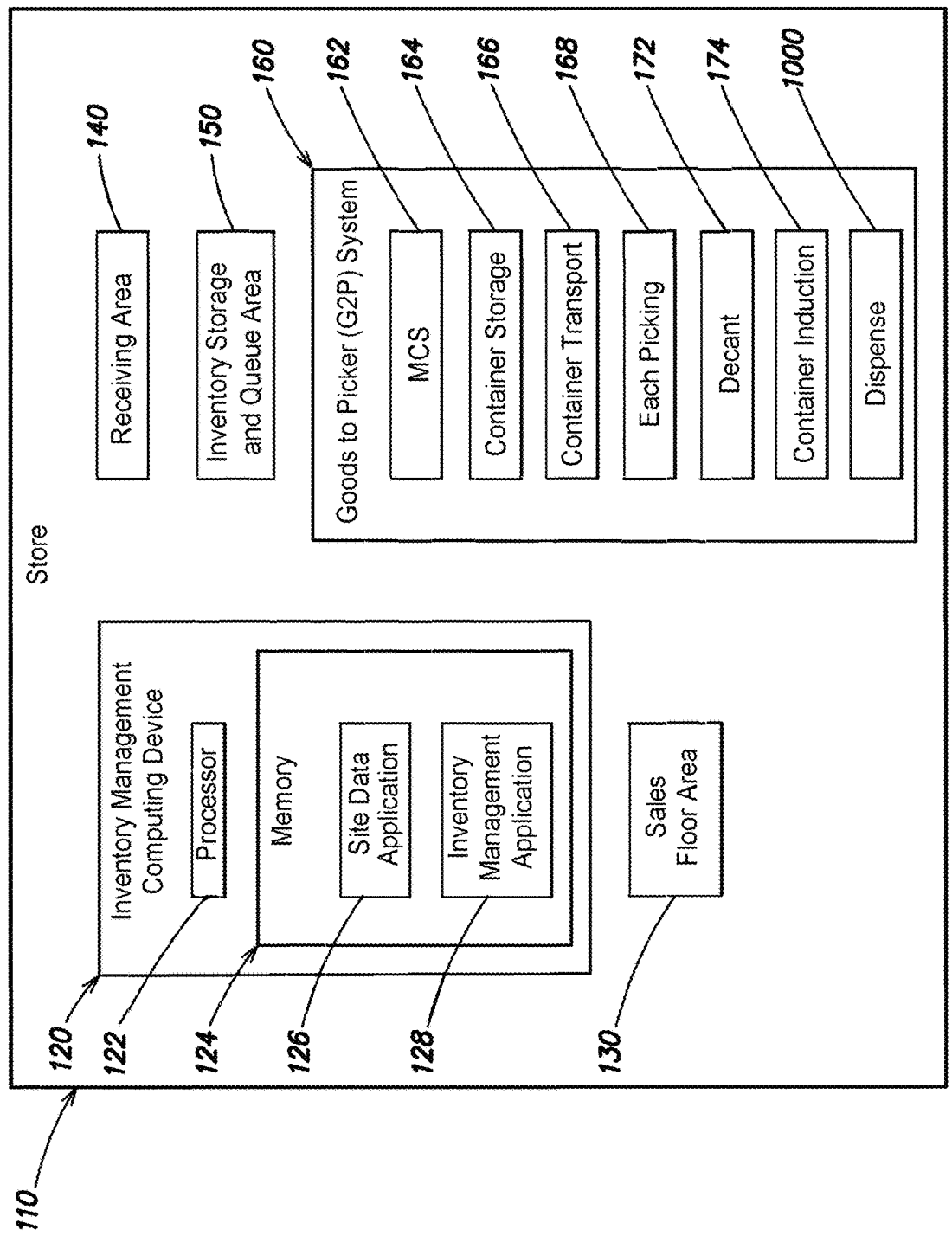
FIG. 1A shows a block diagram of an example store according to various inventive implementations of the present application.

Following below are more detailed descriptions of various concepts related to, and implementations of, a customer access system (also referred to as an "automated dispense portal configuration") with at least one customer access portal to dispense one or more items to a customer for pickup and/or retrieve one or more items from a customer for return. Various methods of using the customer access portal system to facilitate the transport and processing of one or more items for dispensing and return are also disclosed herein. It should be appreciated that various concepts introduced above and discussed in greater detail below may be implemented in multiple ways. Examples of specific implementations and applications are provided primarily for illustrative purposes so as to enable those skilled in the art to practice the implementations and alternatives apparent to those skilled in the art.

The figures and example implementations described below are not meant to limit the scope of the present implementations to a single embodiment. Other implementations are possible by way of interchange of some or all of the described or illustrated elements. Moreover, where certain elements of the disclosed example implementations may be partially or fully implemented using known components, in some instances only those portions of such known components that are necessary for an understanding of the present implementations are described, and detailed descriptions of other portions of such known components are omitted so as not to obscure the present implementations.

In the discussion below, various examples of inventive customer access systems are provided, wherein a given example or set of examples showcases one or more particular features of a customer access portal, a tote transfer system with a rack, a conveyor, rails, and/or one or more robots, a storage structure, a workstation, an inventory system, and/or a tote. It should be appreciated that one or more features discussed in connection with a given example of a customer access system may be employed in other examples of customer access systems according to the present disclosure, such that the various features disclosed herein may be readily combined in a given customer access system according to the present disclosure (provided that respective features are not mutually inconsistent).

1. An Example Store with a Customer Access Portal

The various inventive implementations of customer access systems and customer access portals disclosed herein may generally be deployed in various settings where customers travel to a physical location to purchase, pick up, and/or return one or items. Examples of such settings include, but not limited to, a store, a micro-fulfillment center (MFC), and a full micro-fulfillment center (full MFC). A MFC is an automated storage facility that stores various stock items oftentimes in different temperature zones and provides automated picking of items to fulfill orders placed via an E-commerce model. In an MFC, ordered items are typically packed by workers and manually delivered to customers. MFC's are often deployed as standalone facilities (e.g., a warehouse, a dark store) or in combination with a traditional retail store. For purposes of the present disclosure, a full MFC includes the same functions as the MFC and additionally provides consolidation of items picked from a sales floor area of a traditional retail store, storage of fulfilled orders in different temperature zones, and/or provides automated mechanisms to dispense orders directly to customers.

Figure 1B:
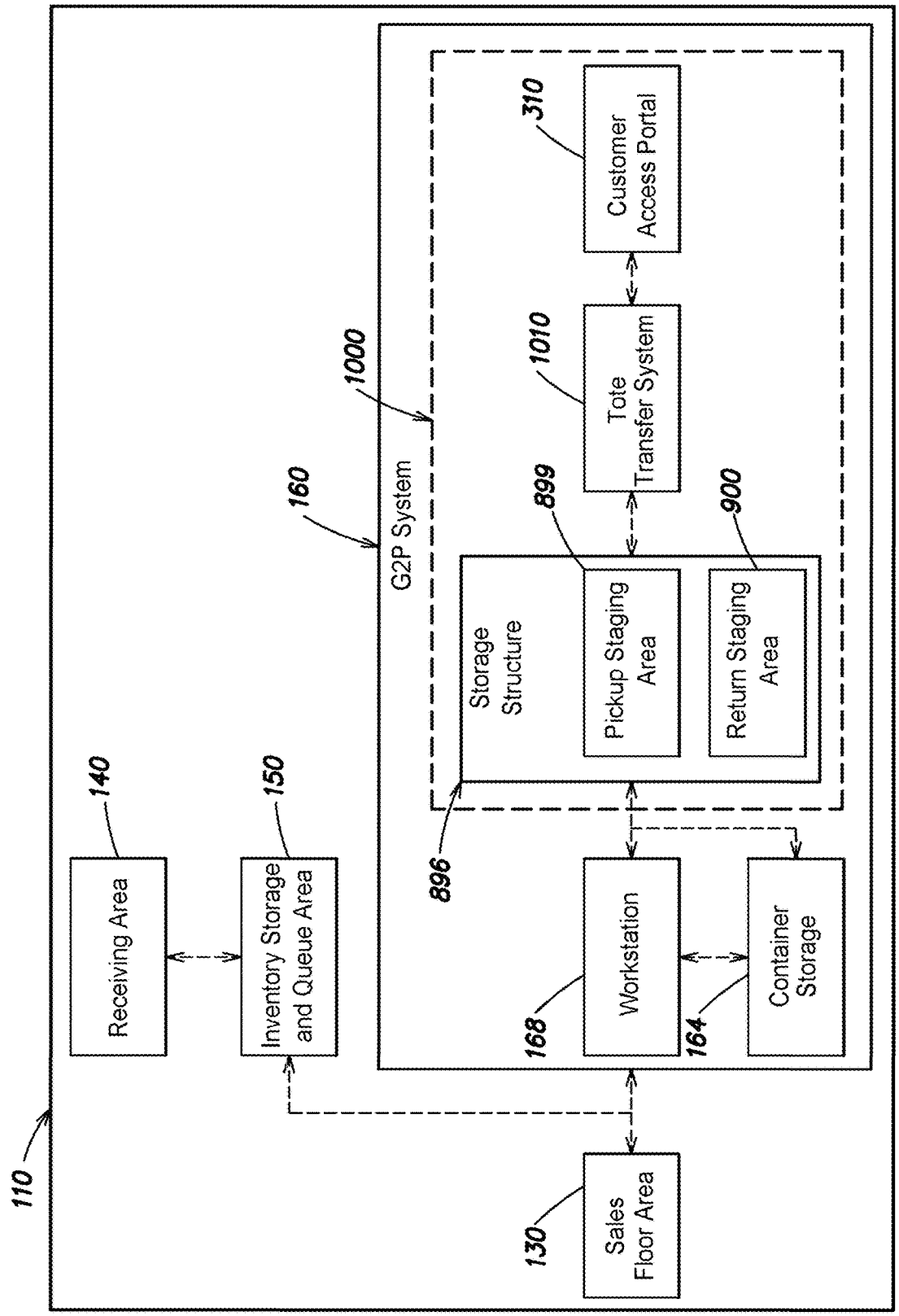
FIG. 1B shows a block diagram of a customer access system in the store of FIG. 1A.

FIG. 1A shows a block diagram of a store 110 that supports both a traditional self-serve model and an E-commerce option ("hybrid" model) for customers to browse, purchase, and return items. FIG. 1B shows another block diagram of the various components in a customer access system 1000 (also referred to herein as a "dispense module 1000" or an "automated dispense portion 1000") associated with the store 110. As shown, the store 110 includes a sales floor area 130 where customers may browse and manually pick items for purchase as part of the self-serve model. Additionally, the store 110 includes a goods to picker (G2P) system 160 (also referred to herein as a "Automated Storage and Retrieval System (ASRS) 160") to automate order picking, dispensing, and retrieval of items as part of the E-commerce option. The store 110 further includes a receiving area 140 to receive items from another location (e.g., a distribution center) to resupply the store 110, and an inventory storage and queue area 150 to stage new inventory provided from the receiving area 140 for transport to the sales floor area 130 and/or the G2P system 160.

The G2P system 160 includes container storage 164 to store and stock various items for online orders and/or to restock items on the sales floor area 130. The G2P system 160 also may include one or more workstations 168 (also referred to herein as an "each picking module 168") to pick one or more items to fulfill a customer order. The workstations 168 in the G2P system 160 may be human-operated or automated using a robotic picker. In general, the workstations 168 include static workstations (SWS) to facilitate the induction of totes in the G2P system 160 (e.g., a tote carrying an item picked from the sales floor area 130) or removal of totes from the G2P system 160 (e.g., return items being removed for disposal or shipment back to a manufacturer or distribution center). The workstations 168 also include dynamic workstations (DWS), which are used to pick and create orders by transferring items from one tote to another tote (i.e., no totes are inducted or removed at a DWS).

A customer of the store 110 may browse and select items using a software application or a website on a computing device, such as a computer (e.g., a desktop computer, a laptop computer) or a personal mobile device (e.g., a tablet, a cellular phone, a smartphone). When the customer places an order for the items, the order is fulfilled automatically by the G2P system 160 of the store 110. Specifically, the workstation(s) of the G2P system 160 may pick items in the order from the container storage 164. In some implementations, the G2P system 160 may also obtain one or more of the items in the order from the sales floor area 130 (e.g., via a worker) and subsequently combine these items with the items from the container storage 164 via the workstation 168. In this manner, the G2P system 160 may appreciably save time for the customer by delegating the task of picking items for the order to a worker and/or an automated system in the sales floor area 130. Once the customer's order is prepared, the customer may then travel to the store 110 to pick up or take delivery of the order via, for example, the customer access system 1000.

The store 110 may generally provide customers a wide selection of items for purchase including, but not limited to, groceries, home furnishings, consumer electronics, appliances, and prescription and/or over-the-counter medicine. Additionally, the store 110 may also accommodate temperature-sensitive items that require storage at different temperatures, particularly items stored at chilled temperatures and frozen temperatures. The various inventive implementations of the store 110, the G2P system 160, and the customer access system 1000 described herein are especially tailored to support the storage, processing, and handling of grocery items. Grocery items typically present several challenges to retailers due to a combination of a short shelf life and items that are sensitive to temperature. For example, chilled or frozen food items may readily spoil if stored at room temperature for extended periods of time. Grocery items may generally include any consumable items that are typically sold in traditional grocery stores including, but not limited to, food items (e.g., produce, dairy products, meats, seafood, prepared foods, frozen foods, deli foods), drinks (e.g., alcohol, sodas, water), cooking supplies and condiments (e.g., baking supplies, spices, cooking oils), household supplies (e.g., cleaning supplies, office supplies, laundry supplies), and personal care items (e.g., soaps, toothpaste, toothbrush).

As noted above, the various items processed in the G2P system 160 may be stored and transported in one or more totes (also referred to herein as a "container"), which are generally five-sided containers in the shape of a rectangular solid with an open top portion and one or more interior storage compartments (see, for example, the totes 932A-932C shown in FIGS. 19A-20B). The totes may be used to store one or more stock items (i.e., a "product tote"), in which a given tote stores at least one corresponding product with a unique stock keeping unit (SKU); multiple such product totes are stored in the container storage 164 of the G2P system 160. In some implementations, the product tote may be configured to contain multiple products with different SKUs via one or more sub-totes or dividers. Other types of totes employed in the system may contain one or more items for a customer order (i.e., an "order tote"), or one or more items being returned to the store 110 by the customer (i.e., a "return tote"). The totes may also be empty (i.e., an "empty tote"), for example, after ordered items are picked up by a customer at the customer access system 1000 or after returned items are dispositioned (e.g., via a workstation 168). In some implementations, empty totes may be decontaminated via a decontamination module (see, for example, the decontamination module 220 in FIGS. 18A and 18B) before being reused to ensure customers and workers are not exposed to various contaminants (e.g., pathogens) through repeated handling of the same tote. In yet other example implementations, different totes may be used to store items at room temperature, a chilled temperature, or a frozen temperature and the totes may further support sub-totes to divide the tote into smaller compartments (e.g., especially for low volume goods), as will be discussed in further detail below.

In example implementations, the various totes used throughout the G2P system 160 are designed to have a common shape and size, which generally facilitates the automated functions of the G2P system 160 by providing a standardized component to store and transport items (where respective different items being purchased or returned generally have different geometries and dimensions). In one salient aspect, the common shape and size of the respective totes employed in the G2P system 160 facilitate an implementation of container transport 166 that employs multiple mobile robots (discussed in further detail below) to transport the totes between at least the container storage 164 and the workstation(s) 168 of the G2P system 160. Although totes that conform to a common shape and size may be preferable, it should be appreciated the various concepts and features of the G2P system 160, in principle, aren't limited to a single tote design. The G2P system 160 may also use totes with different sizes and/or shapes with the various automated systems of the G2P system 160 designed to be compatible with the different totes. For example, the G2P system 160 may include small, medium, and large sized totes to carry correspondingly small, medium, and large sized items, which may be stored in the container storage 164, transported via the container transport 166, and picked via the workstation 168. The container storage 164 may include one or more multi-level storage rack structures to store multiple totes (see, for example, the multi-level rack structure 240 in FIG. 4).

In some implementations, the container storage 164 may include multiple temperature zones to accommodate, for example, chilled and frozen food items and other items stored at room temperature, as will be discussed in further detail below. The container transport 166 also may include a rail structure to guide the movement of the robots and/or a transit deck area where the robots may move freely along a 2D plane. In some implementations, the container transport 166 may provide multiple parallel paths between various portions of the store 110 so that multiple totes may be transported to any one portion of the store 110 at the same time. The robots may also be used to transport totes between the sales floor area 130 and the G2P system 160 and/or between the G2P system 160 and the customer access system 1000, thus providing a unified system to transport totes between all areas of the store 110.

1.1 An Example Customer Access System

FIG. 1B shows an example of a customer access system 1000 for the store 110, wherein the customer access system 1000 includes one or more customer access portals 310 to provide the customer at least one access point to pick up ordered items from the store 110 and/or to return items to the store 110. Generally, each customer access portal 310 may service one or more customers one after the other. The customer access system 1000 may further include a storage structure 896 to temporarily store order totes (e.g., as a way to reduce the transit time to deliver an order tote to the customer access portal 310) and/or temporarily store return totes (e.g., to provide a buffer to mitigate customer wait times associated with dispositioning of returned items). The storage structure 896 may further include a pickup staging area 899 to store only order totes and a return staging area 900 to store only return totes. As shown, the customer access portal 310 and the storage structure 896 may be coupled via a tote transfer system 1010, which transports order totes and return totes between the customer access portal 310 and the storage structure 896. In some implementations, the tote transfer system 1010 may also transport empty totes from the customer access portal 310 directly to the G2P system 160.

The customer access portal 310 generally includes a dispense mechanism to facilitate an exchange of items to or from the customer in a controlled and safe manner. The customer access portal 310 may also include a tote location to retrieve and temporarily hold a tote provided by the tote transfer system 1010 so that items may be exchanged directly between the tote and the customer or indirectly via the dispense mechanism. In some implementations, the tote location may form part of the dispense mechanism. However, it should be appreciated that, in some implementations, the tote location may be physically separate from the dispense mechanism.

For example, the dispense mechanism of the customer access portal 310 may include a user interaction area, such as a shelf, that is directly connected to the tote transfer system 1010 to receive and hold a tote. The dispense mechanism may also include one or more doors that controls access to the user interaction area (see, for example, the customer access portal 310A shown in FIG. 6A). For example, a portal door of the customer access portal 310 may only open when a customer interacts with the customer access portal 310 (e.g., scanning an order number, a QR code, or a bar code to pick up an item, scanning a product code or swiping/inserting a credit card to return an item). In some implementations, the customer access portal 310 may also include an interior safety door to prevent the customer from accessing other automated portions of the customer access system 1000 (e.g., the tote transfer system 1010), to ensure customer safety and reliable automation.

In another example, the dispense mechanism may include a drawer that slides between an open position and a closed position to control access to the contents of the drawer. When the drawer is in the open position, the customer may pick up ordered items from the drawer or place returned items into the drawer. When the drawer is in the closed position, a tote containing the ordered items or returned items may be transported between the tote transfer system 1010 and the drawer. In some implementations, one or more totes (e.g., order totes or return totes) may be loaded directly into the drawer so that the customer may directly access the totes (see, for example, the customer access portal 310B shown in FIGS. 7-8B). Here, the drawer may define the tote location. In some implementations, the tote location may be disposed above the drawer when the drawer is in the closed position so that items may be transferred from the tote to the drawer, for example, to facilitate dispensing of ordered items to the customer (see, for example, the customer access portal 310C shown in FIGS. 9A-9F). Here, the tote location is physically separate from the drawer.

In some implementations, the customer access portal 310 may also include a user interface to facilitate interaction between the customer and the customer access portal 310. The user interface may be a physical device (e.g., a terminal) directly mounted to the customer access portal 310. For example, the user interface may generally include a display, a scanner, a microphone, a camera, a keypad, and/or a speaker. When a customer arrives at the customer access portal 310, they may scan or enter an order number, a product code, or a credit card, which in turn may cause the dispense mechanism to open allowing the customer to pick up ordered items or return items. It should be appreciated that, in some implementations, the customer access portal 310 may not include a user interface. Instead, the customer may access the customer access portal 310 via a software application installed, for example, on the customer's computer or mobile device (e.g., a cellular phone, a smartphone).

The storage structure 896 may generally support one or more totes (e.g., order totes, return totes) in several ways. In one example, the storage structure 896 may include one or more multi-level storage rack structures similar to the storage structures used in the container storage 164 (see, for example, the multi-level storage rack structure 240 in FIG. 4). In some implementations, one or more robots may transport totes to and from the storage structure 896 in the same manner as the container storage 164, thus utilizing the same components and systems as other portions of the G2P system 160 (see, for example, the robot 212 in the customer access portal 310A of FIGS. 6A and 6B, or the robots 908 in the customer access systems 1000B and 1000C in FIGS. 12A-12C and 14A-14C). In another example, the storage structure 896 may include one or more racks that each support multiple totes. In some implementations, each rack may be movable so that multiple totes are transportable to and from the storage structure 896 at one time. In yet another example, the storage structure 896 may include a combination of racks and multi-level storage rack structures. In yet another example, the storage structure 896 may provide a buffer space located near the customer access portal 310 integrated, at least in part, with the tote transfer system 1010 (see, for example, the shelves 250 in the towers 216-1 and 216-2 in FIGS. 10A-10C).

The storage structure 896 may generally be connected to other portions of the G2P system 160, such as one or more workstations 168 and/or the container storage 164, via the container transport 166. For example, one or more rail structures may directly connect the storage structure 896 to the container storage 164 and the workstation(s) 168 so that one or more robots may directly transport totes to and from the storage structure 896. In another example, the storage structure 896 may be connected to the G2P system 160 via one or more transit decks.

As described above, the storage structure 896 may be used to temporarily store totes to dispense ordered items to customers and/or retrieve returned items from customers prior to dispositioning. Thus, the capacity of the storage structure 896 may depend primarily on the rate at which totes move to and from the customer access portal 310. In some implementations, the desired throughput rate of totes moving through the customer access system 1000 may be such that the storage capacity of the storage structure 896 is less than the storage capacity of the container storage 164. In other words, the storage structure 896 may be smaller than the container storage 164 and thus occupy less space in the G2P system 160 of the store 110.

In some implementations, the storage structure 896 may be placed between the container storage 164 and the customer access portal 310 to reduce the transit time between the customer access portal 310 and the workstation 168 and/or the container storage 164 of the G2P system 160. For example, an order tote may be transported from the container storage 164 to the storage structure 896 when the customer is in transit to the store 110 so that once the customer arrives at the customer access portal 310, the order tote may be delivered to the customer access portal 310 more quickly (i.e., the customer waits a shorter amount of time for their order). In some implementations, the distance separating the container storage 164 and the customer access portal 310 may be about 500 feet while the storage structure 896 may only be about 50 feet from the customer access portal 310. The totes may also travel a shorter distance to and from the storage structure 896, which may reduce infrastructure costs (e.g., the container transport 166 may include a shorter rail structure) and energy costs (e.g., the robots consume less energy transporting totes to and from the storage structure 896).

In some implementations, the storage structure 896 may incorporate the pickup staging area 899 and the return staging area 900 into one unitary structure. For example, the storage structure 896 may include a multilevel-rack storage structure with multiple storage levels. One set of storage levels (e.g., the upper storage levels) may be reserved for order totes while another set of storage levels (e.g., the lower storage levels) may be reserved for return totes. In some implementations, the size of the respective the pickup staging area 899 and the return staging area 900 may change over time based on demand. For example, the number of storage levels reserved for order totes may increase during peak times when more customers arrive at the store 110 to pick up orders. However, it should be appreciated that, in some implementations, the pickup staging area 899 and the return staging area 900 may be separate structures located in separate areas of the store 110. For example, the pickup staging area 899 may be located near the customer access portal 310 while the return staging area 900 may be located near the workstations 168.

It should be appreciated that the storage structure 896 is an optional component of the customer access system 1000. More generally, order totes and return totes may be stored anywhere in the G2P system 160 and the store 110. For example, one or more order totes and/or return totes may be stored directly in the container storage 164 together with the stock inventory. The container storage 164 may be a multi-level rack structure where one or more storage levels of the rack structure are reserved for order totes and return. Thus, the container storage 164 may define the pickup staging area 899 and/or the return staging area 900. The remaining storage levels are designated for the storage of stock inventory. In another example, one or more order totes and/or return totes may be stored on the sales floor area 130. In yet another example, the order totes and/or return totes may be stored on the ground near the customer access portal 310 or the workstations 168, respectively.

The tote transfer system 1010 may generally provide an automated system to transport totes between the storage structure 896 and the customer access portal 310. This may be accomplished in several ways. For example, the tote transfer system 1010 may be an extension of the container transport 166 where multiple rail structures and/or transit decks may provide multiple pathways for robots to move totes between the storage structure 896 and the customer access portal 310. In another example, the storage structure 896 may include multiple movable racks and the tote transfer system 1010 may include one or robots designed to move at least one rack between the storage structure 896 and the customer access portal 310 (see, for example, the robots 908 in the customer access system 1000B and 1000C of FIGS. 12A-12C and 14A-14C). In yet another example, the tote transfer system 1010 may include one or more conveyor systems to move totes between the storage structure 896 and the customer access portal 310 more quickly compared to the transport of totes via one or more robots (see, for example, the robot 212 in the customer access portal 310A of FIGS. 6A and 6B, or the robots 908 in the customer access systems 1000B and 1000C in FIGS. 12A-12C and 14A-14C).

Additionally, the tote transfer system 1010 may also include one or more tote transfer mechanisms to move totes into and out of the storage structure 896 and the customer access portal 310. For example, if the tote transfer system 1010 includes multiple robots to transport the totes, each robot may include a tote transfer mechanism to move the tote into and out of the robot. In another example, the tote transfer system 1010 may include one or more tote transfer mechanisms mounted to the customer access portal 310 to retrieve totes, for example, from a rack.

The customer access system 1000 described herein may provide several features to improve the efficiency and operation of G2P system 160 and, more generally, the store 110. In one aspect, the customer access portal 310 allows customers to both pick up ordered items and return items using one unified system at one location unlike conventional retail stores, which typically have separate systems to handle orders and returns and require the customer to visit multiple different areas of the store. In some implementations, the customer access portal 310 may allow the customer to pick up ordered items and return items at the same time. For example, the customer may order one or more grocery items. However, some of the items may be substituted with other similar items (e.g., one brand of ketchup for another brand of ketchup). When picking up the ordered items, the customer may decide they no longer want the substituted items. The customer access portal 310 may thus allow the customer to leave the substituted items in the dispense mechanism, and the customer access system 1000 may transport the substitute items back to the storage structure 896 for dispositioning as returned items.

The customer access portal 310 may thus improve the customer's shopping experience, in part, by saving the customer time by eliminating the need for the customer to visit different areas of the store 110 to pick up and return items. Additionally, the customer access portal 310 may save the retailer space within the store 110 by eliminating the need for a separate return counter or desk and/or a separate pickup area for online orders. In some implementations, the additional space saved by the customer access portal 310 may be used to increase the sales floor are 310 and/or the container storage 164 to store more stock items.

1.2 Asynchronous Dispositioning of Returned Products

In one salient aspect, the storage structure 896 of the customer access system 1000 discussed above in connection with FIG. 1B provides for "asynchronous dispositioning" of returned items. With asynchronous dispositioning, a customer may quickly, easily and safely return a product at the customer access portal 310 (e.g., with a scan of a product bar code and identification of a previous order number or a credit card used to purchase the product), and the product is then transported (e.g., via a mobile robot) to some storage area in the store 100 (e.g., the return staging area 900 of the storage structure 896), where it is temporarily stored and dispositioned (e.g., restocked in the store's inventory, sent back to the manufacturer, or otherwise disposed) at a later time. Thus, the customer's return of the product and the returned product's ultimate dispositioning occur at different times (i.e., asynchronously).

The Applicant has appreciated that by decoupling dispositioning of the returned product from the customer's return of the product itself, the customer's waiting period or other customer burden associated with a product return is significantly reduced, if not virtually eliminated. Furthermore, in one example implementation, by providing a return staging area 900 that is isolated from other inventory in the store area, and/or that allows for the consolidation of multiple returned products (from the same or different customers) over time and then later dispositioning of products once multiple products are accumulated (rather than dispositioning each returned product one at a time), the return staging area 900 serves as an effective buffer to flexibly accommodate significant changes in customer return volume over the course of a given time period and thereby increases efficiency of the retailer's operations.

As described above, the returned item may be transported to a given storage area (e.g., the return staging area 900) for temporary storage and later transported to one or more workstations 168 of the G2P system 160 for dispositioning where the workstations 168 determine whether the returned item should be restocked, sent back to the manufacturer for refurbishment and repair, or otherwise disposed (e.g., scrapped, trashed). As noted above, the return staging area 900 may generally be a structure that is physically separate from the customer access portal 310 so that the accessibility of the customer access portal 310 is not dependent on the availability of storage for returned items. For example, a returned item provided by a first customer may be transported from the customer access portal 310 to the return staging area 900 immediately after receipt so that a second customer may use the customer access portal 310 right after the first customer is finished with their return. This may be accomplished, for example, using racks, conveyors, or robots as discussed further below.

Decoupling the intake of returned items and the storage of the returned items by physically separating the customer access portal 310 and the return staging area 900 (or other storage area for returned items) may also provide the retailer additional flexibility to design and layout the store 110. For example, the number of customer access portals 310 in the store 110 may be chosen based at least in part on the average number of customers expected to use the customer access portal 310 the store 110 on a daily basis averaged over a period of a year regardless of the volume of returned items being received by the customer access system 310.

In another example, the size and storage capacity of the return staging area 900 may be chosen based on the dispositioning rate of returned items, which may depend on, for example, the number of workstations 168 available in the G2P system 160. As noted above, the return staging area 900 may provide a buffer to accommodate sudden and significant changes in the volume of returned items for a given period of time. For example, the number of customers making returns may suddenly increase the day after a holiday. The return staging area 900 may provide sufficient capacity to temporarily store the larger volume of returned items especially if the G2P system 160 has a relatively fixed dispositioning rate. In some implementations, the return staging area 900 may also be used to consolidate multiples of the same returned items from respective customers over time. That way, the same type of returned items may be collectively dispositioned at the same time, which may be more efficient than dispositioning each returned item one at a time.

Figure 2A:
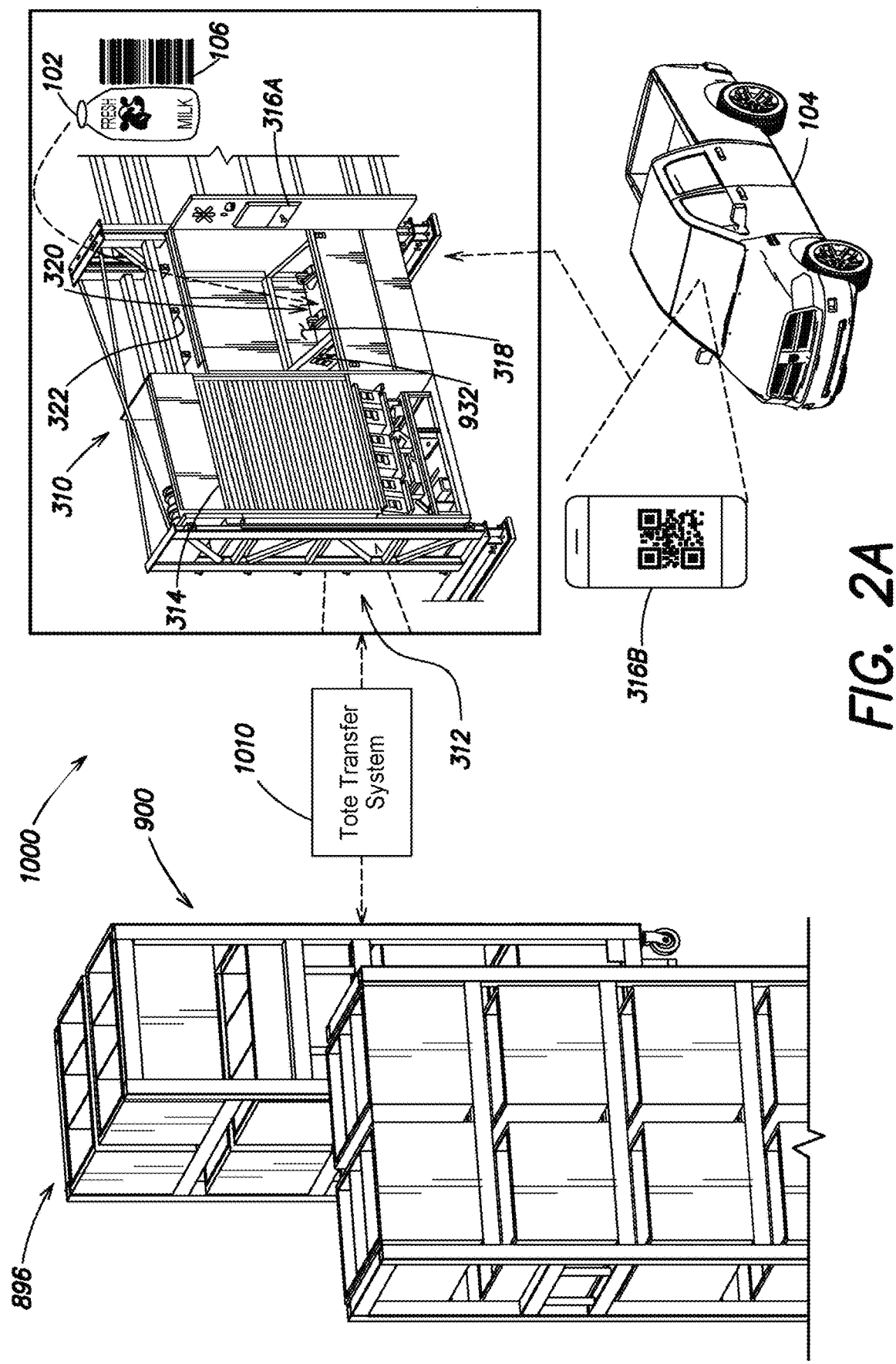
FIG. 2A illustrates an example of portions of a customer access system, according to one inventive implementation, to facilitate a method for returning a first product by a customer via the customer access portal.

FIG. 2A illustrates an example of portions of a customer access system 1000 including a customer access portal 310, a storage structure 896 including a return staging area 900, and a tote transfer system 1010 to facilitate a method for returning a first product 102 by a customer 104 via the customer access portal. As illustrated in FIG. 2A, the customer access portal 310 includes a user interaction area 320 and a return tote 932 (also referred to herein as a "portal tote," which may be used for returning items or dispensing items for pickup) disposed in the user interaction area to carry at least the first product from the customer access portal. In example implementations, the customer access portal 310 also may include a user interface 316A, one or more cameras 322 having a view of the user interaction area, a portal door 314 to control access by the customer to the user interaction area, and an interior safety door 318 to control access to an aisle space 312 that facilitates transport of the first product between the user interaction area and the return staging area 900.

In FIG. 2A, a portion of the storage structure 896 including the return staging area 900 is depicted for purposes of illustration as one or more vertical racks of shelves having wheels to facilitate transport of the vertical racks; however, it should be appreciated that, more generally, a storage structure 896 including a return staging area 900 need not necessarily employ mobile vertical racks of shelves, but instead may employ one or more stationary shelves, or various combinations of stationary and mobile shelves, in a variety of horizontal and/or vertical arrangements. In one implementation, a storage structure 896 including a return staging area 900 may include some number of designated shelves within container storage 164 of the G2P system 160 (e.g., which designated shelves may store return totes with respective unique tote tags or IDs, as discussed elsewhere herein in connection with FIGS. 19A and 19B).

Figure 2B:
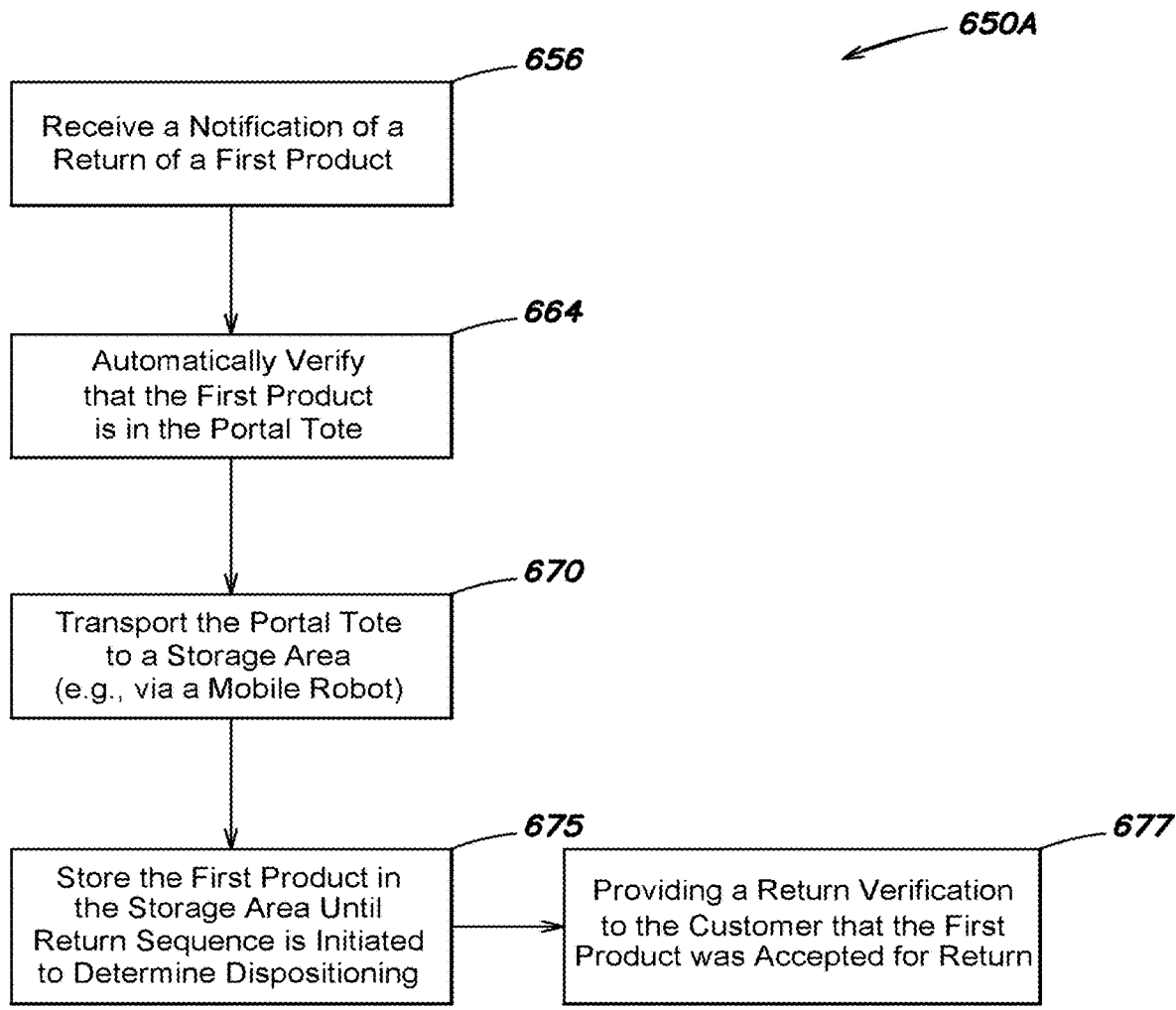
FIG. 2B illustrates a flow diagram of a first example method for returning a first product according to one inventive implementation employing asynchronous disposition.

A flow diagram 650A of a first example method for returning the first product 102 according to one inventive implementation employing asynchronous disposition is shown in FIG. 2B. Another flow diagram 650B of a second example method for returning the first product 102 is shown in FIG. 2C.

Beginning with FIG. 2B, in block 656 the first example method for returning the first product comprises receiving a notification of a return of the first product. In some examples, the customer 104 may use a user interface 316A of the customer access portal 310 (which may be communicatively coupled to the inventory management computing device 120 shown in FIG. 1A), or alternatively may use their own device (e.g., a mobile device 316B, which also may be communicatively coupled to the inventory management computing device shown in FIG. 1A) to provide the notification of the return of the first product. Examples of how the notification may be received include, but are not limited to, receiving a reference number for the first product, receiving an item description for the first product, or receiving a scanned code 106 for the first product. In yet another example, a scanned code may be received for the first product together with a credit card number used to purchase the first product.

Figure 2C:
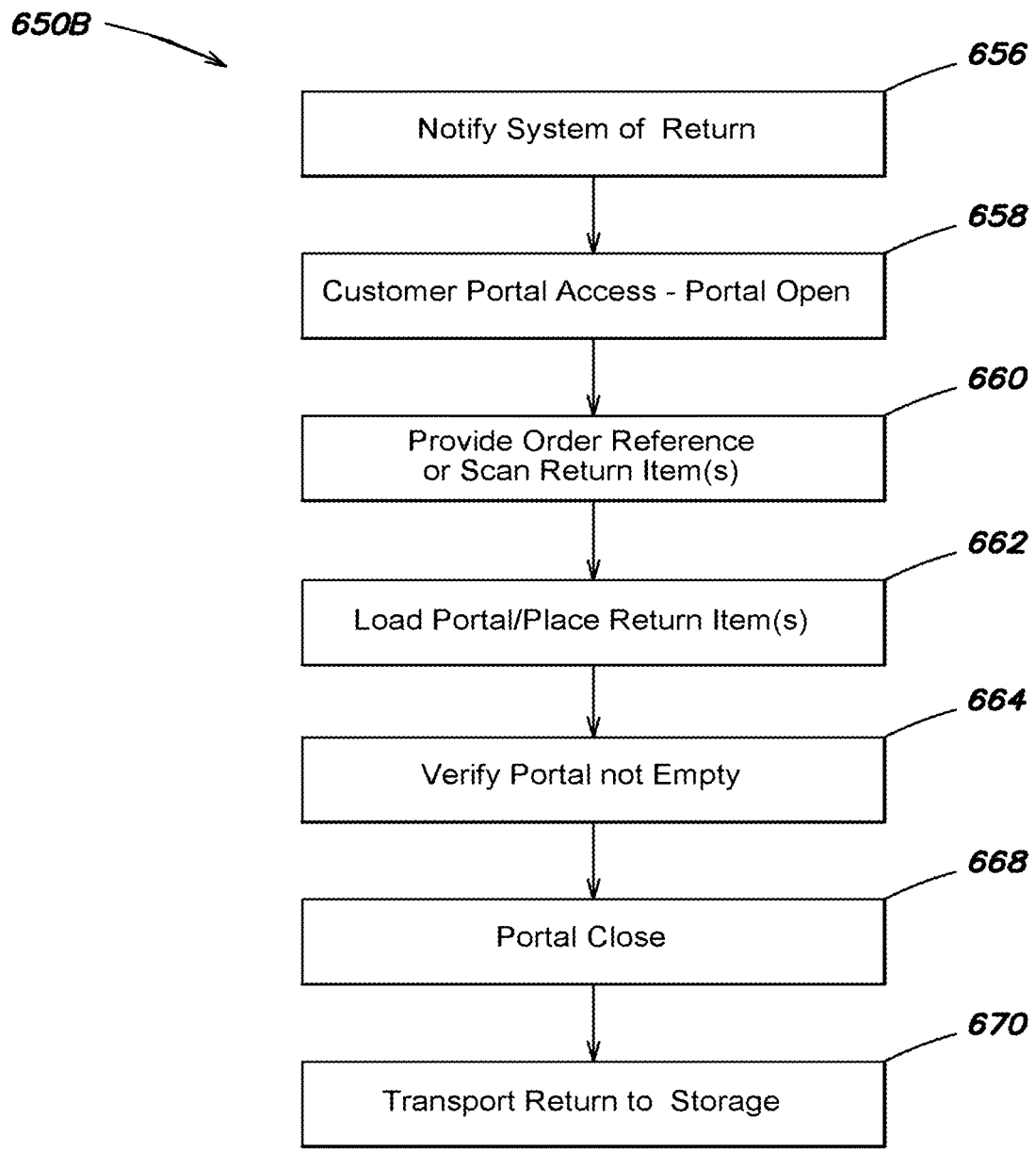
FIG. 2C illustrates a flow diagram of a second example method for returning a first product according to one inventive implementation employing asynchronous disposition.

Turning for the moment to FIG. 2C, after receiving a notification of the return of the first product, in the second example method the customer access portal 310 further comprises a portal door 314 to control access by the customer to the user interaction area. In block 658 of FIG. 2C, the method further comprises receiving a notification that the customer is at the customer access portal and automatically opening the portal door to allow access by the customer to the user interaction area. As noted above, the notification that the customer is at the customer access portal may be received via a mobile computing device 316B used by the customer or, if the customer access portal is equipped with a user interface 316A, via the user interface of the portal. In block 660 and 662 of FIG. 2C, once the portal door is open, the customer may provide an order number for reference that included the first product which the customer now wishes to return, or simply scan the first product (e.g., via the user interface 316A or the mobile computing device 316B), and then place the first product into the portal tote disposed in the user interaction area 320.

In block 664 of both FIG. 2B and FIG. 2C, once the customer places the first product into the portal tote for return, the first product is automatically verified to be resident in the portal tote. In one example implementation, as discussed in further detail below, the customer access portal may further include a camera 322 having a view of the user interaction area, and the camera 322 is used to verify that the first product is in the portal tote. Returning for the moment to the second example method shown in FIG. 2C, in block 668 the portal door is closed following verification that the first product is in the portal tote.

In block 670 of both FIG. 2B and FIG. 2C, the portal tote 932 containing the first product 102 is transported via a first mobile robot to a storage area (e.g., the return staging area 900). With reference again to FIG. 2A, as noted above in some example implementations the customer access portal 310 may include an interior safety door 318 to control access to an aisle space 312 that facilitates transport of the first product between the user interaction area and the returned item storage area. In another example, the method shown in FIG. 2C may further comprise opening the interior safety door of the customer access portal to provide access to the portal tote containing the first product via the aisle space between the user interaction area and the return item storage area, and transporting the portal tote containing the first product from the user interaction area to the returned item storage area (e.g., the return staging area) via the aisle space using the first mobile robot.

In block 675 of FIG. 2B, the first product 102 is stored in the returned item storage area until a return sequence is initiated to determine dispositioning of the first product (e.g., to be scrapped, returned to a manufacturer, returned to a distribution center, or returned to the other inventory in the store). In block 677 of FIG. 2B, a return verification is provided to the customer that the first product was accepted for return. Examples of such a return verification include, but are not limited to, sending a text message or an email to the customer with the return verification that the first product was accepted for return.

As will be discussed further below in connection with the disclosure of additional structural details of a customer access system including a customer access portal, as well as various use-cases for customer pickup of ordered items and returning of one or more products, it should be appreciated that additional functionality is contemplated in connection with a return process.

For example, the customer 104 may visit the customer access portal 310 to return one or more products without necessarily picking up any items from an order. In such a case, the customer access system may transport an empty portal tote to the customer access portal (e.g., via a mobile robot) to retrieve one or more returned products. In another example, the customer 104 may wish to return one or more products in connection with picking up a dispensed order; in this case, a portal tote may arrive to the customer access portal with one or more items from the dispense order, the customer removes the dispensed item(s) from the portal, and portal tote is verified as empty prior to accepting one or more returned products. In yet another example, one or more products may be returned as an unwanted item that is part of a dispensed order. In this case, the portal tote may arrive to the customer access portal with one or more items from an order, the customer removes dispensed item(s), and then identifies an unwanted item of the dispensed item(s) as the returned product.

In yet other examples of additional functionality discussed further below, a portal tote being transported from a customer access portal to the storage structure 896 may be decontaminated prior to arriving. Furthermore, once returned products are stored in the return staging area 900, at some time following storage a return sequence may be initiated to determine the dispositioning of the first product, in which one or more returned products are transported to a workstation for inspection. As discussed further below, a method of dispositioning may include determining at the workstation that a first product is designated for return to the other inventory in the store, transporting a product tote to the workstation, placing the first product into the product tote, and transporting the product tote containing the first product to container storage for the other inventory in the store.

1.3 Consolidation of Customer Orders

In yet another aspect, the customer access system 1000 may also be used to buffer and consolidate ordered items for customers. This may be accomplished by using the storage structure 896 to store multiple order totes for several customers expected to arrive at the store 110 around the same time. As described above, the storage structure 896 may be used to reduce the transit time to transport order totes to the customer access portal 310. This may be especially beneficial during "peak hours" where many customers arrive at the customer access portal 310 to pick up ordered items and/or return one or more items. For example, the storage structure 896 may include multiple racks that each support multiple order totes for multiple customers. The racks may be positioned near the customer access portal 310 so that once one customer picks up their order, the next customer may pick up their order immediately thereafter. In another example, the storage structure 896 may be one or more shelves that define a buffer space near the customer access portal 310 accessible by one or more robots (see, for example, the shelves 250 in the towers 216-1 and 216-2 in FIGS. 10A-10C).

In some implementations, the customer access system 1000 may also consolidate items stored at different temperatures (e.g., room temperature, chilled temperature, frozen temperature) so that all ordered items in a customer's order are dispensed at the same time. In other words, if a customer orders a chilled or frozen item, the customer does not have to wait for an additional period of time for the chilled or frozen item to be retrieved from the appropriate temperature zone of the container storage 164. This may be accomplished, in part, by using different totes to store items at different temperatures. For example, a chilled tote may be used to store items at a chilled or frozen temperature (see, for example, the tote 932C in FIGS. 20A and 20B). The chilled tote may be grouped together with regular totes that store items at room temperature.

The customer access system 1000 may also generally be a fully automated system. For example, totes may be moved into and out of the storage structure 896 from the G2P system 160 via one or more robots. The tote transfer system 1010, as described above, may transport totes between the storage structure 896 and the customer access portal 310 using robots or conveyor systems. The customer access portal 310 may have an automated dispense mechanism. In this manner, the customer access system 1000 may reduce the amount of labor required to operate the G2P system 160 and the store 110. For example, the retailer may no longer require staff to man a return counter or desk to retrieve returned items. In another example, orders may be dispensed to customers without the aid of any workers.

It should be appreciated that, in some implementations, the customer access system 1000 may not include the storage structure 896. Instead, the tote transfer system 1010 may be directly coupled to the container storage 164 and/or the workstations 168 via the container transport 166. Although the customer access system 1000 may not be able to leverage some of the benefits provided by the storage structure 896 described above, such as buffering and staging order totes and/or return totes via the pickup staging area 899 and the return staging area 900, the customer access system 1000 may nevertheless still include the customer access portal 310 to facilitate dispensing of order items to customers and receipt of returned items from customers.

1.4 Other Systems and Areas of the G2P System

In addition to picking items to fulfill customer orders, the G2P system 160 may provide additional functions including, but not limited to, the induction of individual units of a product (also referred to as "eaches" of the product) or prepackaged cases of eaches of product from the inventory storage and queue area 150, the consolidation of the same items (i.e., items having the same SKU) separated into multiple totes (also referred to as "defragmentation"), the addition or removal of totes from the G2P system 160, and the processing of returned items by determining whether the returned items should be restocked in the container storage 164, shipped to the manufacturer for refurbishment and/or repair, and/or disposed. For example, FIG. 1A shows the G2P system 160 may further include a decant module 172 to break down and separate eaches of a product from a case or other packaging and a container induction module 174 to add or remove totes (with or without items) into the G2P system 160.

The G2P system 160 may also include a material control system (MCS) 162, which is a software application used to control the operation of various components in the G2P system 160. For example, the MCS 162 may manage the operation of the customer access system 1000 by controlling the transport of order totes to the customer access system 1000 and/or the transport of return totes from the customer access system 1000, the timing and sequence of order totes to be placed into the customer access portal 310 for pickup by one or more customers, and the dispositioning of return items. In another example, the MCS 162 may designate a particular workstation 168 to fulfill a customer order and thereafter instruct one or more robots to transport product totes to the workstation 168, provide instructions to a human operator or a robotic picker containing the type and quantity of items to transfer from the product totes to one or more order totes, instruct the robots to transport the product totes back to the container storage 164 and the order totes to the customer access system 1000. In yet another example, the MCS 162 may control and limit the duration robots operate in chilled or frozen temperature zones to reduce or, in some instances, mitigate condensation on the robots when the robots return to room temperature. In yet another example, the MCS 162 may manage the stock of items on the sales floor 130 and provide instructions to the robots to replenish low stock items on the sales floor 130 from the container storage 164.

The G2P system 160 may include a centralized control system with one or more computers with software (e.g., the MCS 162), servers, a database, and/or network communication components (not shown) to manage the operation of at least the G2P system 160.

The store 110 may further include an inventory management computing device 120 to run an inventory management system that monitors and manages the inventory of various items within the store 110. In some implementations, the inventory management computing device 120 may be a separate system that works in concert with the MCS 162. In some implementations, the inventory management computing device 120 may form part of the MCS 162. For example, the inventory management computing device 120 may be integrated into the workstations 168 (e.g., the static workstations) and thus form part of the G2P system 160. The inventory management computing device 120 may generally include various computing devices with a processor 122 to operate the inventory management system and memory 124 to store various software applications and data on the various products in the stores 110. Further details of the technical components of the inventory management computing device 120, the MCS 162, and/or other computing devices used to manage, control, and interface with the store 110 are described below and shown in FIG. 21.

The inventory management computing device 120 may generally include a database that runs a site data application 126 to support the operation of the inventory management system. In particular, the site data application 126 may manage and store product information for each item located in the store 110 including items stored in the container storage 164, items awaiting induction in the inventory storage and queue area 150, items on display in the sales floor area 130, and items picked for customer orders. The product information may include, but is not limited to, a product name, a product code, product specifications (e.g., weight, dimensions, shape, color), a product supplier, a location code (e.g., a zone, an aisle, a shelf, a bin where the item is located in the container storage 164), a temperature status to indicate the temperature zone where the item is stored (e.g., a room temperature status, a frozen status, or a chilled status), a quantity of the item displayed on the sales floor area 130, a category for the item (e.g., groceries, home furnishings, consumer electronics, appliances, prescription and/or over-the-counter medicine), a department for the item (e.g., grocery, pharmacy, appliances, electronics), a priority status for dispensing the item (e.g., dispense quickly or slowly to the sales floor 130 or the G2P system 160), a quantity of the item to be dispensed, a time to be dispensed, a scheduled pickup time, a pending customer order, a stock status, historical sales data of the item, the velocity of the item (i.e., the rate at which the item are sold to customers normalized to distribution) in real-time or over a period of time (e.g., a holiday season). The product code for each product may be a Universal Product Code (UPC) code, a Quick Response (QR) code, or any other standard codes associated with the product information known to one of ordinary skill in the art.

In one example, items may be delivered to the store 110 and unloaded at the receiving area 140. The items may generally be packaged in cases supported by at least one pallet. Each pallet may generally support multiple cases of the same item or multiple cases that each have different items. The receiving area 140, the inventory storage and queue area 150, and/or the G2P system 160 may generally include a scanner (e.g., a barcode scanner) to scan and read in data associated with the products in each case. Once the data is saved to the database of the inventory management computing device 120, the product information associated with the inducted products may be retrieved and updated at any time. In some implementations, this data may be accessible, for example, by the MCS 162 of the G2P system 160.

For example, the location code of an item may be updated as the item is moved throughout the store 110. For instance, the item may be updated to show where the item is located in the sales floor area 130 (e.g., the zone, aisle, shelf, bin of the sales floor area 130) or where the item is stored in the container storage 164 of the G2P system 160 (e.g., the aisle, rack level of a multi-level rack structure). In another example, the stock status may change over time between, for example, regular stock," "low stock," or "out of stock," to indicate the quantity of the items available. In some implementations, the stock status may vary depending on the type of item for sale and the relative demand for the item. In yet another example, the priority status for dispensing may vary for items stored at room temperature, chilled temperatures, or frozen temperatures. For instance, chilled and frozen items may have a higher priority status to unload and dispense to the sales floor 130 or the G2P system 160.

The inventory management computing device 120 may further run an inventory management application 128, which is a software application that prioritizes the transport of different items between various portions of the store 110 to ensure items are available for purchase on the sales floor area 130 and/or to fulfill an online order using the G2P system 160. For example, the inventory management application 128 may rank and order items received in the receiving area 140 and staged in the inventory storage and queue area 150 to determine the priority, timing, and quantity of each item that is dispensed to the sales floor 130 and/or the G2P system 160. In another example, the inventory management application 128 may rank and order items available on the sales floor area 130 and/or stored in the G2P system 160 to determine a priority, a time, and a quantity for each item to be dispensed again to replenish the sales floor area 130 and/or the G2P system 160.

The inventory management application 128 may rank and order items by analyzing historical sales data of the items sold at the store 110 to obtain a sales pattern of the items. A sales pattern for a particular item may be based on various data including, but not limited to, a total number of sales, a velocity or sales rate, a number of sales from the sales floor area 130 or online orders, a location of the store 110, previous discounts made to the item, projected future sales of the item, projected supply of the item from distribution centers, and any combinations of the foregoing. The sales pattern may further be determined as a function of time (e.g., time of day, a time of week, a time of month, and a time of year). For example, some items may have higher sales during weekends compared to weekdays. In another example, the sales pattern of certain items may be affected by certain holidays during the year. Based on the sales pattern and other factors (e.g., stock status), the inventory management application 128 may determine the order of items that should be moved to different portions of the store 110 to ensure customers can purchase items from the sales floor area 130 and/or place an order for the items online.

In some implementations, the store 110 may also support an alternate E-commerce model where a customer may order one or more items that are shipped to the store 110 instead of being picked from existing stock within the store 110. The ordered items may be delivered to the store 110, for example, via the receiving area 140 and dispensed into the G2P system 160 via the inventory storage and queue area 150. The ordered items may be consolidated with other items sourced from the container storage 164 and/or the sales floor area 130 and picked up by the customer via the customer access system 1000. For example, the customer may order clothing that is shipped to the store 110 and grocery items that are sourced from within the store 110. The G2P system 160 may also allow the customer to return one or more of the items that were originally shipped to the store in the same manner as other returned items that were originally picked at the store 110.

In some implementations, the customer access system 1000 may generally accept returned items that were delivered via the customer access portal 310 or another model of delivery. For example, an order of items may be shipped directly to the customer's home and subsequently returned to the store 110 via the customer access system 1000. In another example, the customer may pick up ordered items at one store and subsequently return one or more of the items at the store 110.

2. Example Layouts of a Store

Figure 3A:
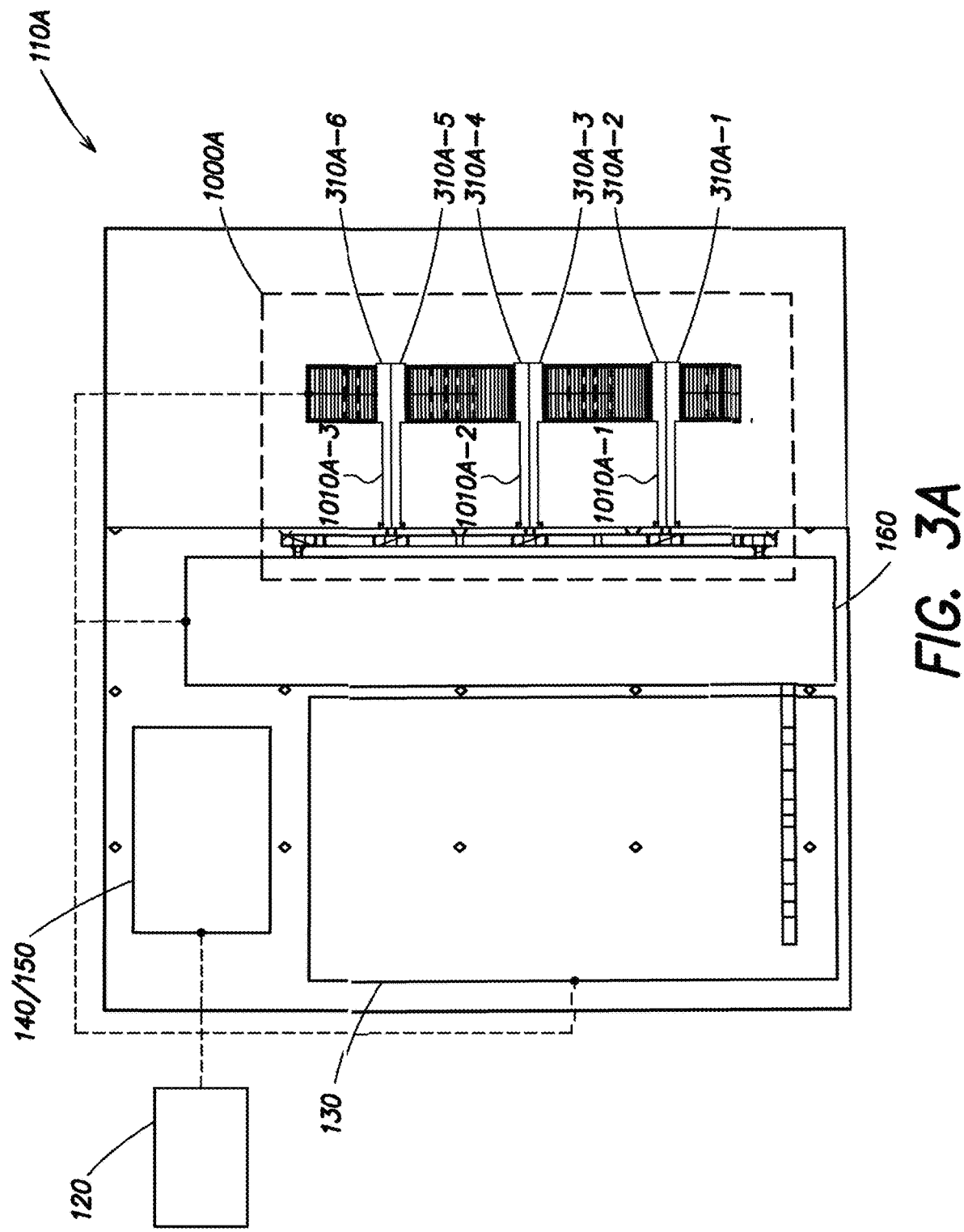
FIG. 3A shows a top view of an example store according to various inventive implementations of the present application.
Figure 3B:
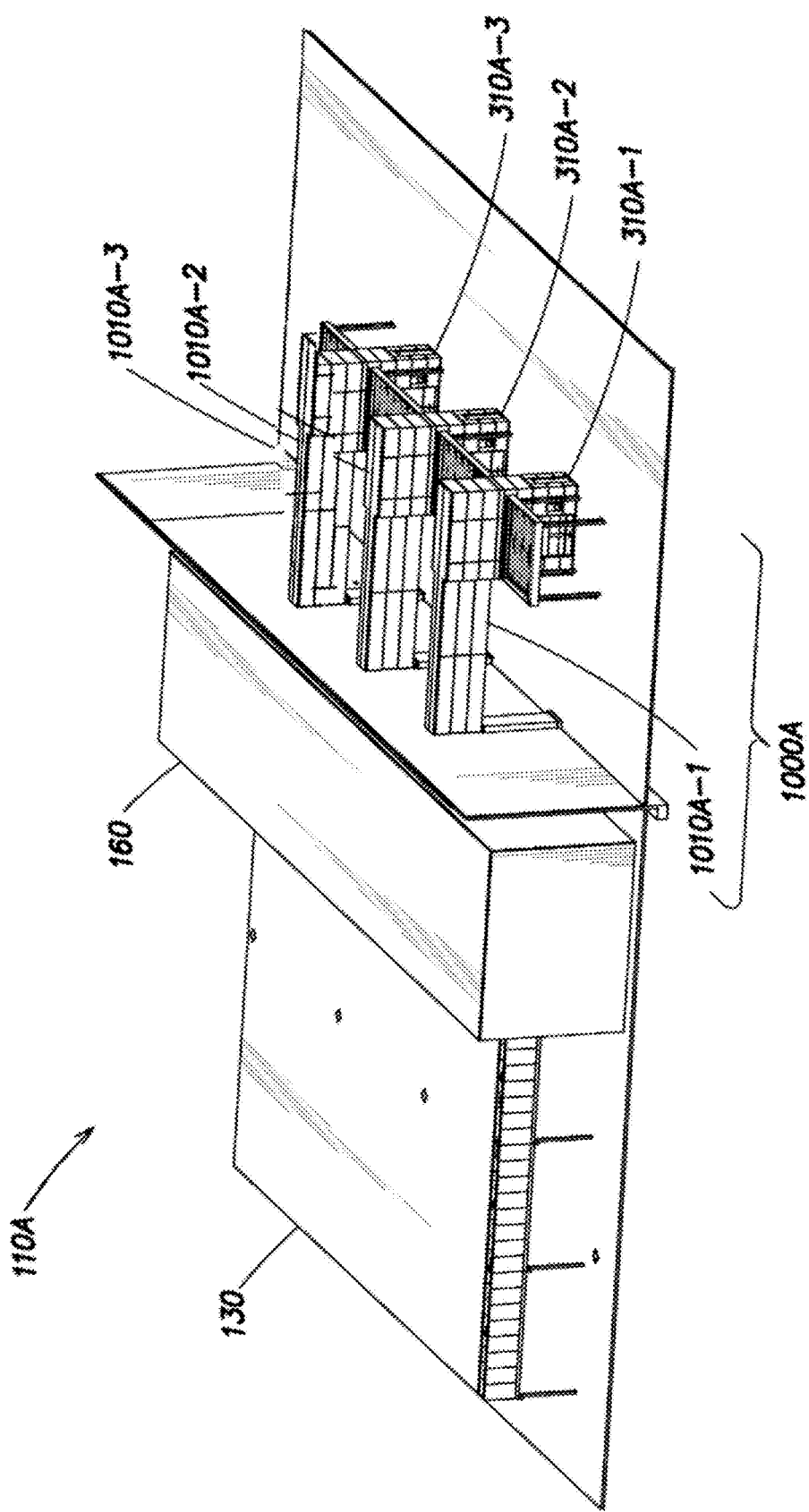
FIG. 3B shows a perspective view of the store of FIG. 3A.

FIGS. 3A-3C show several views of a store 110A that incorporates the various elements of the store 110 described above. As shown, the store 110A includes a sales floor area 130 located adjacent to a G2P system 160 and a receiving area 140 and inventory storage and queue area 150 located behind the sales floor area 130 and the G2P system 160. The G2P system 160 further includes a customer access system 1000A with multiple customer access portals 310A-1-310A-6 connected directly to the G2P system 160 to service multiple customers picking up ordered items or returning items. The store 110A may further include an inventory management computing device 120 electrically and communicatively coupled to the various portions of the store 110A. The inventory management computing device 120 may be located on-site in the store 110A or off-site in a remote location separate from the store 110A.

As shown, the customer access system 1000A includes multiple tote transfer systems 1010A to support multiple customer access portals 310A. For example, the tote transfer systems 1010A-1 transports totes to and from the customer access portals 310A-1 and 310A-2, the tote transfer systems 1010A-2 transports totes to and from the customer access portals 310A-3 and 310A-4, and the tote transfer systems 1010A-3 transports totes to and from the customer access portals 310A-5 and 310A-6. In some implementations, the customer access system 1000A may include one or more shelves that form a storage structure to store one or more order totes and/or return totes (see, for example, the storage structure 896C in the towers 216-1 and 216-2 of FIGS. 10A-10C). In some implementations, the customer access system 1000 may not include a storage structure 896 at all with the tote transfer systems 1010A being directly coupled to the G2P system 160 and the customer access portal 310A. Additional details of the customer access system 1000A are discussed below in connection with FIGS. 10A-10C.

FIG. 3C further shows the sales floor area 130 may include one or more workstations 168 to transport totes between the sales floor area 130 and the G2P system 160 via the robots 212. In this example, the workstations 168 may be static workstations. As shown, the workstations 168 may be disposed at ground level and connected to the G2P system 160 via multiple transit trails 214 forming a rail structure 213 located above the sales floor area 130 and multiple towers (not shown) that allow the bots 212 to move vertically between the workstations 168 and the transit rails 214.

In one example, customers shopping in the sales floor area 130 may manually pick items and place them into a tote, which may then be inducted into the G2P system 160 via the workstations 168 and subsequently combined with other ordered items sourced from the container storage 164. The customer's items may then be consolidated and delivered to one workstation 168 in the sales floor area 130 or one customer access portal 310A. In another example, the G2P system 160 may provide totes with stock items to the sales floor area 130 so that workers may restock items in the sales floor area 130. In yet another example, the G2P system 160 may provide empty totes to workers via the workstations 168 for customers to use when manually picking items in the sales floor area 130.

It should be appreciated that the store 110A is one example implementation of the concepts and features described above in connection with the store 110. Other stores may incorporate only a subset of the features and/or areas of the store 110. Additionally, different layouts of the store 110 are also contemplated herein.

For example, the store may be configured as a dark store that does not include the sales floor area 130. In other words, the customer may not support the traditional self-serve model, but only an E-commerce model where the customers may travel to the store to pick up ordered items or return items via the customer access system 1000.

In another example, the customer access system 1000 may be a standalone structure, such as a hub. In other words, the customer access system 1000 may be disconnected from the G2P system 160. In some implementations, order totes, return totes, and/or empty totes may be transported to and from the customer access system 1000 via human-operated vehicles (e.g., a truck) originating from a distribution center, warehouse, or retail store. In some implementations, the customer access system 1000 may be located on the same property as the retail store, but in a physically separate structure (e.g., the hub is located in the parking lot of a retail store).

3.1 An Example Container Storage

Figure 4:
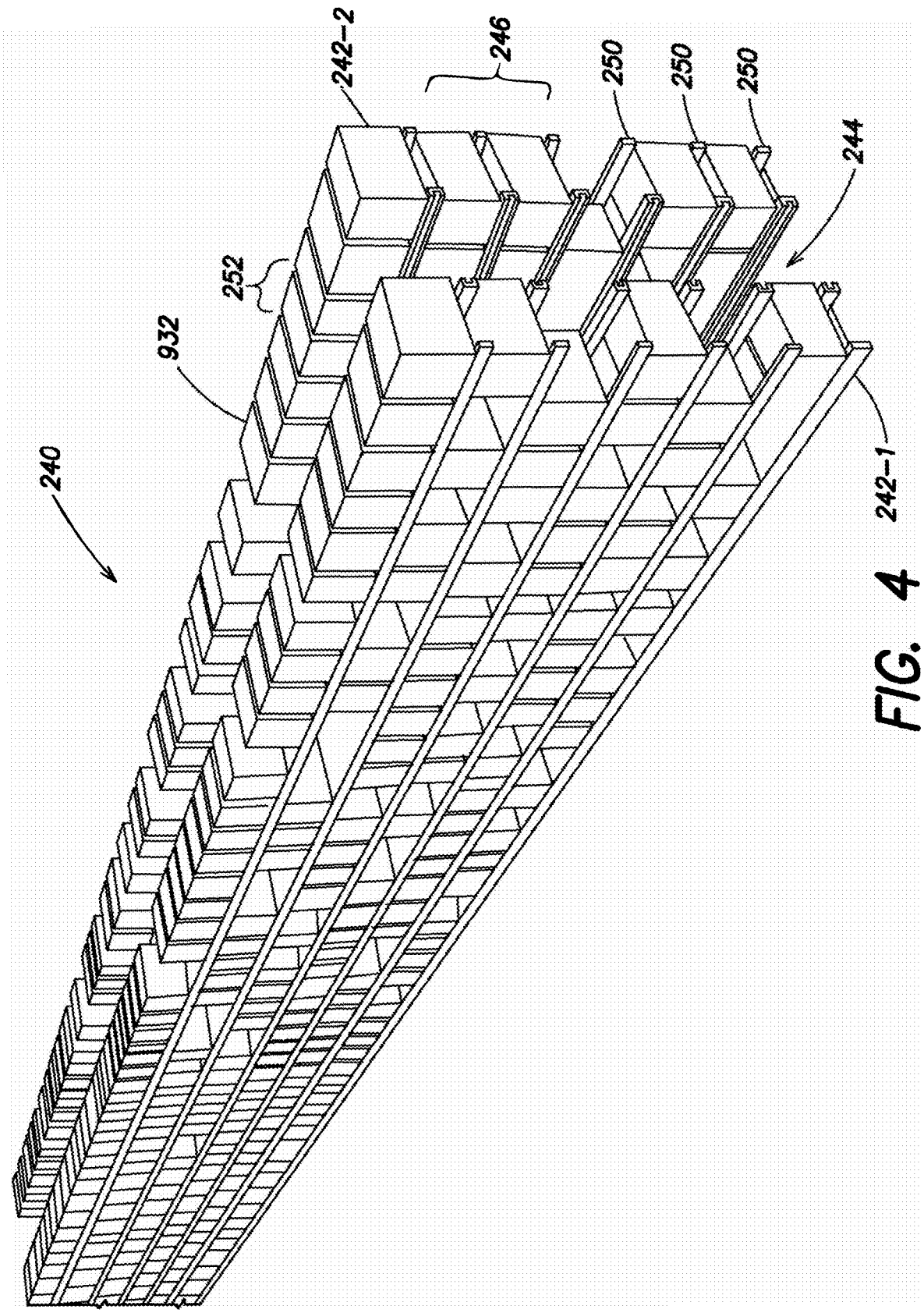
FIG. 4 shows a perspective view of an example multi-level rack structure for container storage according to various inventive implementations of the present application.

FIG. 4 shows an example container storage 164A with at least one multi-level storage rack structure 240 to store various items in the store 110 as described above. As shown, the multi-level storage rack structure 240 may include a pair of multi-level storage sections 242-1 and 242-2 that each include multiple shelves 250 to store multiple totes 932 in corresponding compartments 252 across multiple storage levels 246. The storage sections 242-1 and 242-2 may be separated by an aisle 244 to allow one or more robots (e.g., the robot 212) to access the totes 932 stored in the storage sections 242-1 and 242-2.

The robots may generally move horizontally through the aisle 244 and vertically up and down the storage sections 242-1 and 242-2 to access different storage levels 246. Furthermore, each robot may include a tote transfer mechanism (not shown) that may retrieve or return totes 932 from either storage sections 242-1 or 242-2 at any location within the multi-level storage rack structure 240. This may be accomplished, in part, by a rail structure (not shown) that constrains the robots to move horizontally along one vertical level 246 and one or more towers that constrain the robots to move vertically between vertical levels 246.

The multi-level storage rack structure 240 may thus provide the robots multiple pathways to access different compartments 252 in order to retrieve and/or return a tote 932. Said in another way, the robots have fully random access to any compartment 252 in the multi-level storage rack structure 240. In the event one robot fails or powers off while in the multi-level storage rack structure 240, the redundant pathways of the multi-level storage rack structure 240 allows other robots to take different paths to reach any compartment 252.

The multi-level storage rack structure 240 may generally be connected to other portions of the store 110 via an extended rail structure or a transit deck where robots may move along a 2D plane to enter or exit the aisle 244 of the multi-level storage rack structure 240. In some implementations, the multi-level storage rack structure 240 may provide multiple entry and exit points at different storage levels 246, thus allowing multiple robots to move into and out of the multi-level storage rack structure 240 at the same time.

The multi-level storage rack structure 240 may generally be used to store product totes as part of the inventory of the store 110. In some implementations, the container storage 164 may include multiple storage rack structure 240 in different temperature zones (e.g., room temperature, a chilled temperature, a frozen temperature) to store items in an appropriate temperature zone (e.g., milk in the chilled temperature zone, ice cream in the frozen temperature zone). In some implementations, the multi-level storage rack structure 240 may also store order totes after items are picked at the workstations 168 at least until the customer travels to the store 110. For example, the customer may place an online order in the evening and pick up the ordered items the following day. This may preferable particularly for order totes that contain frozen or chilled items, which may spoil if left in the storage structure 896 for extended periods of time. Additionally, using the multi-level storage rack structure 240 to store order totes may reduce the likelihood of the storage structure 896 reaching full capacity.

Additional examples of multi-level storage rack structures 240 may be found in U.S. Publication No. 2014/0288696 published Sep. 25, 2014, having U.S. application Ser. No. 14/213,187, filed on Mar. 14, 2014, and entitled "Automated system for transporting payloads" and U.S. Publication No. 2019/0270591 published Sep. 5, 2019, having U.S. application Ser. No. 16/419,910, filed on May 22, 2019, and entitled "Order fulfillment system", which are each incorporated herein by reference in its entirety for all purposes.

3.2 An Example Workstation

Figure 5:
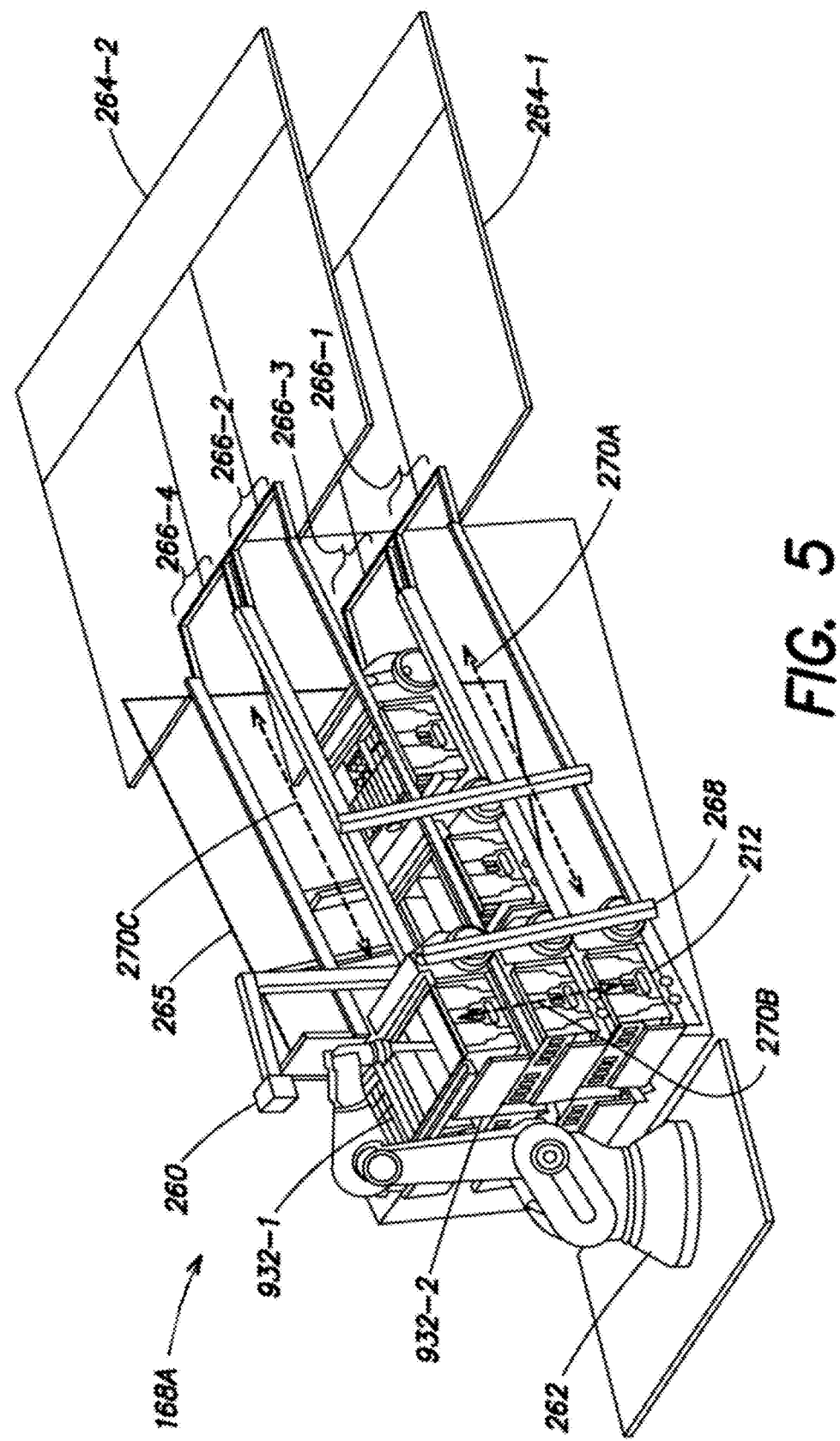
FIG. 5 shows a perspective view of an example workstation according to various inventive implementations of the present application.

FIG. 5 shows an example workstation 168A for the store 110, which may generally be used to transfer items between different totes 932-1 and 932-2, as described above. For example, the workstation 168A may be used to pick items from a product tote and transfer the items to an order tote to fulfill an online order. In another example, the workstation 168A may be used to pick returned items from a return tote and transfer the returned items to a product tote if the returned items are being restocked. In yet another example, the workstation 168A may be used to consolidate the same or similar items stored in different product totes. In other words, the workstation 168A may be used to facilitate the defragmentation of product totes in the container storage 164 to more efficiently store items in the store 110.

As shown, the workstation 168A may include a ramp structure 265 coupled to a pair of transit decks 264-1 and 264-2, a robotic picker 262 to pick and transfer items between the totes 932-1 and 932-2, and a machine vision system 260 to monitor and track the items being transferred. Thus, the workstation 168A provides an automated approach to pick items. However, it should be appreciated that, in some implementations, the workstations in the store 110 may also be human-operated where a worker manually picks and transfer items between the totes. Here, an additional user interface (e.g., a display screen with a GUI) may instruct the worker on what items should be picked and the quantity of those items.

The ramp structure 265 is designed to support two parallel flows of robots 212 so that robots 212 carrying one type of tote (e.g., a product tote) and robots 212 carrying another type of tote (e.g., an order tote) may enter and leave the workstation 168A simultaneously. This arrangement increases the efficiency and speed of the workstation 168A by allowing the totes 932-1 and 932-2 to be queued up and staged before items are removed or placed in the respective totes. Said in another way, the performance of the workstation 168A is primarily limited by the rate at which items are picked and not by the transport of totes to and from the workstation 168A via the robots 212.

This may be accomplished by the ramp structure 265 having a first pair of ramps 266-1 and 266-2 to support one flow of robots 212 entering and leaving the workstation 168A and a second pair of ramps 266-3 and 266-4 to support another flow of robots 212 entering and leaving the workstation 168A. As shown in FIG. 5, the pair of ramps 266-1 and 266-2 connect to transit decks 264-1 and 264-2, respectively, and to each other via a tower 268. Similarly, the pair of ramps 266-3 and 266-4 also connect to the transit decks 264-1 and 264-2, respectively, and each other via the tower 268. Thus, the robots 212 may enter and leave the workstation 168A at different levels and move between the ramps 266-1 and 266-2 or the ramps 266-3 and 266-4 via the tower 268. For example, the robot 212 may enter the workstation 168A from the transit deck 264-1 via the ramp 266-1 along a path 270A, move vertically upwards via the tower 268 along a path 270B so that the robotic picker 262 may remove or add items to the tote 932-2 carried by the robot 212, and exit the workstation 168A to the transit deck 264-2 via the ramp 266-2 along a path 270C. The workstation 168A also supports robots 212 following the reverse path (i.e., entering the workstation 168A via the path 270C and exiting the workstation 168A via the path 270A).

In some implementations, the robotic picker 262 may be a 6-axis articulated robot with a gripper arm (not shown) configured to grab items of various shapes and sizes. The machine vision system 260 may include one or more cameras disposed above and/or around the totes 932-1 and 932-2 at different viewing angles to record imagery of the items being transferred between the totes 932-1 and 932-2. The machine visions system 260 may further include a processor to perform various image processing (e.g., background subtraction) and object recognition based on, for example, the item's labeling, color, shape, and/or any identifiable product codes (e.g., UPC codes).

Additional examples of workstations 168 may be found in U.S. Patent Publication No. 2018/0305123 published Oct. 25, 2018, having U.S. application Ser. No. 15/956,346, filed on Apr. 18, 2018, and entitled "Picking workstation with mobile robots & machine vision verification of each transfers performed by human operators", U.S. Patent Publication No. 2018/0247257 published Aug. 30, 2018, having U.S. application Ser. No. 15/903,993, filed on Feb. 23, 2018, and entitled "Inventory management system and method", and U.S. Patent Publication No. 2020/0223630 published Jul. 16, 2020, having U.S. application Ser. No. 16/742,119, filed on Jan. 14, 2020, and entitled "System having workstation with tote retention and release mechanism", which are each incorporated herein in its entirety for all purposes.

3.3 Example Portals

Figure 6B:
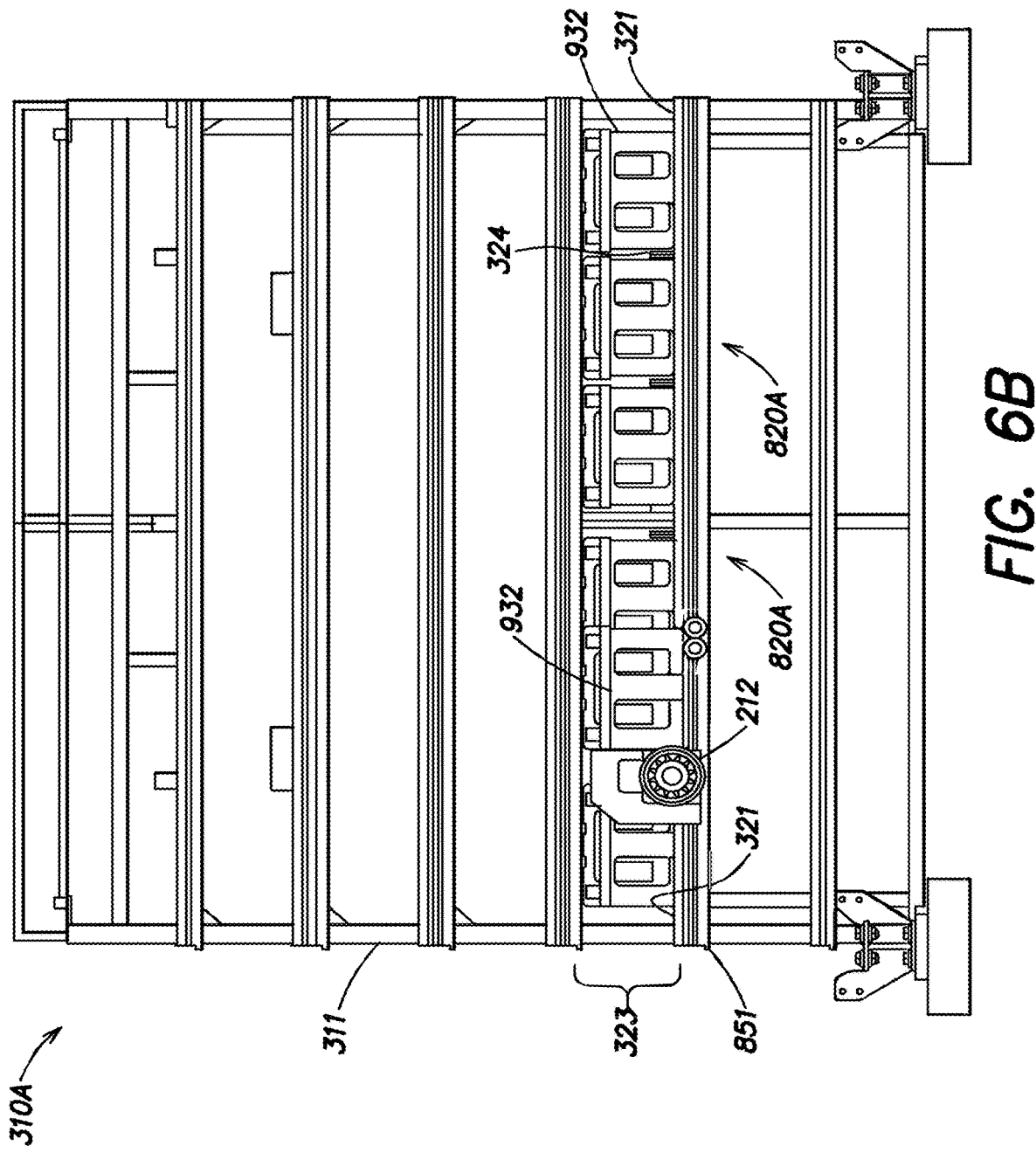
FIG. 6B shows a perspective interior view of the customer access portal of FIG. 6A.

FIGS. 6A and 6B show several views of the customer access portal 310A in the customer access system 1000A of FIGS. 3A-3C. As shown, the customer access portal 310A may include a frame 311 that provides the infrastructure for a wall (not shown) in which the customer access portal 310*a* is installed. The frame 311 may further support the various components of the customer access portal 310A and mechanically couple the customer access portal 310A to a rail structure 851 forming part of the tote transfer system 1010. The rail structure 851 may define an aisle 312 for one or more robots 212 to move along to facilitate the transport of totes 932 to and from the customer access portal 310A. The frame 311 may further define an opening 323 disposed adjacent to the rail structure 851 for the bots 212 to deliver and/or retrieve the totes 932 to and from a shelf 321 of a user interaction area 320.

It should be appreciated the use of a rail structure 851 and robots 212 to transport totes 932 to the customer access portal 310A is a non-limiting example. In another example, the tote transfer system 1010 may include one or more transit decks that allow the robots 212 to move along a 2D plane to access the customer access portal 310A. In another example, the tote transfer system 1010 may include one or more conveyor systems to transport totes 932 to and from the customer access portal 310A (see, for example, the tote transfer system 1010D shown in FIGS. 16A-17C). In yet another example, the customer access portal 310A may interface with one or more racks (see, for example, the racks 904 in the customer access system 1000B and 1000C of FIGS. 12A-12C and 14A-14C).

The user interaction area 320 and the shelf 321 defines a space to temporarily store and hold the totes 932 so that the customer may directly retrieve ordered items from the tote 932 or place returned items into the tote 932. In other words, the user interaction area 320 may be a tote location 820A. As shown, the tote location 820A may generally support multiple totes 932 at one time. On average, a typical customer order may include multiple totes 932 to store the various ordered items. Thus, the customer access portal 310A may dispense multiple items from multiple order totes to the customer at the same time. Likewise, multiple totes may be presented via the customer access portal 310A in the event the customer returns multiple items that cannot be stored in one tote 932. For example, FIGS. 6A and 6B show the customer access portal 310A may include two tote locations 820A that each support up to three totes 932.

The shelf 321 may further include a tote retention mechanism 324 to securely couple the totes 932 to the shelf 321.

In some implementations, the user interaction area 320 may also include a tilt mechanism (not shown) to present the totes 932 to the customer at an inclined angle for greater ease of access. Generally, when one or more totes 932 are loaded into the user interaction area 320 for the customer, the tilt mechanism may rotate the shelf 321 and orient the totes 932 at an inclined before the customer arrives or right as the customer accesses the customer access portal 310A. When one or more totes 932 are unloaded by one or more robots 212, the tilt mechanism may orient the totes 932 horizontally so that the robots 212 may retrieve the totes 932. FIG. 6A further shows the customer access portal 310A may include one or more access panels 313 to cover a service compartment 315 below the user interaction area 320. When a worker or technician services the customer access portal 310A, the access panels 313 may be removed to provide access, for example, to the tilt mechanism and/or other components of the customer access portal 310A.

The rail structure 851 and the robots 212 may generally pose an injury risk to the customer. First, the rail structure 851 may be electrified, thus creating an electrical shock hazard. Second, the robot 212 generally includes several movable parts that may cause physical injury to the customer. In order to safely control the customer's access to the user interaction area 320, the customer access portal 310A may further include an interior safety door 318 and an external portal door 314. The combination of the interior safety door 318, the external portal door 314, and the user interaction area 320 may constitute a dispense mechanism 1030A.

The interior safety door 318 may close off the opening 323 when the customer interacts with the user interaction area 320 to prevent access to the aisle space 312 and/or the robots 212 behind the customer access portal 310A. In some implementations, the safety door 318 may close at the same time the tilt mechanism is actuated to orient the totes 932 at the inclined angle. Although the safety door 318 should be closed before the customer is able to access the user interaction area 320, in some implementations, the safety door 318 may nevertheless be designed to avoid finger and/or hand entrapment risks with the shelf 321 and/or the tilt mechanism. This may be achieved, for example, by positioning the safety door 318 such that a sufficiently large gap is formed between the safety door 318 and the shelf 321 regardless of the orientation of the shelf 321.

The external portal door 314 may similarly control the customer's access to the user interaction area 320. Specifically, when the one or more totes 932 are being loaded or unloaded from the shelf 321 or when no customer is actively using the customer access portal 310A, the external portal door 314 may close off the user interaction area 320. In some implementations, the interior safety door 314 may be closed, the external portal door 318 opened, and the shelf 321 tilted to the inclined angle via the tilt mechanism at the same time when the customer uses the customer access portal 310A. Likewise, the interior safety door 314 may be opened, the external portal door 318 closed, and the shelf 321 tilted to a horizontal orientation via the tilt mechanism at the same time when one or more totes 932 are loaded or unloaded from the customer access portal 310A.

In some implementations, the interior safety door 318 and the external portal door 314 may be retractable doors that are vertically oriented when closed. For example, the interior safety door 318 and the external portal door 314 may each be a unitary component (e.g., a one-piece door) that slidably moves along a vertical direction. In another example, the interior safety door 318 and the external portal door 314 may include multiple slats and/or panels that are hinged together and thus may be rolled or folded into a more compact size when opened.

The customer access portal 310A may further include a user interface 316A to facilitate customer interaction with the customer access portal 310A. The user interface 316A may be a physical device directly mounted to the customer access portal 310A and may generally include a display, a scanner, a microphone, a camera, a keypad, and/or a speaker. In implementations where the user interface 316A includes a display screen, the user interface 316A may provide a GUI to guide and instruct the customer when using the customer access portal 310A. For example, the GUI may provide the customer different types of transactions when using the customer access portal 310A, such as picking up ordered items and returning items. In some implementations, the user interface 316A may include a scanner for the customer to scan a QR code, a bar code, a product code to identify the customer's order before the customer is able to pick up ordered items or return items. Additionally, the user interface 316A may provide the customer the option to swipe a credit card to similarly identify the customer's order and/or to pay for an order. It should be appreciated that, in some implementations, the customer access portal 310A may not include the user interface 316A, but instead may rely upon a user interface 316B, which may include a computing device with a software application that provides the customer access to the customer access portal 310A. For example, the computing device may be a customer's home computer, cellular device, a smartphone, and/or a tablet.

The customer access portal 310A may further include one or more cameras 322 disposed within the user interaction area 320 above the totes 932 to acquire imagery and/or video of the totes 932 and the items stored in the totes 932. The imagery and/or video may be analyzed by an onboard processor (not shown) to verify the correct items are stored in each tote 932, detect items missing from the totes 932, and/or obstructions in the user interaction area 320 that may prevent proper operation of the customer access portal 310A and/or pose a safety hazard to the customer.

Additional examples of a customer access portal 310 with an interior safety door and an external portal door may be found in U.S. Patent Publication No. 2020/0223630 published Jul. 16, 2020, having U.S. application Ser. No. 16/742,119, filed on Jan. 14, 2020, and entitled "System having workstation with tote retention and release mechanism", which is incorporated herein in its entirety for all purposes.

FIG. 7 shows a portion of another example customer access portal 310B that includes a drawer 860A where a tote 932 is loaded directly into the drawer 860A and unloaded directly from the drawer 860A. The drawer 860A may generally be a rectangular-shaped container configured to slidably move between a closed position to facilitate loading and/or unloading of the tote 932 via the tote transfer system 1010 and an open position for the customer to pick up ordered items directly from the tote 932 and/or place returned items directly into the tote 932. In some implementations, the drawer 860A may only allow the customer access to the drawer 860A in the open position. Likewise, the drawer 860A may only allow access to the tote transfer system 1010 when the drawer 860A is in the closed position. In this example, the drawer 860A may constitute a dispense mechanism 1030B.

As shown, the drawer 860A may include a pair of sidewalls 862A disposed opposite to one another, a front side 862B, and a bottom side 862C that are joined together to define a drawer compartment 861. The drawer 860A may further include a rear opening 868 for the tote 932 to move into or out from the drawer compartment 861. Furthermore, the drawer 860A may have an open top portion 864 to provide access into the drawer compartment 861. When the tote 932 is loaded into the drawer compartment 861, the open top portion 864 may provide access to a tote compartment 278 through an open top portion 277 of the tote 932.

In some implementations, the drawer 860A may be positioned proximate to a rail structure 851 disposed on the rear side of the drawer 860A. The rail structure 851 may define an aisle 852 to guide and constrain the movement of one or more robots 212 to facilitate transport of the tote 932 to and from the customer access portal 310B. The rail structure 851 and the robots 212 may form part of the tote transfer system 1010. As shown in FIG. 7, the robot 212 may be positioned directly adjacent to the drawer 860A when the drawer 860A is in the closed position to facilitate loading and/or unloading of the tote 932. Specifically, the robot 212 may include a tote transfer mechanism 930 to slidably move the tote 932 into or out of the drawer compartment 861 through the opening 868. In this manner, the drawer compartment 861 may define a tote load location 820B for the customer access portal 310B. The drawer 860A may further include a retention mechanism (not shown) to securely couple the tote 932 to the drawer 860A until the tote 932 is unloaded via the robot 212. Additional examples of tote transfer mechanisms 930 may be found in U.S. Publication No. 2019/0270591 published Sep. 5, 2019, having U.S. application Ser. No. 16/419,910, filed on May 22, 2019, and entitled "Order fulfillment system", which is incorporated herein in its entirety for all purposes.

The drawer 860A may also include a flange 865 joined to the sidewalls 862A and the front side 862B that covers a portion of the open top portion 864. The flange 865 be positioned to cover the respective edges of the tote 932 that define the open top portion 277, thus preventing removal of the tote 932 through the open top portion 864 of the drawer 860A. In some implementations, the drawer 860A may also include a handle 866 disposed on the front side 862B for the customer to pull the drawer 860A out to the open position and/or push the drawer 860A into the closed position. Generally, the drawer 860A may also include a locking mechanism (not shown) to prevent the customer from opening the drawer 860A without proper access. For example, the locking mechanism may lock the drawer 860A in the closed position. When the customer gains access to the customer access portal 310B via the user interface 316A or the user interface 316B, the locking mechanism may be unlocked allowing the customer to move the drawer 860A to the open position. In some implementations, the drawer 860A may include a light indicator 867 to inform the customer whether the drawer 860A is locked or unlocked.

As shown in FIG. 7, the drawer 860A may be configured to contain a single tote 932. In some implementations, the dimensions of the drawer 860A may be substantially similar to the dimensions of the tote 932 so that the space in the drawer compartment 861 is fully utilized. In implementations where the drawer 860A is formed as a thin-walled structure (e.g., via sheet metal), the interior dimensions may be approximated as equal to the exterior dimensions for purposes of comparing relative dimensions of the drawer 860A to the tote 932. For example, the drawer 860A may have an exterior length, $l_d$, an exterior width, $w_d$, and an exterior height, $h_d$. The exterior length, $l_d$, may be about 22 inches. More generally, the exterior length, $l_d$, may range from about 16 inches to about 28 inches. The exterior width, $w_d$, may be about 14 inches. The exterior height, $h_d$, may be about 10 inches. More generally, the exterior height, $h_d$, may range from about 6 inches to about 14 inches.

It should be appreciated that, in some implementations, the drawer 860A may accommodate multiple totes 932. For example, the drawer 860A may generally accommodate from one tote 932 up to ten totes 932. This may be accomplished, for example, by increasing the width of the drawer 860A in increments equal to at least the exterior width of the tote 932. For example, if the exterior width of the tote 932 is about 14 inches, then the width, $w_d$, of the drawer 860A may be equal to about 14 inches (i.e., one tote), about 24 inches (i.e., two totes), about 36 inches (i.e., three totes), about 48 inches (i.e., four totes), about 60 inches (i.e., five totes), about 72 inches (i.e., six totes), about 84 inches (i.e., seven totes), about 96 inches (i.e., eight totes), about 108 inches (i.e., nine totes), or about 120 inches (i.e., ten totes). More generally, the exterior width, $w_d$, may range from about 10 inches to about 124 inches.

The term "about" and "substantially," when used to describe the dimensions of the drawer 860A, are intended to cover manufacturing tolerances. For example, "about 22 inches" may correspond to the following dimensional ranges: 21.78 to 22.22 inches (+/−1% tolerance), 21.824 to 22.176 inches (+/−0.8% tolerance), 21.868 to 22.132 inches (+/−0.6% tolerance), 21.912 to 22.088 inches (+/−0.4% tolerance), 21.956 to 22.044 inches (+/−0.2% tolerance), including all values and sub-ranges in between.

Figure 8B:
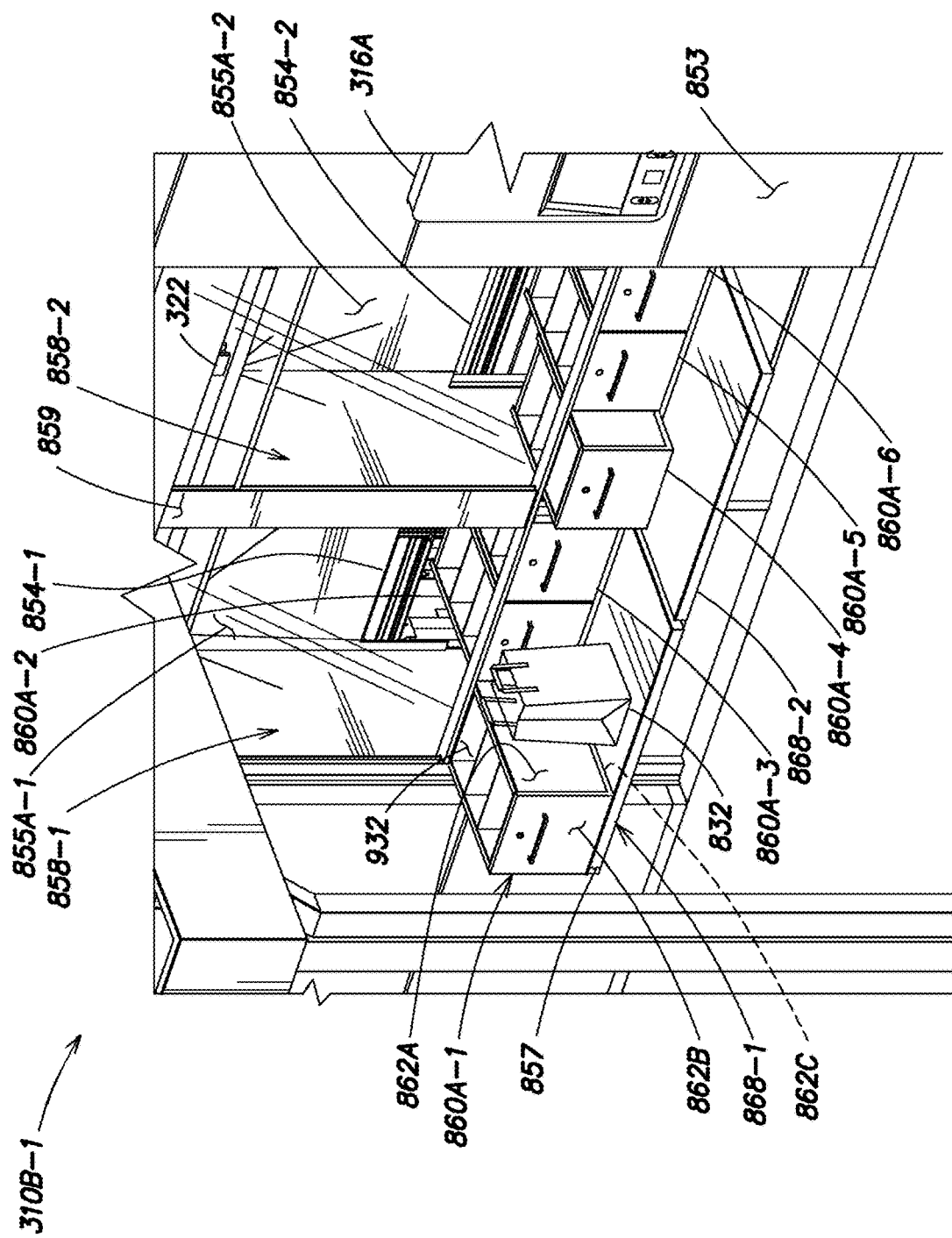
FIG. 8B shows an exterior perspective view of the customer access portal of FIG. 8A where the customer access portal includes a window so that customers may view the interior portions of the customer access portal where the drawers are loaded and unloaded with totes.
Figure 8C:
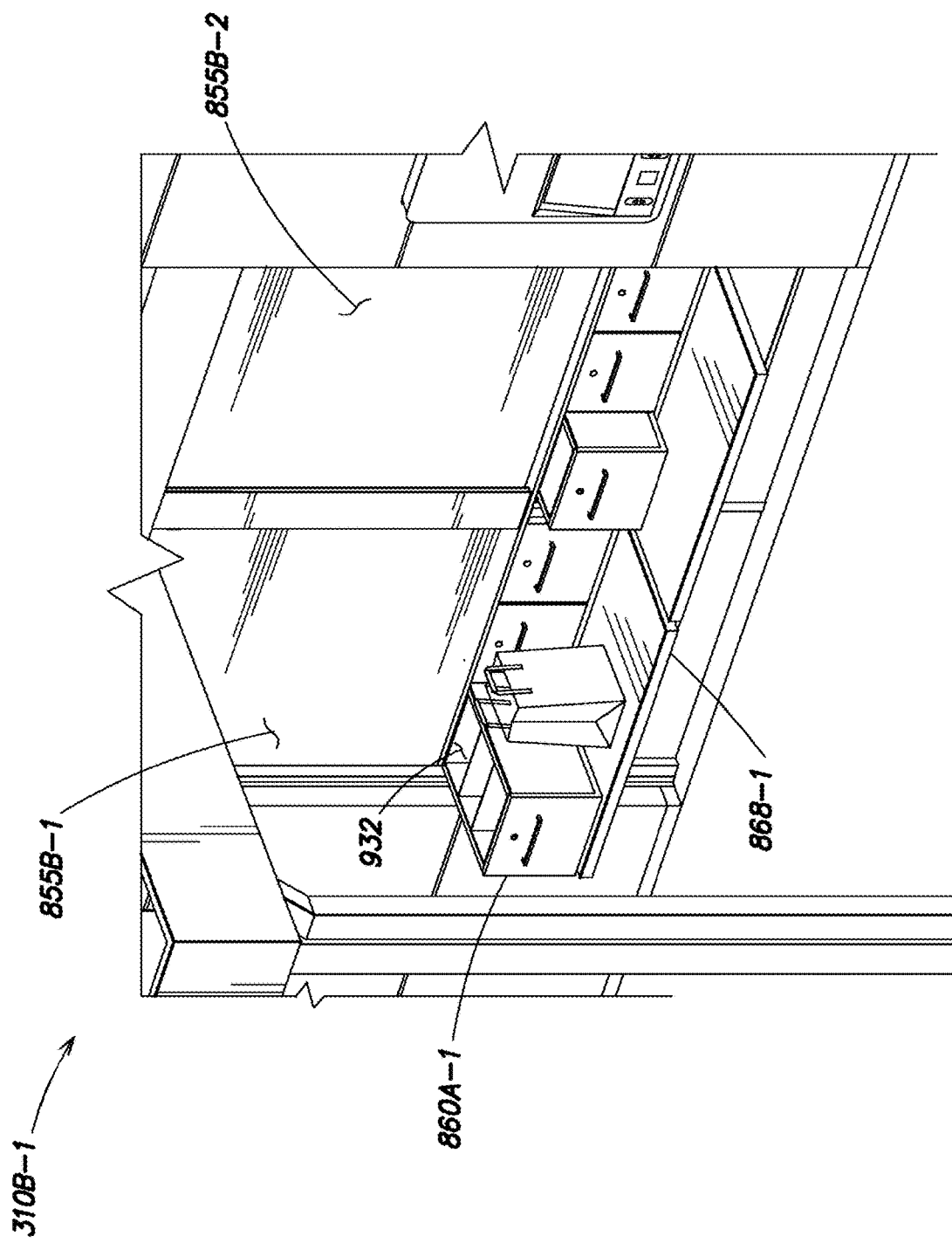
FIG. 8C shows an exterior perspective view of the customer access portal of FIG. 8A where the customer access portal includes an opaque wall so that customers are unable to view the interior portions of the customer access portal.

FIGS. 8A-8C show a pair of customer access portals 310B-1 and 310B-2 that each incorporate multiple drawers 860A as described above. As shown, the customer access portals 310B-1 and 310B-2 may be oriented in opposite directions such that the rear sides of the customer access portals 310B-1 and 310B-2 face each other. The customer access portals 310B-1 and 310B-2 may further be separated by the aisle 852 defined by the rail structure 851. In this configuration, the robot 212 may transport totes 932 to and from either the customer access portals 310B-1 and 310B-2. Said in another way, the customer access portals 310B-1 and 310B-2 may share the same tote transfer system 1010. The customer access portals 310B-1 and 310B-2 may be identical.

FIG. 8B shows the customer access portal 310B-1 includes multiple drawers 860A (i.e., drawers 860A-1-860A-6) mounted to a structure 853. For simplicity, the details of the mechanisms that facilitate sliding of the drawers 860A with respect to the structure 853 are not shown in FIG. 8B. However, it should be appreciated that various sliding mechanisms that are well known in the art may be implemented. For example, one or more sliding rails may be mounted to the respective sidewalls 862A and the wall 853.

The structure 853 may generally include at least one interior space to accommodate the drawers 860A when the drawers 860A are in the closed position. For example, the customer access portal 310B-1 includes interior spaces 858-1 and 858-2 to accommodate the drawers 860A-1-860A-3 and the drawers 860A-4-860A-6, respectively. As shown, the structure 853 may also include a barrier 859 to separate the interior spaces 858-1 and 858-2 and thus separate the drawers 860A-1-860A-3 and the drawers 860A-4-860A-6. This arrangement may be used to define different sections of the customer access portal 310B-1 to service, for example, two customers at the same time.

The interior spaces 858-1 and 858-2 may each be a partially enclosed space with respective rear openings 854-1 and 854-2 for the robots 212 to load and unload totes 932 from the drawers 860A. The interior spaces 858-1 and 858-2 may further include respective outer walls 858-1 and 858-2 with openings disposed below the outer walls 855A-1 and 855A-2 for the drawers 860A-1-860A-6 to pass through. As shown in FIG. 8B, in some implementations, the outer walls 855A-1 and 855A-2 may be windows that allow the customer to see into the interior spaces 858-1 and 858-2 and thus observe totes 932 being loaded and/or unloaded. However, it should be appreciated that, in some implementations, the outer walls may be opaque. For example, FIG. 8C shows the customer access portal 310B-1 with opaque outer walls 855B-1 and 855B-2.

The customer access portal 310B-1 may further include shelves 868-1 and 868-2 (also referred to herein individually as a "shelf 868") to provide the customer a platform to more conveniently transfer items to and from the drawers 860A. For example, FIG. 8B shows the customer may place a bag 832 onto the shelf 868-1 to more easily transfer ordered items and/or returned items to and from the bag 832. Generally, the customer access portal 310B-1 may include one or more shelves 868 for the customer. As shown, the shelves 868 may generally be disposed below the drawers 860A. In some implementations, the shelf 868 may be disposed directly below the drawers 860A to reduce or, in some instances, eliminate gaps formed between the bottom side 862C of the drawer 860A and the shelf 868, thus reducing finger and/or hand entrapment hazards. In some implementations, the shelf 868 may also shaped and dimensioned such that a front side 857 of the shelf 868 is aligned flushed or substantially flushed with the front side 862B of the drawer 860A when the drawer 860A is in the open position.

FIG. 8B further shows the customer access portal 310B-1 may also include the user interface 316A for the customer to interact access the customer access portal 310B-1. The customer access portal 310B-1 may also include one or more cameras 322 disposed within each of the interior spaces 858-1 and 858-2 to track and monitor the items stored in each of the totes 932. The customer access portal 310B may also be accessible via the user interface 316B described above, which may provide the customer an alternate way to access the customer access portal 310B. In some implementations, the customer access portal 310B may not include the user interface 316A entirely and instead rely on the user interface 316B to facilitate access to the customer access portal 310B.

FIGS. 9A-9F show another example customer access portal 310C with drawers 860B-1 and 860B-2 (also referred to herein individually as a drawer 860B) where one or more items are transferred from one or more totes 932 directly into the drawer 860B to facilitate dispensing of the item(s). In some implementations, the customer access portal 310C may be used to facilitate automated loading of items into bags. Specifically, the customer may load one or more bags 832 into the drawer 860B so that items may be directly dispensed into the bags 832, thus eliminating the need for the customer to manually transfer items from the drawer 860B to the bag(s) 832. The bag 832 may be provided by the customer or the store 110. However, it should be appreciated that the customer access portal 310C may also dispense items directly into the drawer 860B and the customer may thereafter transfer items from the drawer 860B to one or more bags. In this example, the drawer 860B may constitute a dispense mechanism 1030C.

The drawer 860B may be slidably coupled to a structure 853 supporting the customer access portal 310C. Similar to the drawer 860B, the drawer 860A may be slidably movable between an open position for the customer to pick up ordered items and/or return items and a closed position where the drawer 860B may receive items from the totes 932 disposed above on the shelves 834. Again, for simplicity, the details of the mechanisms that facilitate sliding of the drawers 860B with respect to the structure 853 are not shown in FIGS. 9A-9F. However, it should be appreciated that various sliding mechanisms that are well known in the art may be implemented. For example, one or more sliding rails may be mounted to the respective sidewalls of each drawer 860B.

The customer access portal 310C includes shelves 834 that are disposed above the drawers 860B-1 and 860B-2 when the drawers 860B-1 and 860B-2 are in the closed position. Each shelf 834 may support one or more totes 932. Thus, the shelves 834 may define tote locations 820C-1 and 820C-2 that align with the drawers 860B-1 and 860B-2, respectively. The tote 932 may be loaded onto and unloaded from the shelf 834 via a rear opening (not shown) behind the shelf 834. In some implementations, the customer access portal 310C may be coupled to a rail structure forming a portion of the tote transfer system 1010 with one or more robots to transport totes 932 to and from the customer access portal 310C similar to the customer access portal 310B. However, it should be appreciated that, in some implementations, the tote transfer system 1010 may include other mechanisms to transport the totes 932 to and from the customer access portal 310C, such as a conveyor system or one or more racks, as described in detail further below.

To transfer items from the tote 932 to the drawer 860B, the bottom side of each tote 932 may include hopper doors 836 (also referred to herein as "trap door bottoms 836") that open to drop the items from the tote 932 into the drawer 860B. The shelf 834 may also include one or more openings to allow the hopper doors 836 to open as shown in FIG. 9E. In some implementations, the shelf 834 be positioned directly above the drawer 860B to reduce the distance the items fall from the tote 932 to the drawer 860B. In some implementations, the drawer 860B may include cushions and/or padding (not shown) to soften the fall of the items, thus reducing or, in some instances, eliminating the likelihood of an item being damaged when transferred to the drawer 860B.

In implementations where the customer access portal 310C is used to automated loading of items into bags 832, the hopper doors 836 of the tote 932 may be triggered to open only when (1) the drawer 860B is in the closed position, (2) tote 932 is fully loaded onto the shelf 834, and (3) a bag 832 is present in the drawer 860B to receive the items from the tote 932. In implementations where the customer transfer items from the drawer 860B to a bag located outside the drawer 860B, the hopper doors 836 of the tote 932 may be triggered to open only when (1) the drawer 860B is in the closed position and (2) tote 932 is fully loaded onto the shelf 834.

In this implementation, the drawer 860B may be configured to receive items from multiple totes 932 at one time. For example, FIGS. 9A-9F show the drawers 860B-1 and 860B-2 may each receive items from up to three totes 932 disposed on the shelves 832 above. As shown, the drawer 860B may be shaped and/or dimensioned to have a tote compartment 861 that is sufficiently large to accommodate and receive the items from the multiple totes 932. In some implementations, the drawer 860B may have dimensions equal to multiple totes 932 placed side by side. For example, the drawer 860B-2 may have a width, $w_d$, that is about equal to three times the exterior width, $w_t$, of the totes 932. More generally, width of the drawer 860B may be equal to about 14 inches (i.e., one tote), about 24 inches (i.e., two totes), about 36 inches (i.e., three totes), about 48 inches (i.e., four totes), about 60 inches (i.e., five totes), about 72 inches (i.e., six totes), about 84 inches (i.e., seven totes), about 96 inches (i.e., eight totes), about 108 inches (i.e., nine totes), or about 120 inches (i.e., ten totes). More generally, the exterior width, $w_d$, may range from about 10 inches to about 124 inches.

The drawer 860B may further include one or more dividers 833 that divide the tote compartment 861 into smaller sections 869 where each section 869 may receive items from one tote 932. Each section 869 may be dimensioned to be similar to the exterior dimensions of the tote 932. For example, the section 869 may have a height of about 10 inches, a width of about 14 inches, and a length of about 22 inches. In implementations where items are dispensed into bags 832, the dividers 833 in conjunction with the sides of the drawer 860B may also include one or more structural features to hold the bags 832 open. The structural features may include, but are not limited to, a hook, a clamp, and a strap. Although any size and/or shaped bags 832 may generally be placed into each section 869, in some implementations, it may be preferable for the bag 832 to have dimensions similar to the section 869 to ensure the items fall into the bag 832. For example, the bag 832 may have a width of about 14 inches and a length of about 22 inches.

In some implementations, the drawers 860B-1 and 860B-2 and the tote locations 820C-1 and 820C-2 may be separated by a barrier 859. Similar to the customer access portal 310B, the barrier 859 may define different sections of the customer access portal 310C to service one or more customers at a time. FIGS. 9A-9F further show the customer access portal 310C may include an outer window for the customer to see the totes 932 loaded on the shelves 834. It should be appreciated that, in some implementations, opaque outer walls may be installed in the customer access portal 310C in place of the windows.

Figure 9A:
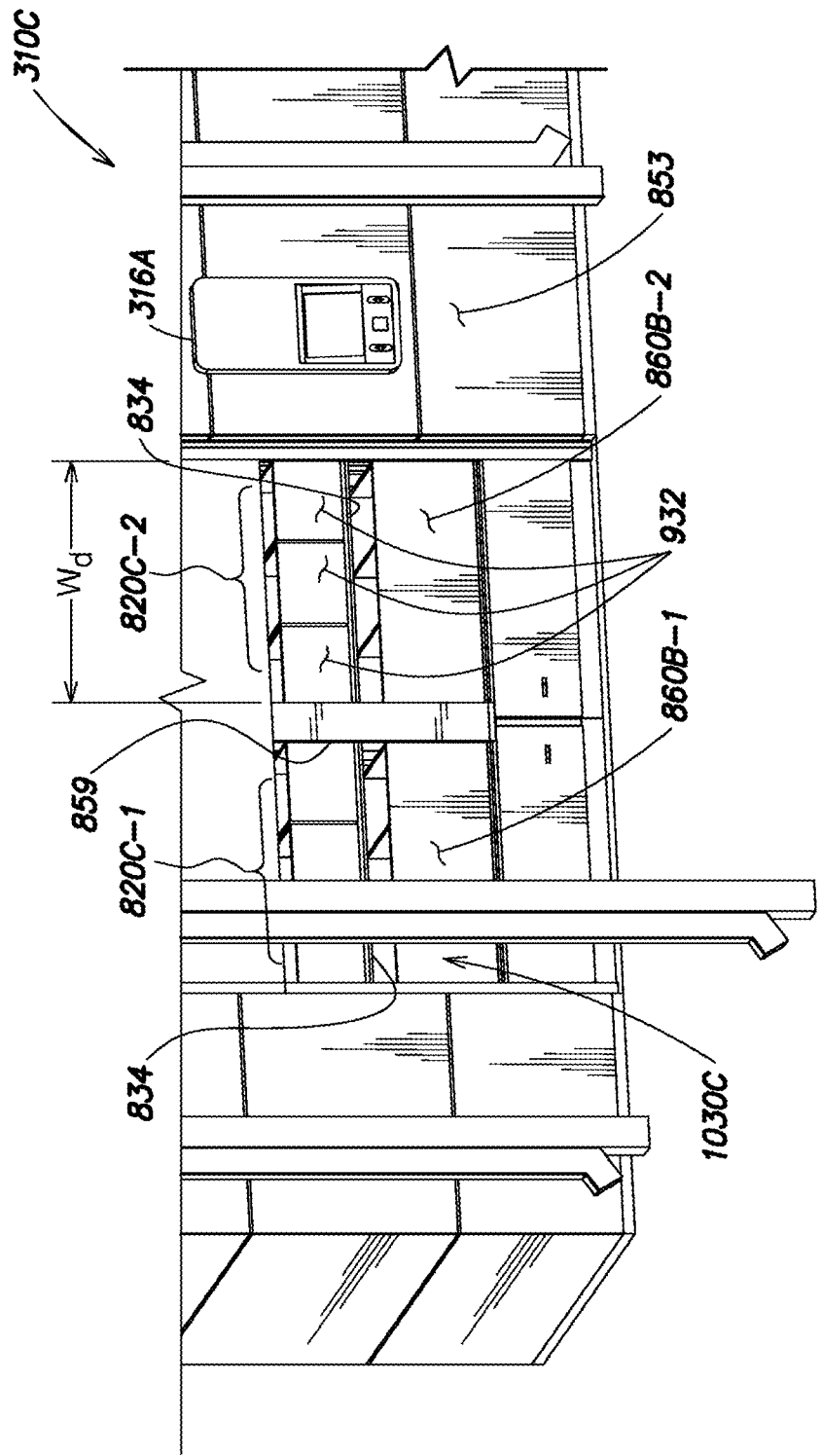
FIG. 9A shows an exterior perspective view of another example customer access portal with a drawer to hold one or more bags to facilitate automated loading of items into the bag(s) according to various inventive implementations of the present application. The drawer is shown in a closed position.

FIG. 9A further shows the customer access portal 310C may also include the user interface 316A for the customer to interact access the customer access portal 310C. The customer access portal 310C may also include one or more cameras (not shown) disposed above the totes 932 to monitor and track the items stored in the totes 932. In some implementations, one or more cameras and/or sensors maybe disposed in or near the drawer 860B to detect whether a bag 832 is loaded into the drawer 860B. The customer access portal 310C may also be accessible via the user interface 316B described above, which may provide the customer an alternate way to access the customer access portal 310C. In some implementations, the customer access portal 310C may not include the user interface 316A entirely and instead rely on the user interface 316B to facilitate access to the customer access portal 310C.

The following is one example process of dispensing items to a customer using the customer access portal 310C. Initially, one or more totes 932 containing a customer's ordered items (i.e., the tote(s) 932 are order totes) may be loaded into the tote location 820C-1 of the customer access portal 310C via the tote transfer system 1010. This may occur before the customer arrives at the customer access portal 310C. For example, the customer may send a message to the customer access system 1000 that they are in transit to the store 110, thus triggering the transport and loading of the totes 932 in the customer access portal 310C. In another example, the customer may schedule a pickup time in advance and the totes 932 may be transported and loaded into the customer access portal 310C based on the pickup time. This may also occur right as the customer is interacting with the customer access portal 310C, for example, via the user interface 316A.

Figure 9B:
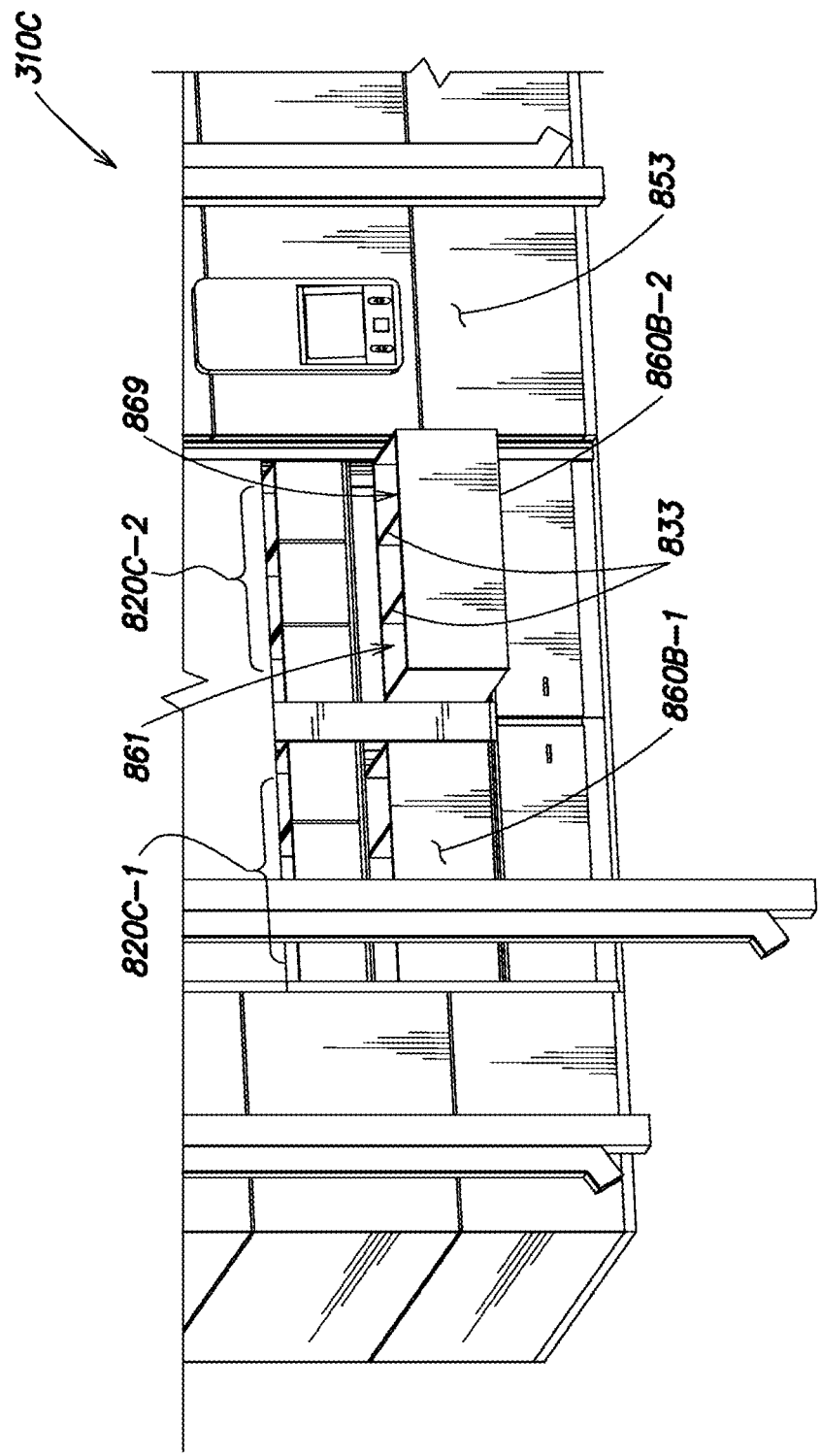
FIG. 9B shows the exterior perspective view of the customer access portal of FIG. 9A where the drawer is in an open position to receive one or bags from the customer.
Figure 9E:
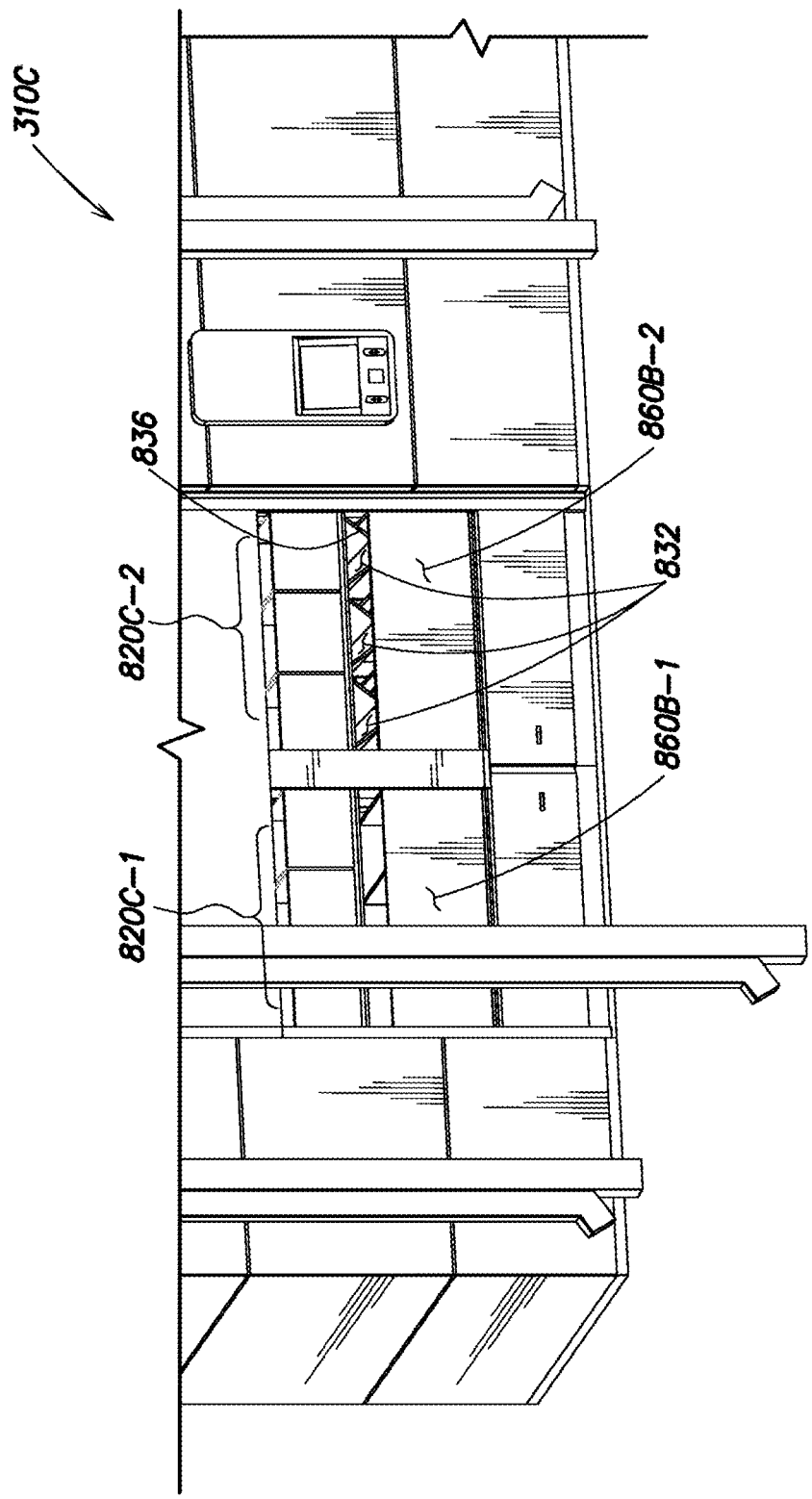
FIG. 9E shows the exterior perspective view of the customer access portal of FIG. 9D where the drawer is in the closed position and totes locate above the drawer are opened to drop down items into the bags.

Once the customer gains access to the customer access portal 310C (e.g., via scanning a unique code for their order or swiping a credit card), the drawer 860B-1 may unlock, allowing the customer to pull the drawer 860B-1 out to the open position as shown in FIG. 9B. The customer may then load one or more bags 832 into the respective sections 869 of the drawer 860B as shown in FIG. 9C. It should be appreciated that, in some implementations, the bag(s) 832 may be cooler bags to facilitate storage of chilled or frozen items. Once customer access portal 310C may then verify the bag(s) 832 are properly loaded (e.g., via a camera or a sensor), the drawer 860B may then be pushed by the customer as shown in FIG. 9D. Once the drawer 860B is in the closed position, the hopper doors 836 of the tote(s) 932 may open, thus dispensing the items into the bag(s) 832 as shown in FIG. 9E. After the items are dispensed into the drawer 860B, the drawer 860B may then be pulled out to the open position again by the customer to retrieve the bags 832 with the items. Thereafter, the drawer 860B may be pushed back into the closed position to await the next order. After the items are dispensed from the tote(s) 932, the tote(s) 932 may be unloaded from the customer access portal 310C at the same time the customer is retrieving the bags 832 or after the drawer 860B is returned to the closed position.

In some implementations, the drawer 860B may be motorized and thus may move between the open and closed positions automatically. For example, the customer may press a button on the user interface 316A to move the drawer 860B to the closed position automatically after the empty bags 832 are loaded and/or the bags 832 filled with the ordered items are retrieved.

3.4 Example Tote Transfer Systems and Storage Structures

Figure 10B:
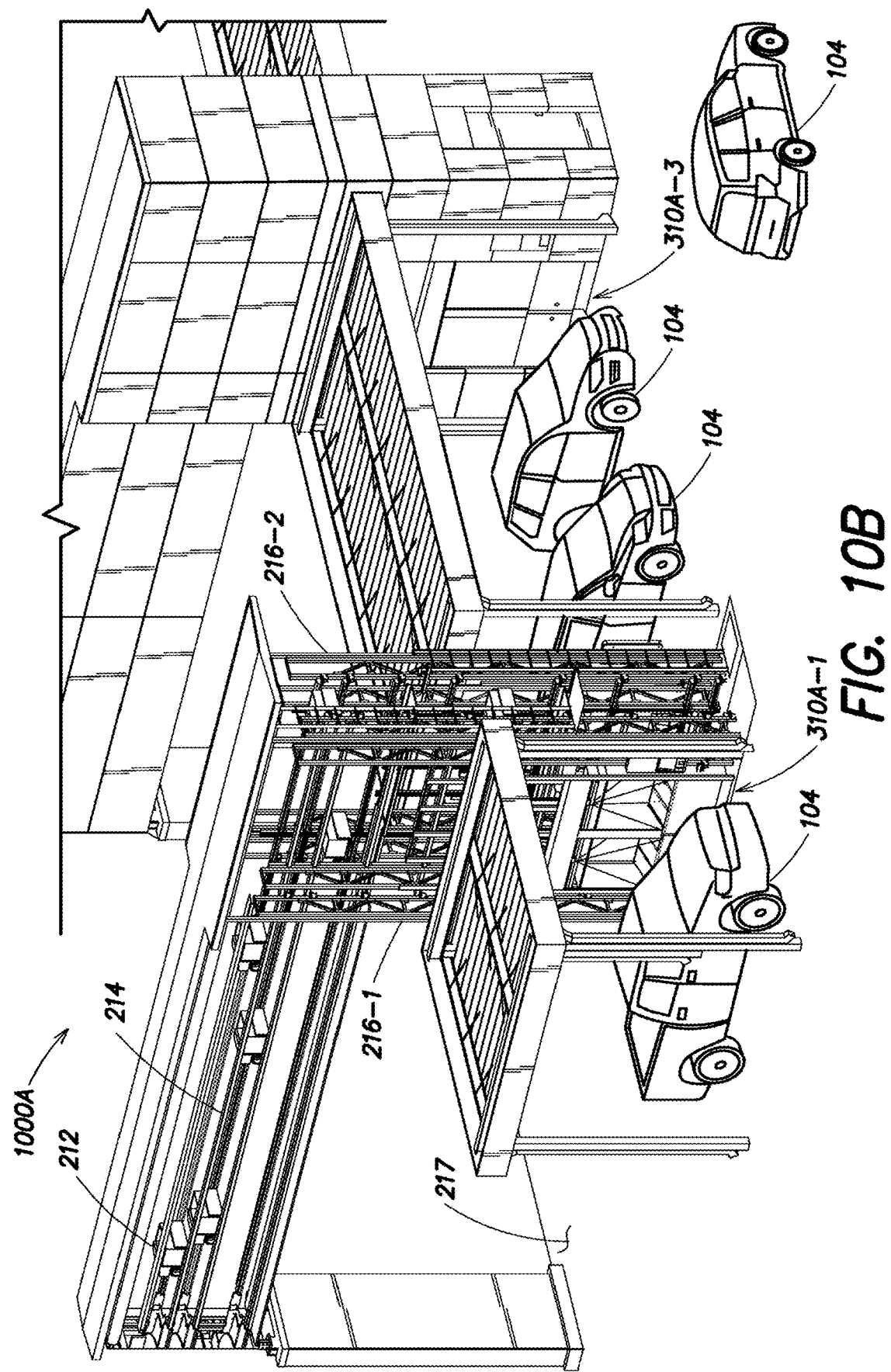
FIG. 10B shows a perspective view of the tote transfer system of FIG. 10A.

FIGS. 10A-10C show several views of the tote transfer system 1010A in the customer access system 1000A of FIGS. 3A-3C. As shown, the tote transfer system 1010A may include a rail structure 213 for robots 212 to move and transport totes 932 between the G2P system 160 and the customer access portals 310A-1-310A-6. The tote transfer system 1010A and the customer access portals 310A-1-310A-6 may be disposed outside the store 110A, in part, so that customers 104 may pull up in their vehicles directly adjacent to one of the customer access portals 310A-1-310A-6 and pick up ordered items and/or return items.

The rail structure 213 may include multiple transit rails 214-1 and 214-2 coupled to the G2P system 160 at an elevated location above a ground level 217 to provide more space for customers to move around and access the customer access portals 310A-1-310A-6. For example, FIG. 10B shows multiple customers 104 may pull up next to one of the customer access portals 310A-1-310A-6 similar to a gas station. By positioning the transit rails 214-1 and 214-2 above the ground level 217, the customers 104 may have more paths to drive and maneuver their vehicles as they arrive and/or leave the store 110.

As shown in FIG. 10A, this arrangement may be accomplished, in part, by connecting, for example, the transit rail 214-1 to a tower 216-1 and the transit rail 214-2 to a tower 216-2. The towers 216-1 and 216-2 allow the robots 212 to move vertically from the elevated position to the ground level 217 where the customer access portal 310A is located. The towers 216-1 and 216-2 may also define a storage structure 896C with one or more shelves 250 to store one or more totes 932 near the customer access portal 310A. As shown, the shelves 250 may be directly integrated into the structure forming the towers 216-1 and 216-2 and thus may be accessible as the robots 212 move vertically up and down along the towers 216-1 or 216-2. In some implementations, the rail structure 213 may provide a linear path 218 for robots 212 to move along. For example, the robot 212 may enter the tote transfer system 1010A via the transit rail 214-1. Once the robot 212 intersects the tower 216-1, the robot 212 may move vertically downwards via the tower 216-1. The robot 212 may then move along the aisle 312 of the customer access portal 310A to load and/or unload a tote 932. Once the robot 212 reaches the end of the aisle 312, the robot 212 may move vertically upwards via the tower 216-2. Thereafter, the robot 212 may travel along the transit rail 214-2 until exiting the tote transfer system 1010A.

It should be appreciated that, in some implementations, the tote transfer system 1010A may provide alternate paths for robots 212 to move between the G2P system 160 and the customer access portal 310. For example, the transit rails 214-1 and 214-2 may be connected via multiple towers (not shown) and/or the towers 216-1 and 216-2 may be connected via multiple transit rails 214-1 and 214-2. In the event a robot 212 breaks down in the tote transfer system 1010A, the multiple paths in the tote transfer system 1010A may allow robots 212 to detour and move around the broken robot 212 to reach either the G2P system 160 or the customer access portal 310A.

As shown in FIG. 10C, the customer 104 may park their vehicle next to the customer access portal 310A and directly use the customer access portal 310A. This may save the customer 104 time by eliminating the need for the customer 104 to walk to the entrance into a pickup point near the entrance of the sales floor area 130 or within the sales floor area 130. As described above, the customer access portal 310A may include an external portal door 314 that opens to present one or more totes 932 for the customer 104 to retrieve ordered items and/or place returned items. In some implementations, the customer access portal 310A may further include a shelf or shelf area for the customer 104 to place a bag (or a container). For example, FIG. 11 shows a customer access portal 310D, which is a variant of the customer access portal 310A with shelves 868-1 and 868-2. The shelves 868-1 and 868-2 may make it easier for the customer 104 to transfer ordered items from the totes 932 to the bags 832 or transfer returned items from the bags 832 to the totes 932. In some implementations, the shelves 868-1 and 868-2 may protrude from the structure 853 so that the customer 104 may use the shelves 868-1 and 868-2 even if the external portal door 314 is closed. For example, the external portal door 314 may be closed when the customer 104 first arrives at the customer access portal 310A.

Figure 12A:
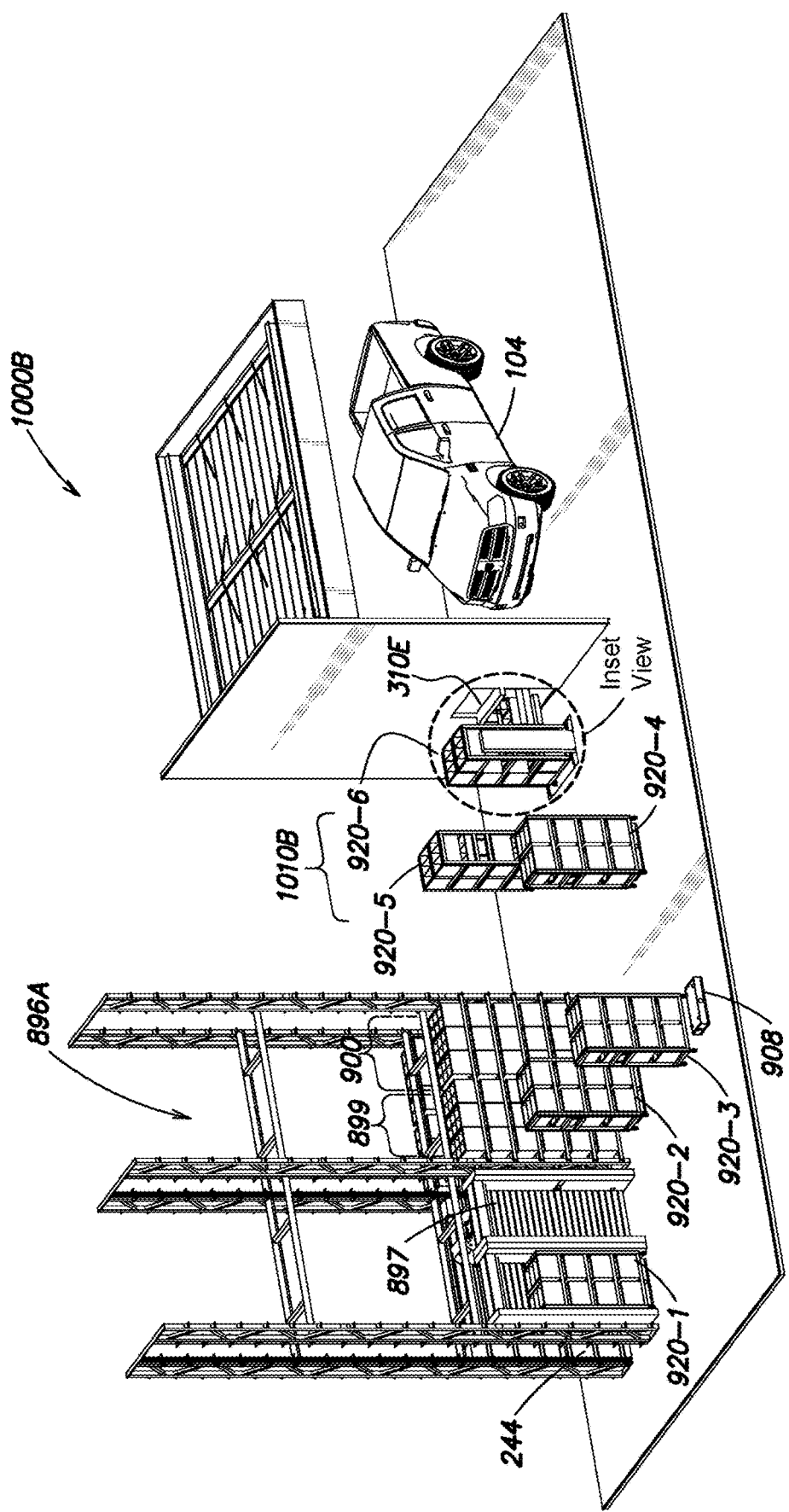
FIG. 12A shows an interior perspective view of another example customer access system with a tote transfer system that includes multiple racks to transport totes to and from a customer access portal according to various inventive implementations of the present application. The customer access portal includes a drawer to directly receive and support a tote.
Figure 12B:
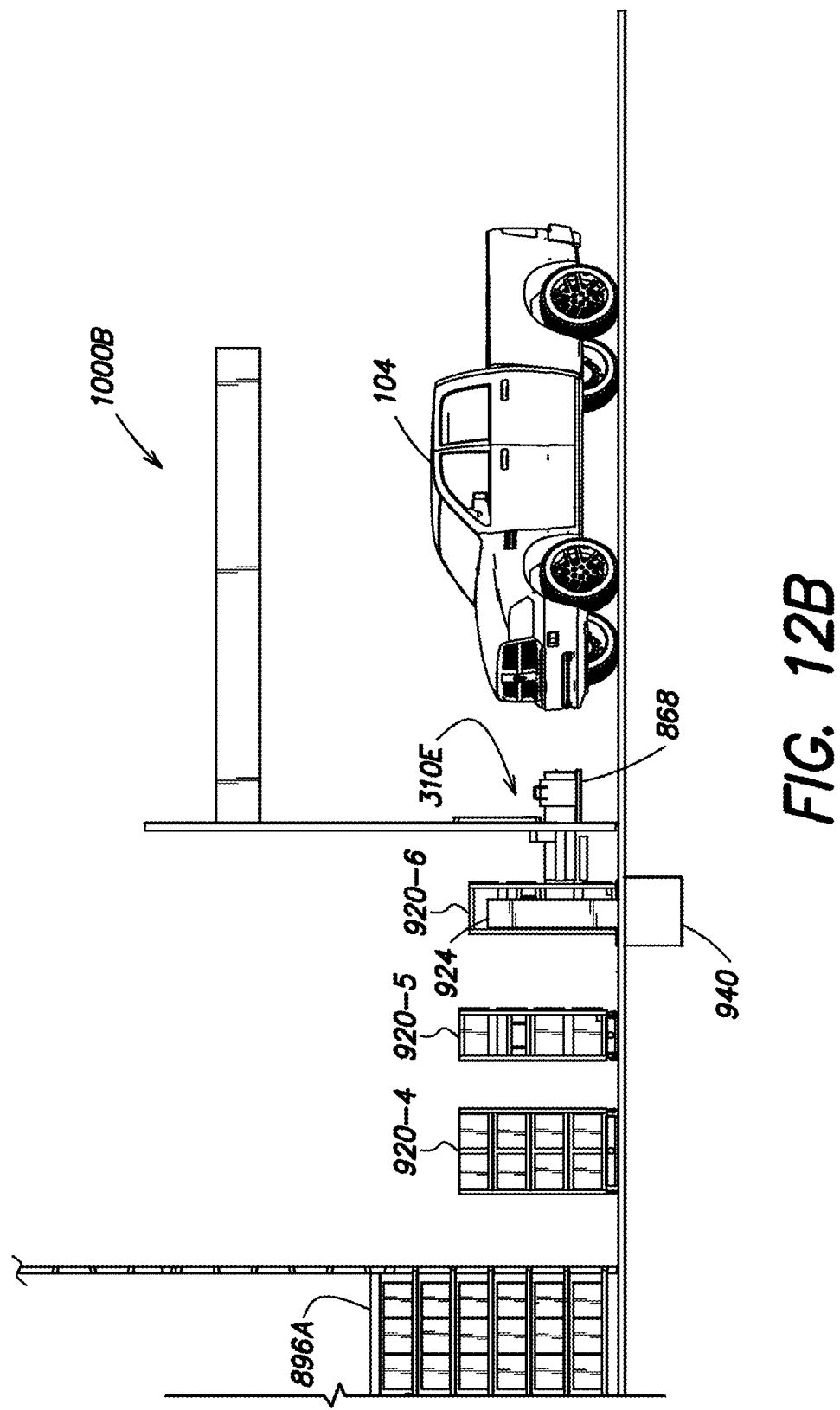
FIG. 12B shows a front of the customer access system of FIG. 12A.
Figure 12C:
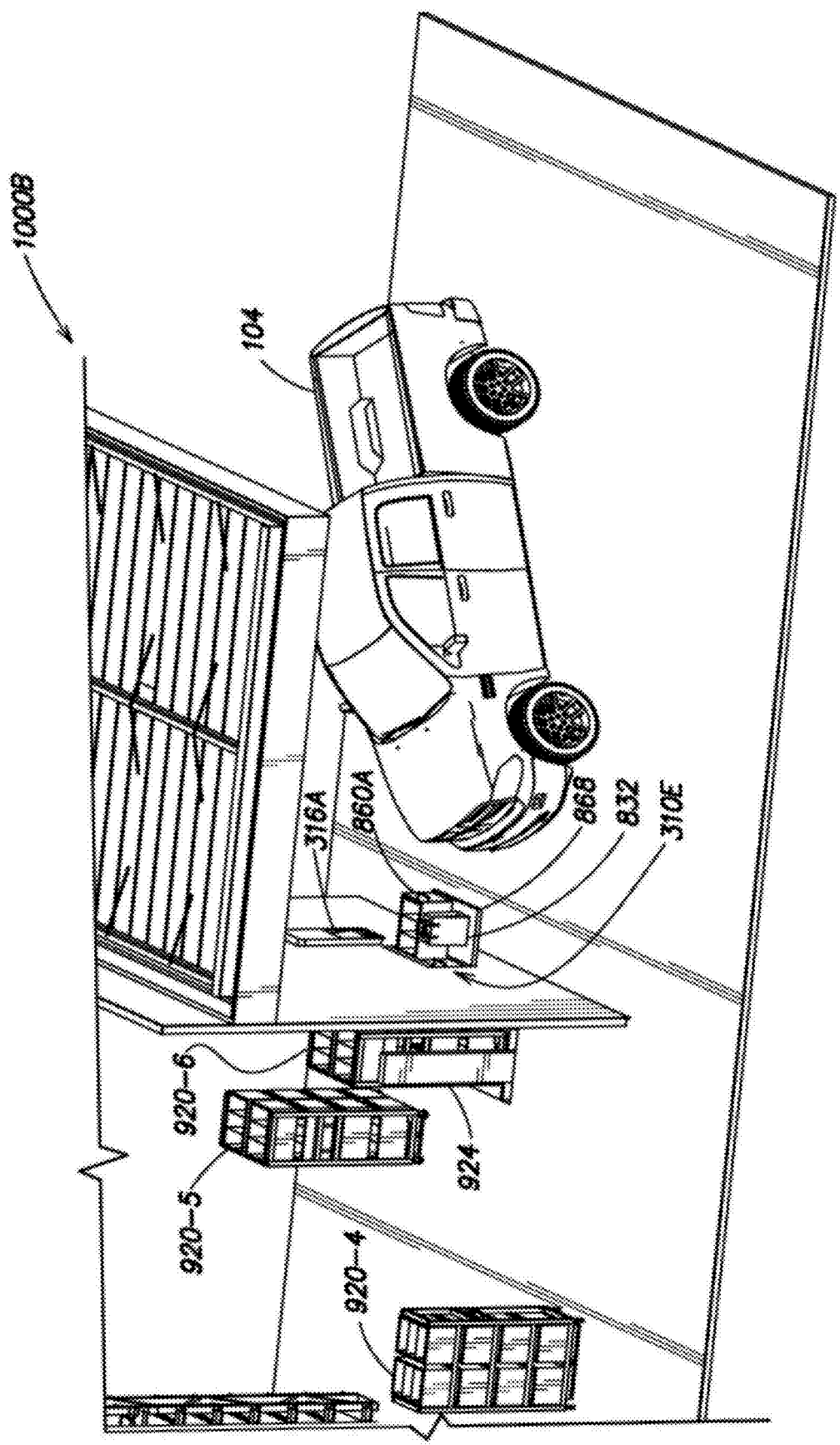
FIG. 12C shows an exterior perspective view of the customer access system of FIG. 12A.

FIGS. 12A-12C show another example customer access system 1000B that includes one or more racks 920 to facilitate the transport of one or more totes 932 between a storage structure 896A and a customer access portal 310E. As shown, the storage structure 896A may be a multi-level rack storage structure similar to the multi-level rack storage 240 of the container storage 164. In particular, the storage structure 896A may include multiple vertical levels with shelves to support one or more order totes and/or one or more return totes. The storage structure 896A may further define an aisle 244 for robots (e.g., the robots 212) to move along and transport totes 932 between the G2P system 160 and the storage structure 896A.

In some implementations, the storage structure 896 may be divided into sections corresponding to the pickup staging area 899 to store one or more order totes and the return staging area 900 to store one or more return totes. The storage structure 896A may further include a docking area 244 to securely couple the racks 920 to the storage structure 896A and facilitate loading and unloading of totes 932 to and from the rack 920. For example, FIG. 12A shows a rack 920-1 docked to the storage structure 896A. One or more robots 212 may transport order totes from the pickup staging area 899 to the rack 920-1 or return totes from the rack 920-1 to the return staging area 900.

The rack 920 may generally hold one or more totes 932 (e.g., return totes, order totes). As shown in FIG. 12A, the rack 920 may be a vertical rack with multiple shelves that define multiple vertical levels to store multiple totes 932 (see, for example, the vertical levels 921-1-921-4 in FIG. 13). Each shelf may further include a tote retention mechanism (not shown) to securely couple the tote(s) 932 to the rack 920 unless the tote(s) 932 are being loaded or unloaded. As shown, each rack 920 may be configured to support up to eight totes 932. More generally, the storage capacity of the rack 920 may range from two totes to twenty totes.

The rack 920 is also generally movable so that multiple totes 932 may be transported between the storage structure 896A and the customer access portal 310E at one time. This may be accomplished, for example, by the rack 920 having one or more wheels (e.g., cater wheels). In some implementations, the rack 920 may be a mechanically passive structure that relies upon a robot 908 to move the rack 920 between the storage structure 896A and the customer access portal 310E. Generally, the customer access system 1000B may include multiple robots 908 to transport multiple racks 920 at the same time (see, for example, the racks 920-2, 920-3, 920-4, and 920-5). However, it should be appreciated that, in some implementations, each rack 920 may be motorized to move autonomously without the aid of another robot. Alternatively, each rack 9320 may be moved manually by a human (e.g., a worker). In this example, the robots 908 and the racks 920 may constitute a tote transfer system 1010B.

As described above, the storage structure 896 may generally be used to buffer and consolidate ordered items for customers and/or buffer returned items for dispositioning. In some implementations, the racks 920 may provide another complementary mechanism to buffer ordered items for pick up and/or returned items for dispositioning to further reduce the transit time of transporting one or more totes 932 between the various portions of the customer access system 1000B and, more generally, the G2P system 160. For example, FIG. 12A shows the rack 920-5 may be positioned next to the customer access portal 310E such that once totes 932 are loaded and/or unloaded from the rack 920-6, the rack 920-5 may immediately be moved into position to interface with the customer access portal 310E. In another example, the racks 920 may similarly be queued up next to a workstation 168 of the G2P system 160 to reduce or, in some instances, eliminate the transit time for return totes to be transported to the workstation 168 for dispositioning.

In some implementations, the racks 920 may also generally be used to consolidate order totes for each customer. For example, a typical customer order typically includes about seven totes 932. Thus, the racks 920 shown in FIGS. 12A-12C may be used to hold on average the order totes for one order at a time. This includes ordered items that are stored at different temperatures. For example, the rack 920 may hold one tote for ordered items stored at room temperature, one tote for ordered items stored at a chilled temperature, and one tote for ordered items stored at a frozen temperature (see, for example, the item 102A stored in the tote 932-1 and the item 102B stored in the chilled tote 932-2 in FIG. 13). However, it should be appreciated that each rack 920 may generally hold order totes for multiple orders as well (see, for example, the totes 932-3 and 932-4 in FIG. 13).

Figure 13:
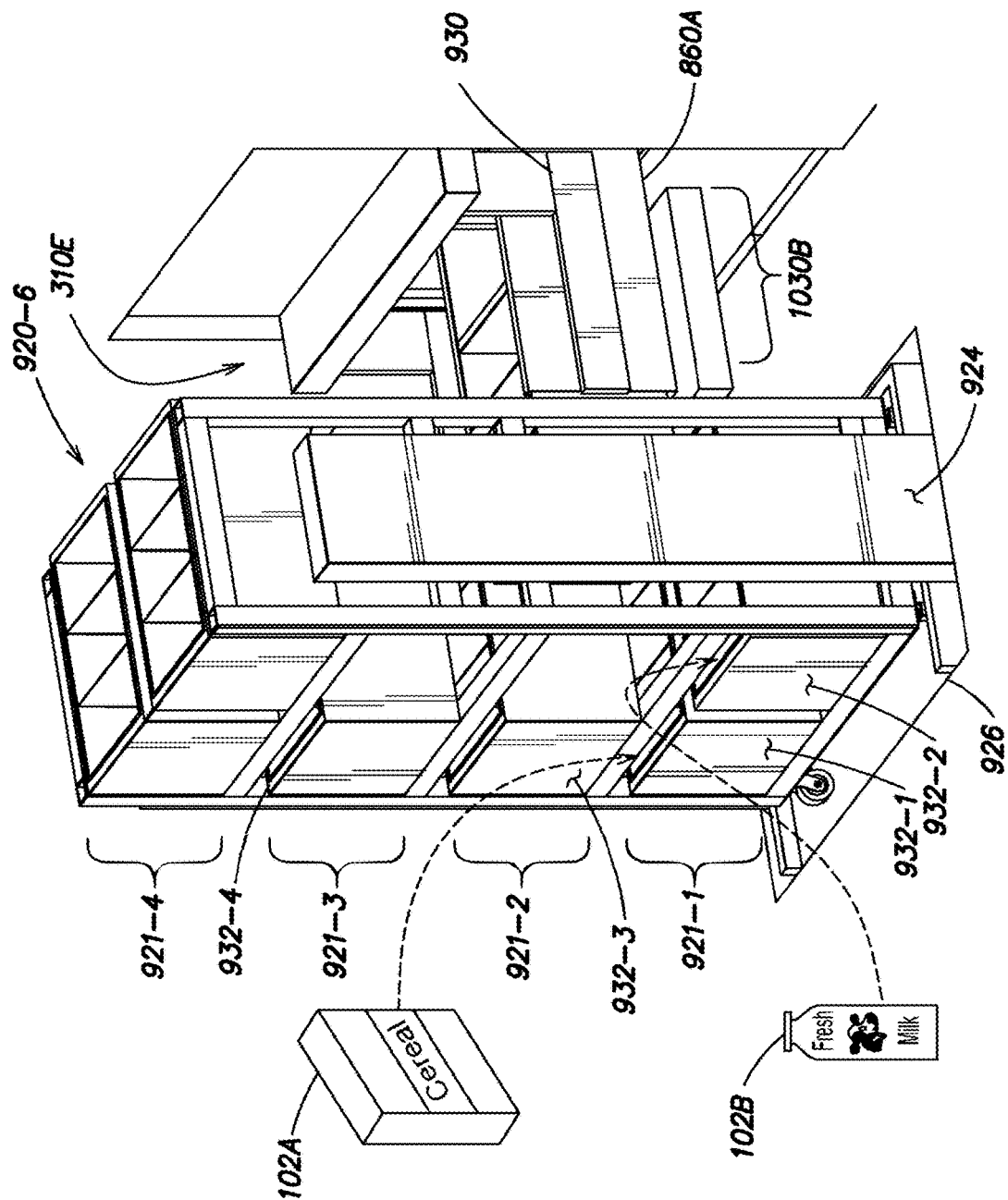
FIG. 13 shows a magnified interior perspective view of a rack coupled to the customer access portal of FIG. 12A where a tote is loaded directly into the drawer of the customer access portal.

FIG. 13 shows a magnified view of the rack 920-6 interfacing the customer access portal 310E. As shown, the customer access portal 310E may include the drawer 860A of the customer access portal 310B. Thus, one tote 932 may be loaded directly into the drawer 860A at a time. The customer access portal 310E may also include a shelf 868 to support one or more bags 832 as described above and an optional user interface 316A.

The tote transfer system 1010B may further include an indexer 924 to position the rack 920-6 adjacent to the customer access portal 310E to load totes 932 into the customer access portal 310E and/or unload totes 932 from the customer access portal 310E. The tote transfer system 1010B may also include a tote transfer mechanism 930 directly mounted to the customer access portal 310E to transport one tote 932 between the rack 920-6 and the drawer 860A.

The indexer 924 may include a supporting nest 926, which is a vertically movable platform used to align the tote transfer mechanism 930 to one of the vertical levels 921-1-921-4. The supporting nest 926 may include a locking mechanism (not shown) to securely couple the rack 920-6 to the indexer 924. For example, FIG. 13 shows the second vertical level 921-2 of the rack 920-6 is aligned to the tote transfer mechanism 930. The indexer 924 may move the rack 920-6 upwards to access the vertical level 921-1 or downwards to access the vertical levels 921-3 or 921-4. FIG. 12B shows the indexer 924 may include a compartment 940 in the ground so that the rack 920-6 may be moved downwards.

In some implementations, the customer access portal 310E may included multiple drawers 860A and the tote transfer system 1010B may include multiple tote transfer mechanisms 930 to transport multiple totes 932 to and from each vertical level of the rack 920 at one time.

Figure 14A:
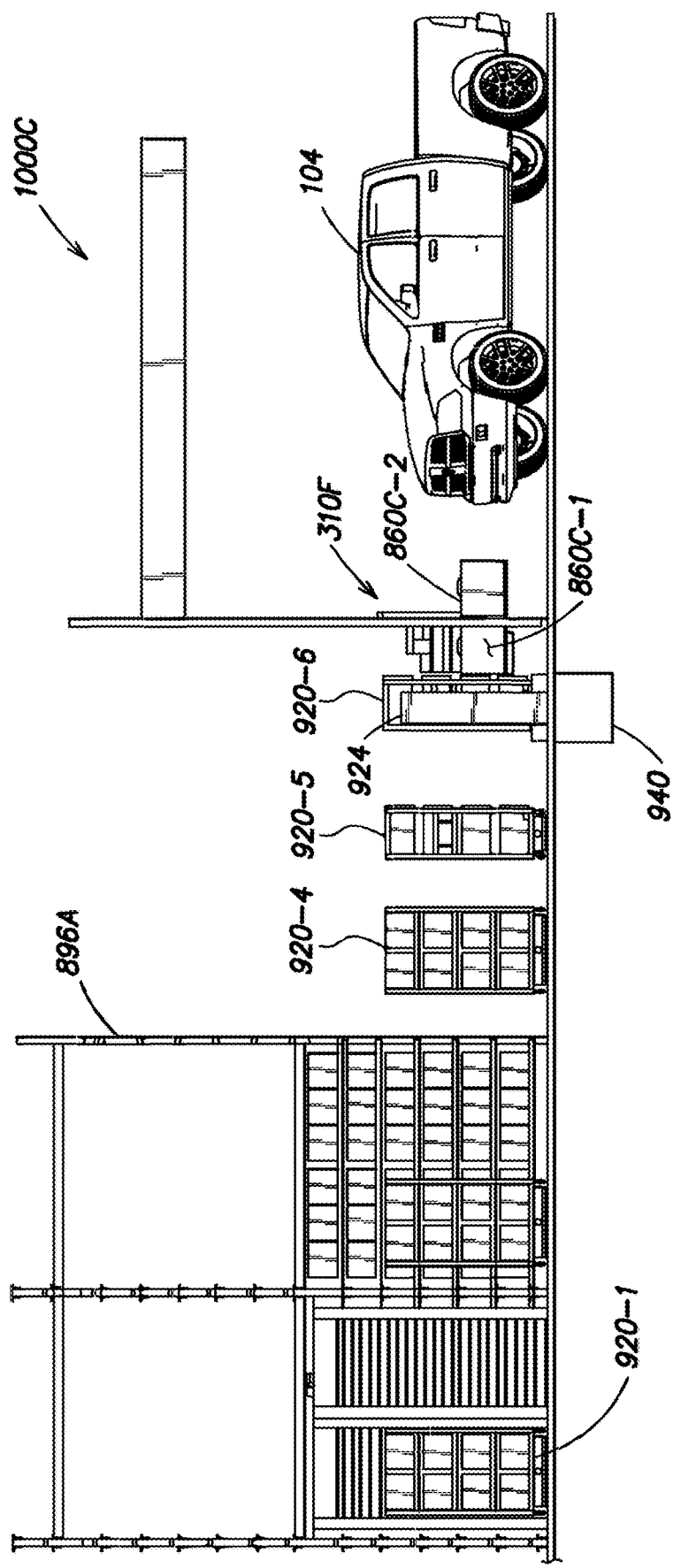
FIG. 14A shows a front view of another example customer access system with the tote transfer system of FIG. 12A and a customer access portal with a drawer to hold one or more bags to facilitate automated loading of items into the bag(s) according to various inventive implementations of the present application.
Figure 14B:
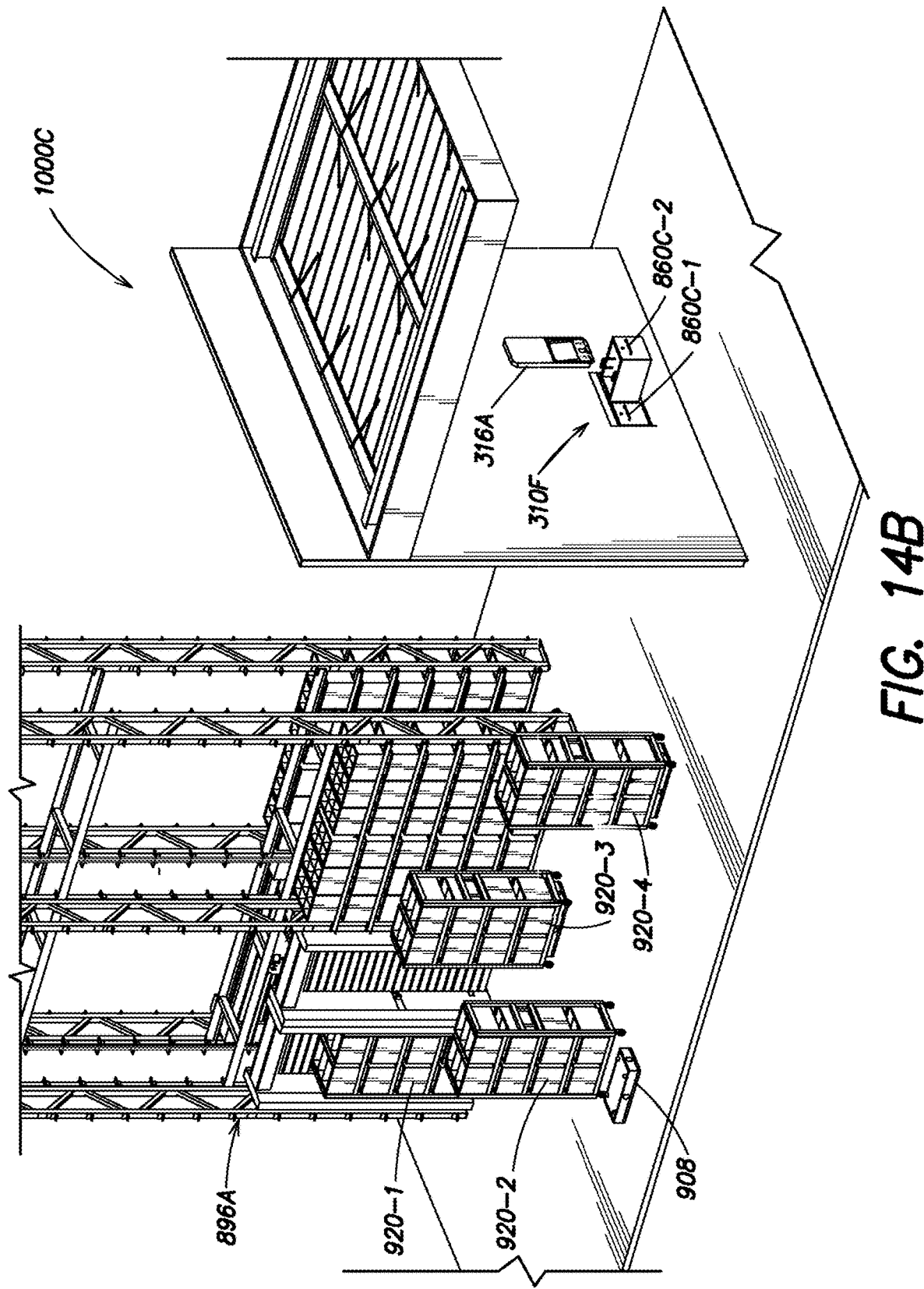
FIG. 14B shows an exterior perspective view of the customer access system of FIG. 14A.
Figure 14C:
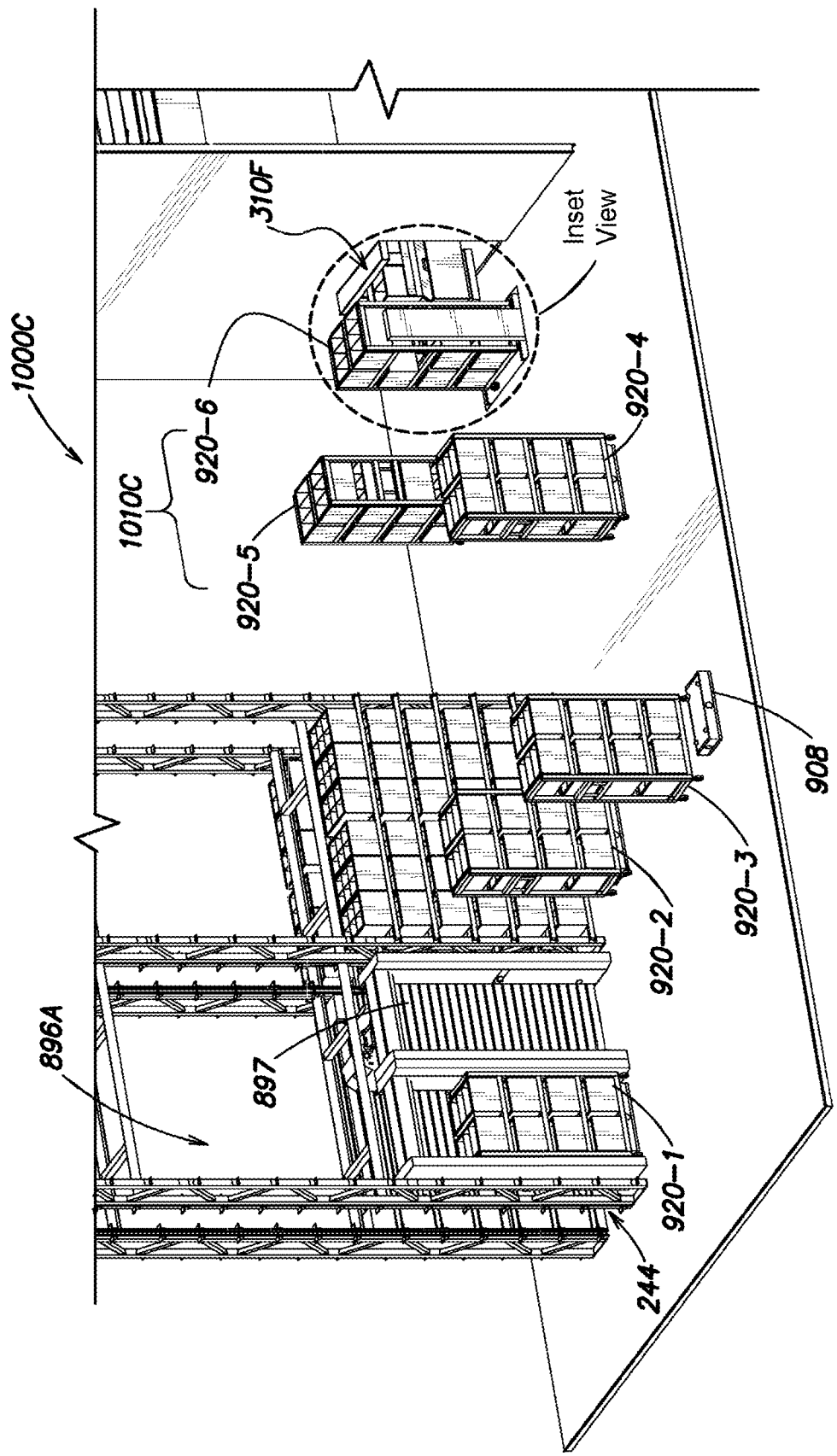
FIG. 14C shows an interior perspective view of the customer access system of FIG. 14A.

FIGS. 14A-14C show another example customer access system 1000C that includes one or more racks 920 to facilitate the transport of one or more totes 932 between the storage structure 896A and a customer access portal 310F. The customer access system 1000C may be a variant of the customer access system 1000C that utilizes the same storage structure 896A. The tote transfer system 1010C may also be a variant of the tote transfer system 1010B that includes multiple tote transfer mechanisms 930 for drawers 860C-1 and 860C-2 of the customer access system 1000C. Thus, the racks 920 may generally be used in the same manner as in the customer access system 1000B to transport one or more totes 932 (e.g., order totes, return totes) between the storage structure 896A and the customer access portal 310F.

FIGS. 15A-15D show several magnified views of the customer access portal 310F. As shown, the drawers 860C-1 and 860C-2 (referred to individually as "drawer 860C") may be located adjacent to one another. The drawer 860C may be a variant of the drawer 860B designed to receive ordered items from a single tote 932 instead of multiple totes 932. The drawers 860C-1 and 860C-2 may be used to service one or more customers at a time. Additionally, the customer access portal 310F may optionally include the user interface 316A. Similar to the drawer 860B, the drawer 860C may be configured to support a bag 832 to facilitate automated loading of ordered items into the bag 832. Alternatively, ordered items may be deposited directly into the drawer 860C and subsequently removed by the customer when the drawer 860C is moved to the open position.

The tote transfer system 1010C once again includes the indexer 924 to vertically adjust the position of the rack 920-6 to facilitate loading and/or unloading of totes 932 at different vertical levels. In this example, the tote transfer system 1010C includes a tote transfer mechanism 930 disposed above the drawer 860C-1 when the drawer 860C-1 is in the closed position. The tote transfer system 1010C also includes another tote transfer mechanism (not shown) disposed above the drawer 860C-2 when the drawer 860C-2 is in the closed position. The tote transfer mechanism 930 may transport one tote 932 at a time to and from the rack 920-6. In some implementations, the tote transfer mechanism 930 may also provide a mechanism to hold or suspend the tote 932 above the drawer 860C-1. Thus, the tote transfer mechanism 930 may also define a tote location 820D.

Figure 15A:
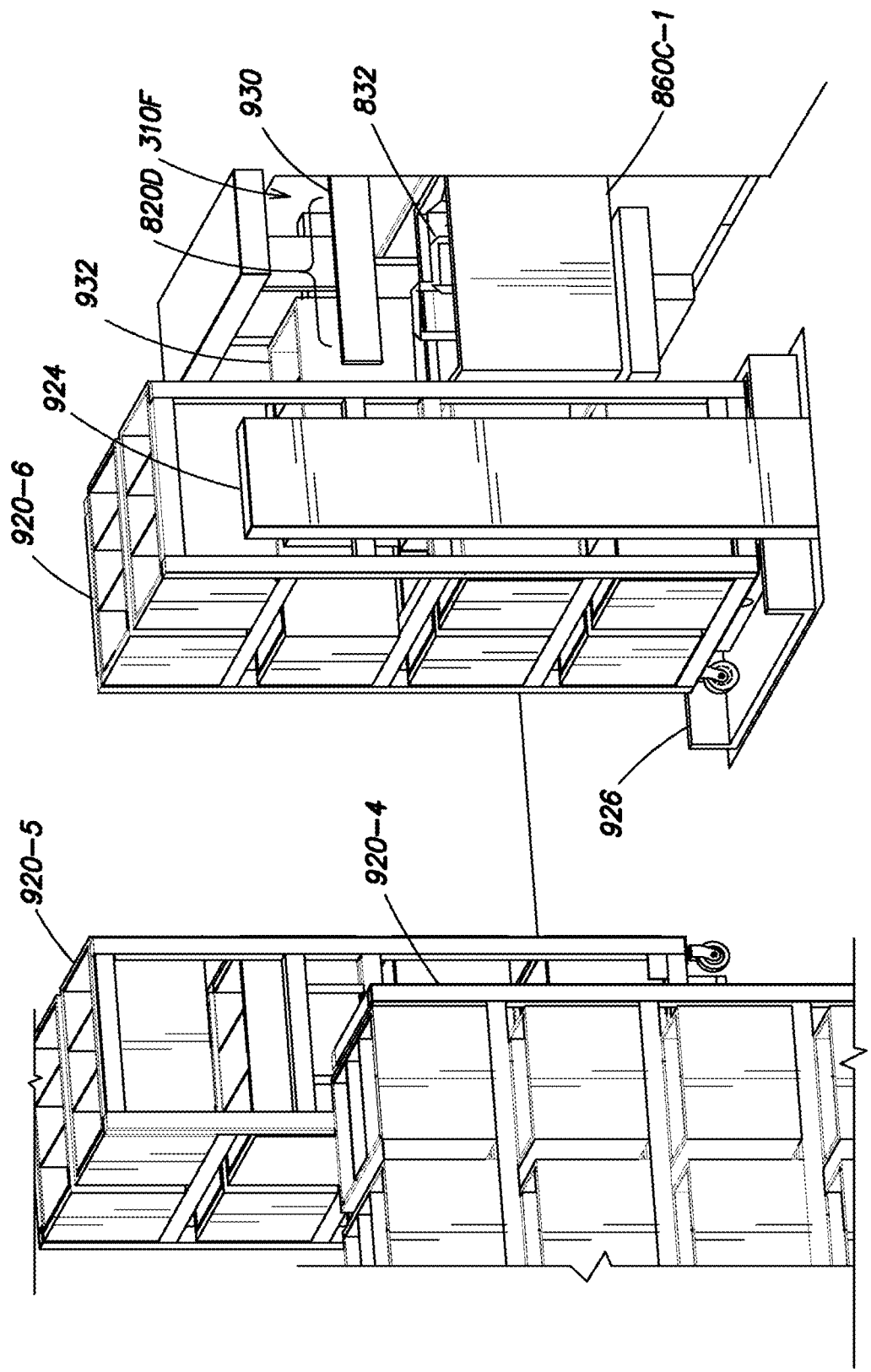
FIG. 15A shows a magnified interior perspective view of a rack coupled to the customer access portal of FIG. 14A where a tote is in the process of being transferred from the rack to the customer access portal.
Figure 15B:
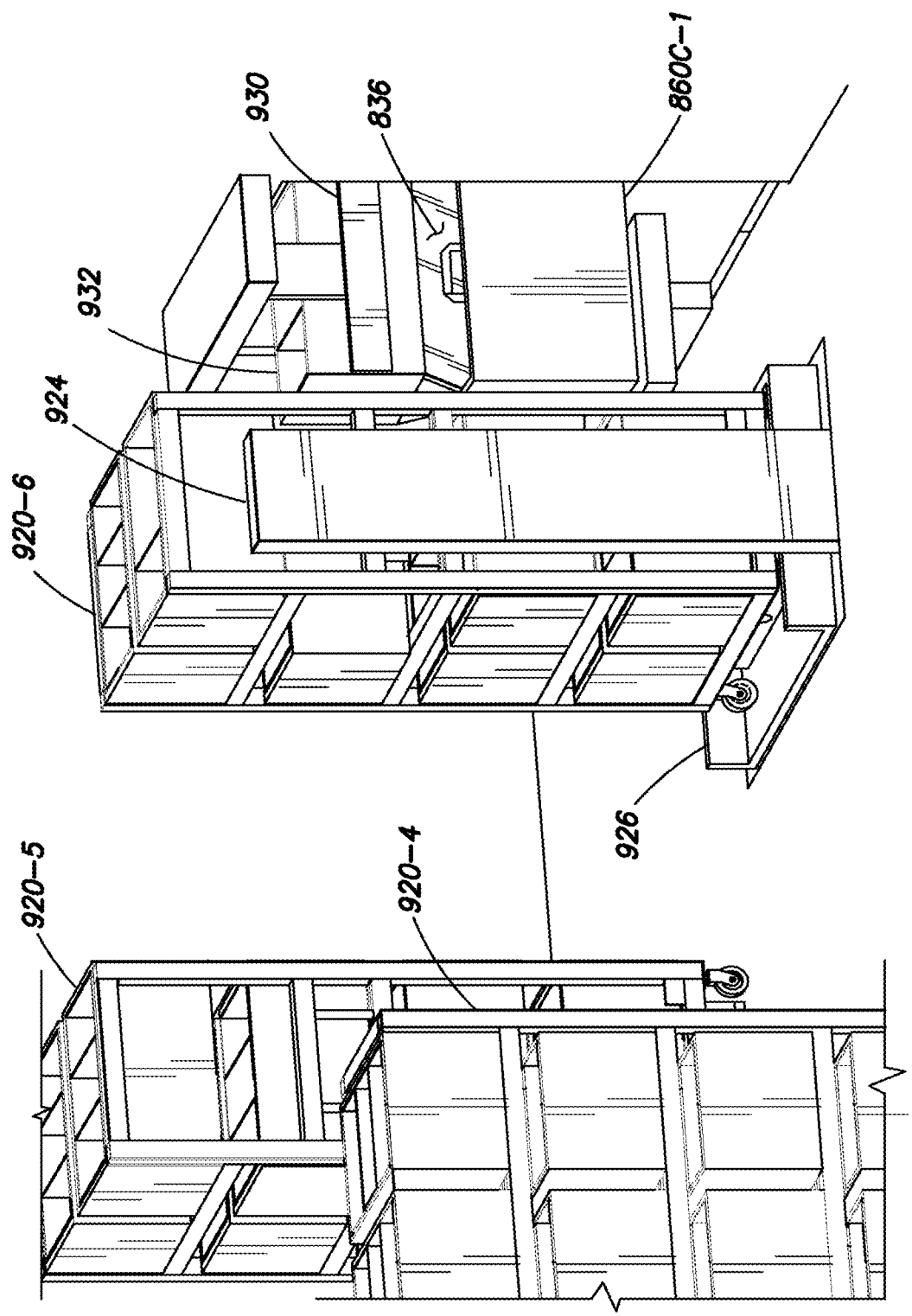
FIG. 15B shows the magnified interior perspective view of the rack and the customer access portal of FIG. 15A where the tote is loaded into the customer access portal and opened to transfer items to a bag in the drawer.

The following is one example process for dispensing an order using the customer access portal 310F. Here, the customer may first gain access to the customer access portal 310F via, for example, the user interface 316A or 316B. Once access is granted, the customer may then open the drawer 860C-1 and place a bag 832 into the drawer 860C-1. Once the drawer 860C-1 is moved back to the closed position, one tote 932 may be moved from the rack 920-6 via the tote transfer mechanism 930 as shown in FIG. 15A. FIG. 15B shows that once the tote 932 is disposed directly over the drawer 860C-1, the hopper doors 836 on the bottom of the tote 932 may open thus dropping one or more ordered items into the bag 832. After the tote 932 is emptied, the tote 932 may be returned to the rack 920-6 via the tote transfer mechanism 930.

Figure 15C:
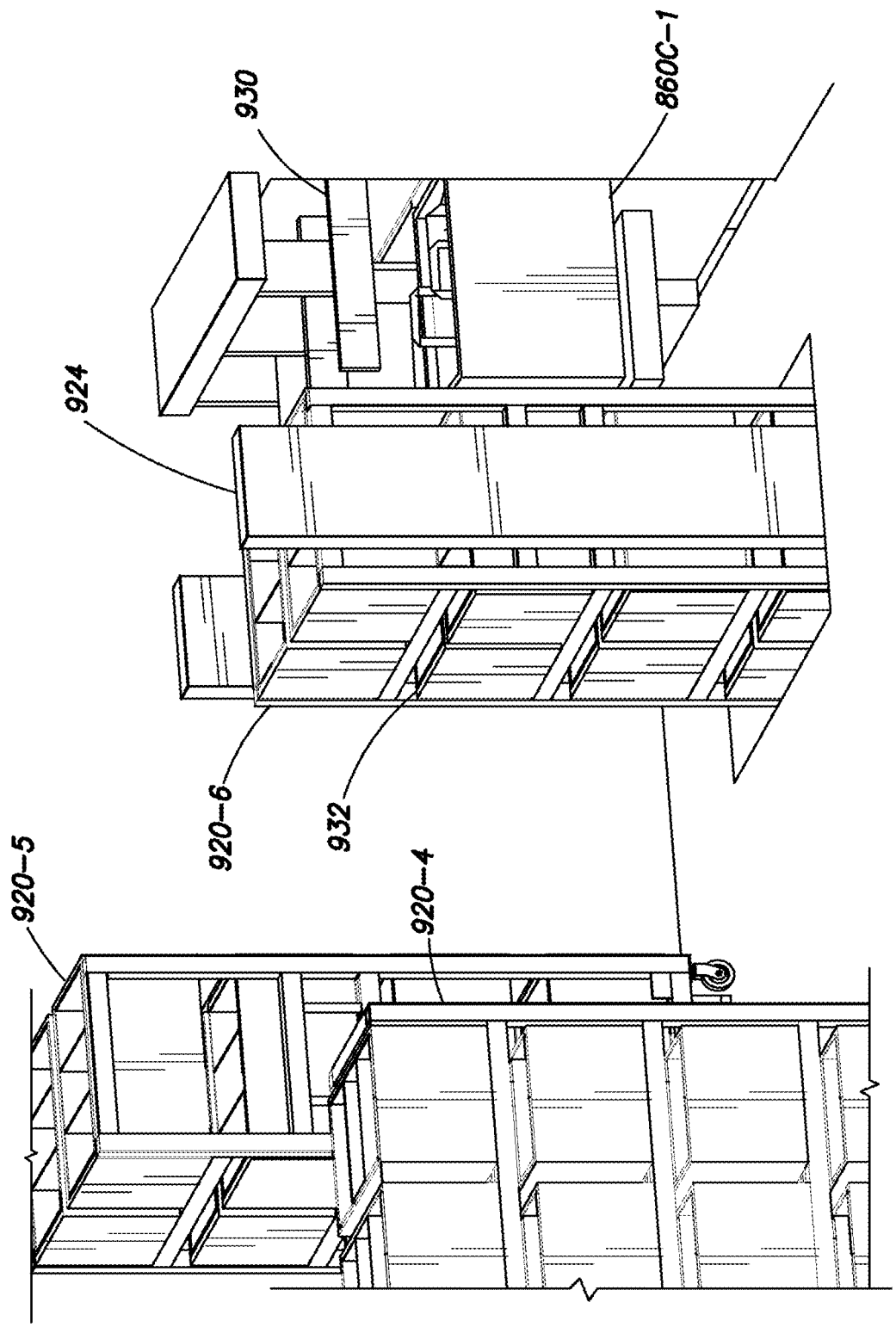
FIG. 15C shows the magnified interior perspective view of the rack and the customer access portal of FIG. 15A where the rack is lowered vertically by an indexer to access a higher level of the rack.
Figure 15D:
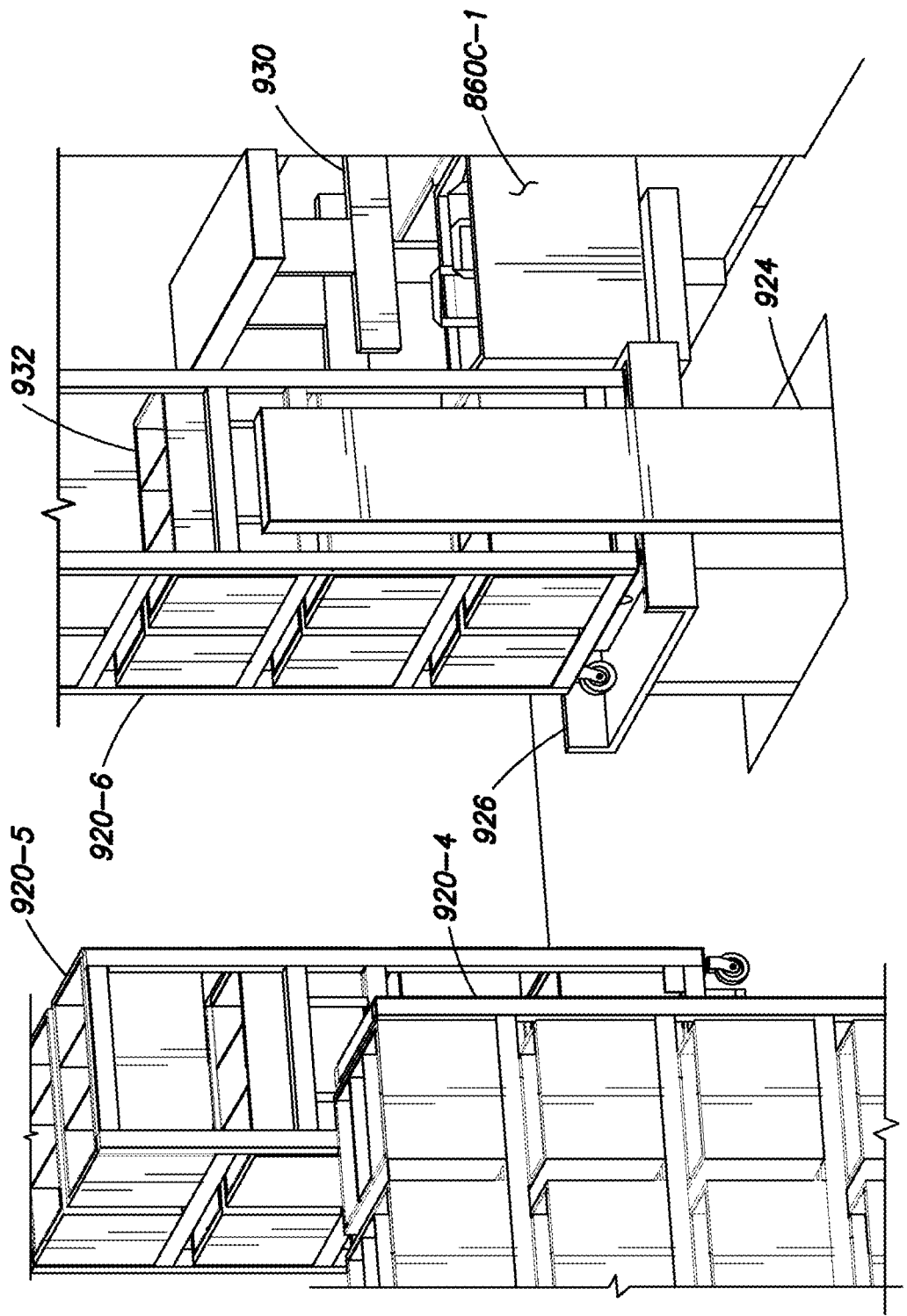
FIG. 15D shows the magnified interior perspective view of the rack and the customer access portal of FIG. 15A where the rack is raised vertically by the indexer to access a lower level of the rack.

At this point, the drawer 860C-1 may then be moved back to the open position so that the customer may take the bag 832 with the ordered items. In some implementations, the rack 920-6 may be vertically moved to another vertical level (e.g., a lower vertical as shown in FIG. 15C or an upper vertical level as shown in FIG. 15D) to retrieve another tote 932. The items of the tote 932 may be dropped into the same bag 832 or another bag 832 supplied by the customer.

In some implementations, the customer may utilize both the drawers 860C-1 and 860C-2 to retrieve ordered items at the same time. Specifically, two totes 932 may be retrieved from the rack 920-6 via respective tote transfer mechanisms 930 and the contents deposited into respective bags 832 contained in the drawers 860C-1 and 860C-2. The pair of totes 932 may be retrieved from the same vertical level of the rack 920-6 at the same time. Alternatively, the vertical position of the rack 920-6 may be adjusted so that the two totes 932 originate from different vertical levels.

Additional examples of racks 920 and/or robots 908 may be found in U.S. Patent Publication No. 2018/0150793 published May 31, 2018, having U.S. application Ser. No. 15/826,045, filed on Nov. 29, 2017, and entitled "Automated retail supply chain and inventory management system" U.S. Provisional Application Ser. No. 63/013,504, filed on Apr. 21, 2020, and entitled "Transport Rack Cartridge", which are each incorporated herein in its entirety for all purposes.

Figure 16B:
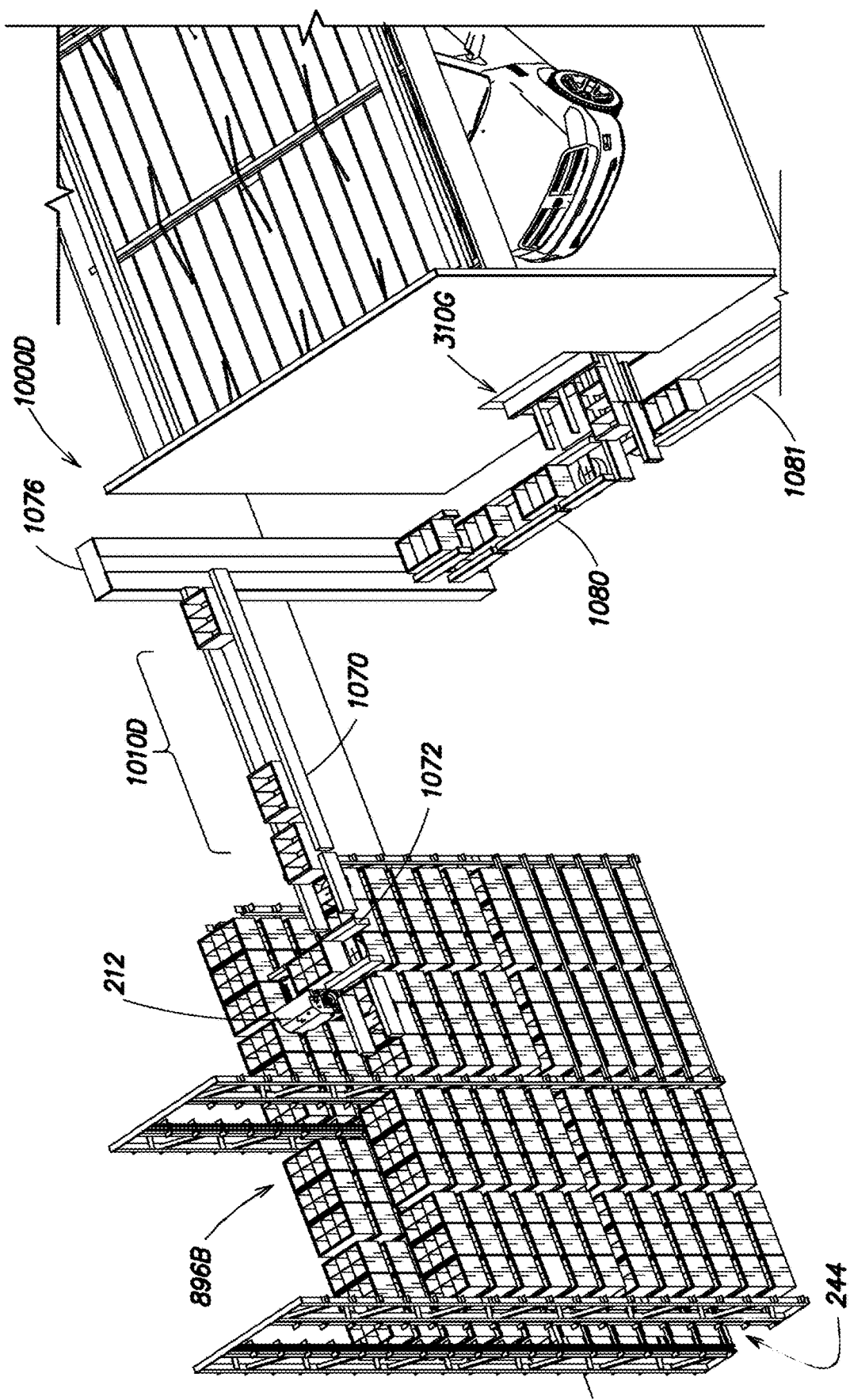
FIG. 16B shows an interior perspective view of the customer access system of FIG. 16A.
Figure 16C:
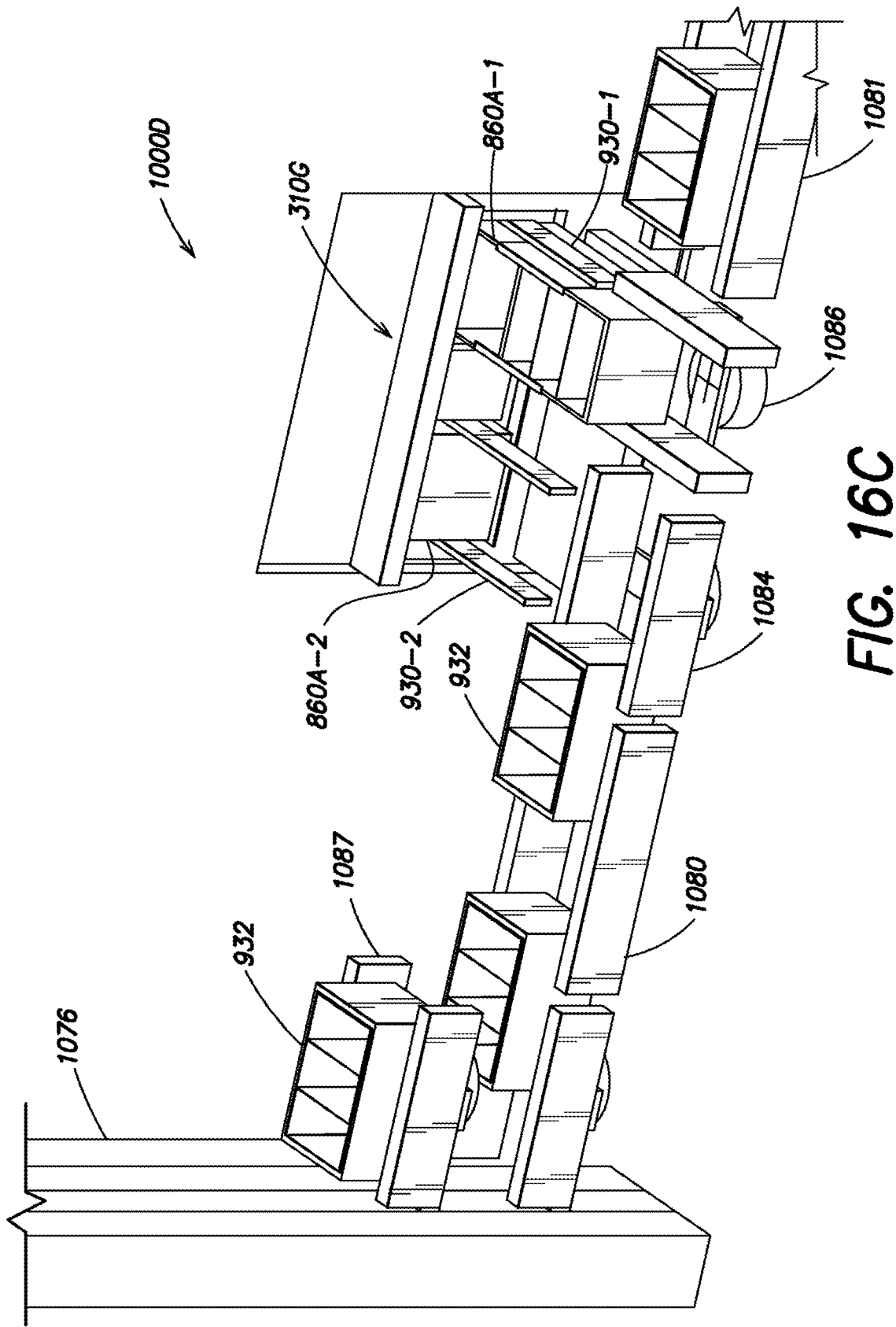
FIG. 16C shows a magnified perspective view of the customer access system of FIG. 16B.

FIGS. 16A-16C show another example customer access system 1000D with a tote transfer system 1010D that includes conveyors to transport totes 932 between a storage structure 896B and a customer access portal 310G. As shown, the storage structure 896B may be a multi-level rack storage structure similar to the multi-level rack storage 240 of the container storage 164. In particular, the storage structure 896B may include multiple vertical levels with shelves to support one or more order totes and/or one or more return totes. The storage structure 896B may further define an aisle 244 for robots (e.g., the robots 212) to move along and transport totes 932 between the G2P system 160 and the storage structure 896B.

The customer access portal 310G may include a pair of drawers 860A (e.g., drawers 860A-1 and 860A-2) where one tote 932 may be loaded directly into one drawer 860A, as described above. The customer access portal 310G may further include a shelf 868 to support one or more bags for the customer to more conveniently transport items between the bags and the drawers 860A-1 and/or 860A-2. The customer access portal 310G may also optionally include the user interface 316A to manage access to the customer access portal 310G.

The tote transfer system 1010D may include a conveyor 1070 directly coupled to the storage structure 896B via a rotary indexer 1072, an elevator 1076 (also referred to as a "indexer 1076") directly coupled to the conveyor 1070, a conveyor 1080 directly coupled to the elevator 1076, and a conveyor 1081 coupled to the conveyor 1080 via a pair of rotary indexers 1084 and 1086. As shown, the conveyor 1070 may be connected to the highest storage level of the storage structure 896B. However, it should be appreciated that the conveyor 1070 may be connected to any storage level of the storage structure 896B. The conveyors 1070, 1080, and 1081 may be various types of conveyor systems including, but not limited to, a belt conveyor and a roller conveyor.

The conveyor 1070 may be used to transport totes 932 to or from the storage structure 896B. For example, FIG. 16B shows a robot 212 may transport a tote 932 from the storage structure 896B and to the conveyor 1070 via the rotary indexer 1072. Specifically, the rotary indexer 1072 may include a tote transfer mechanism (e.g., the tote transfer mechanism 930) to retrieve the tote 932 from the robot 212. The rotary indexer 1072 may also be rotatable so that the orientation of the tote 932 may be changed before being placed onto the conveyor 1070. As shown in FIG. 16B, once the rotary indexer 1072 receives the tote 932 from the robot 212, the rotary indexer 1072 may rotate approximately 90 degrees before transferring the tote 932 onto the conveyor 1070.

The conveyor 1070 may then transport the tote 932 to the elevator 1076, which has a platform 1087 onto which the tote 932 may be placed. In some implementations, the platform 1087 may also be rotatable similar to the rotary indexer 1072 to change the orientation of the tote 932 being transported. As shown, elevator 1076 may move the tote 932 vertically from an elevated position to ground level.

Once the platform 1087 reaches ground level, the tote 932 may then be transferred onto the conveyor 1080, which transports the tote 932 to the rotary indexers 1084 and 1086 near the customer access portal 310G. The rotary indexers 1084 and 1086 may also respectively include tote transfer mechanisms (not shown) to move totes 932 into and out of the rotary indexers 1084 and 1086. The tote 932 may be assigned to, for example, the drawer 860A-1 by the MCS 162. Thus, once the tote 932 reaches the rotary indexer 1086, the rotary indexer 1086 may retrieve the tote 932, rotate the tote 932 to align the tote 932 to the tote transfer mechanism 930-1. Then, the tote transfer mechanism 930-1 may load the tote 932 into the drawer 860A-1.

Once ordered items are removed from the tote 932 or returned items are placed into the tote 932, the tote 932 may then be returned to the rotary indexer 1086 via the tote transfer mechanism 930-1 and/or the tote transfer mechanism of the rotary indexer 1086. The rotary indexer 1086 may thereafter rotate the tote 932 and deposit the tote 932 onto the conveyor 1081. In some implementations, the tote 932 may thereafter be returned to the storage structure 896 (e.g., if containing returned items) via one or more conveyors and elevators (not shown) or removed from the customer access system 1000D (e.g., the tote 932 is empty) to be reused in the G2P system 160. It should be appreciated the above process may be reversed to transport totes 932 from the customer access portal 310G to the storage structure 896B.

Additionally, the tote transfer system 1010D depicted in FIGS. 16A-16C provides a linear path to transport totes 932 between the storage structure 896B and the customer access portal 310G. More generally, the tote transfer system 1010D may provide multiple pathways for totes 932 for transport. For example, the transfer system 1010D may provide separate conveyors that connect to the rotary indexers 1084 and 1086 so that totes 932 may be loaded into the drawers 860A-1 and 860A-2 at the same time. In another example, the tote transfer system 1010D may provide multiple pathways for totes 932 to move from the storage structure 896B to multiple customer access portals 310G. In yet another example, the tote transfer system 1010D may provide a staging area near the rotary indexers 1084 and 1086 to temporarily hold one or more totes 932 for one customer order so that the totes 932 do not obstruct other totes 932 from moving between, for example, the conveyors 1080 and 1081.

Figure 17A:
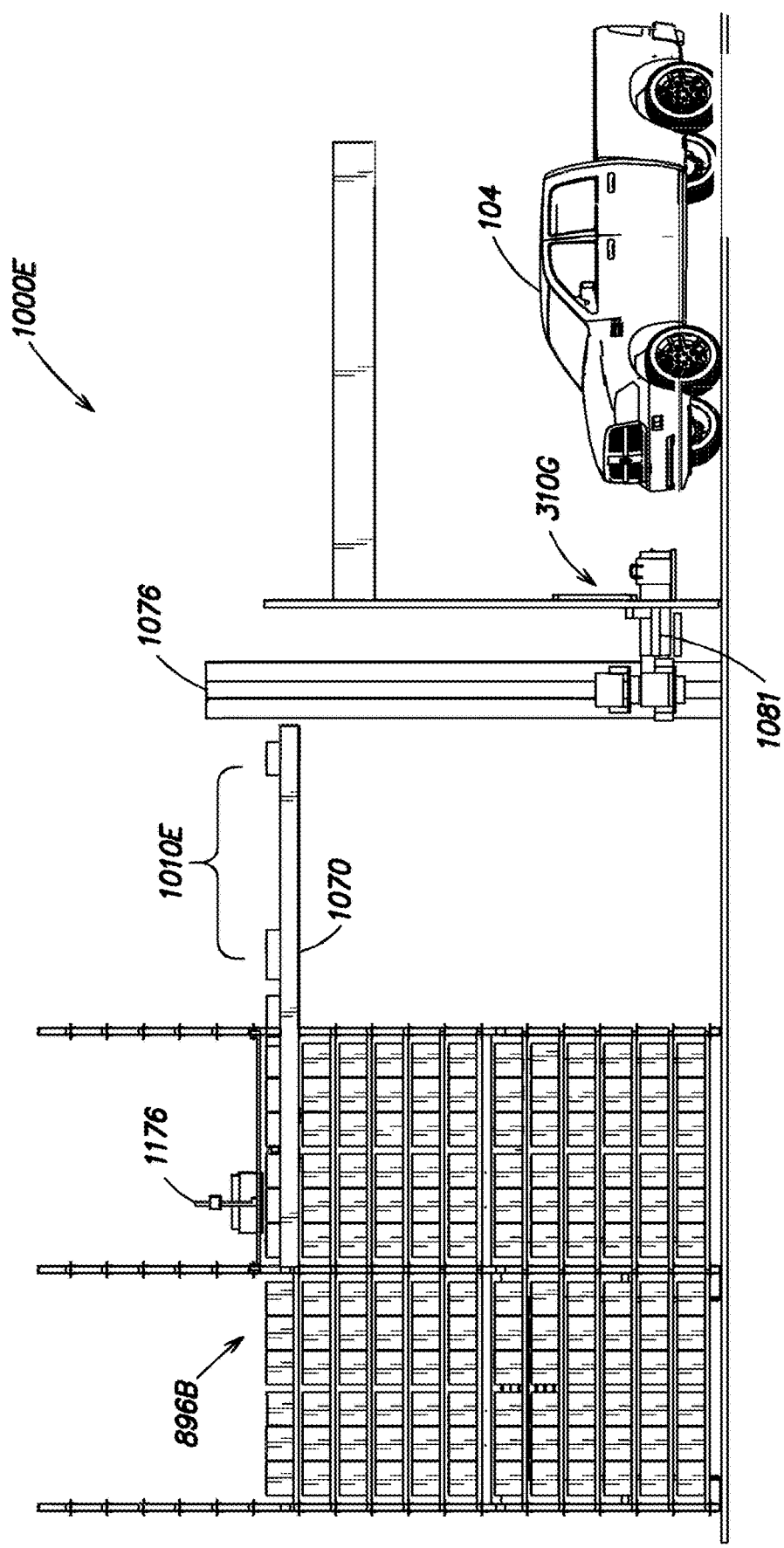
FIG. 17A shows a front view of another example customer access system with a tote transfer system that transports totes to and from a customer access portal via a conveyor system according to various inventive implementations of the present application. The conveyor system includes a gantry to transfer totes from a storage structure to the conveyor system.
Figure 17B:
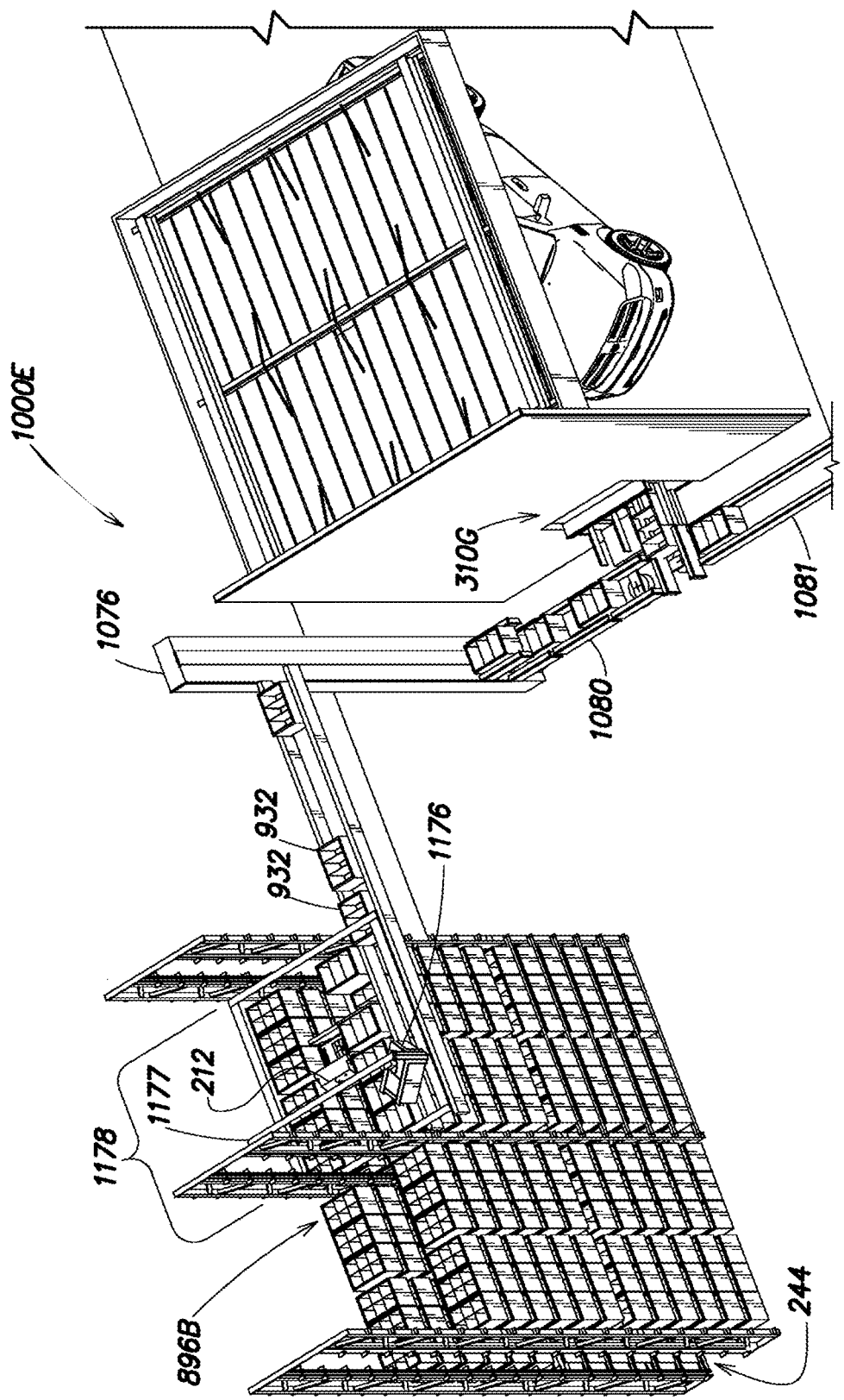
FIG. 17B shows an interior perspective view of the customer access system of FIG. 17A.
Figure 17C:
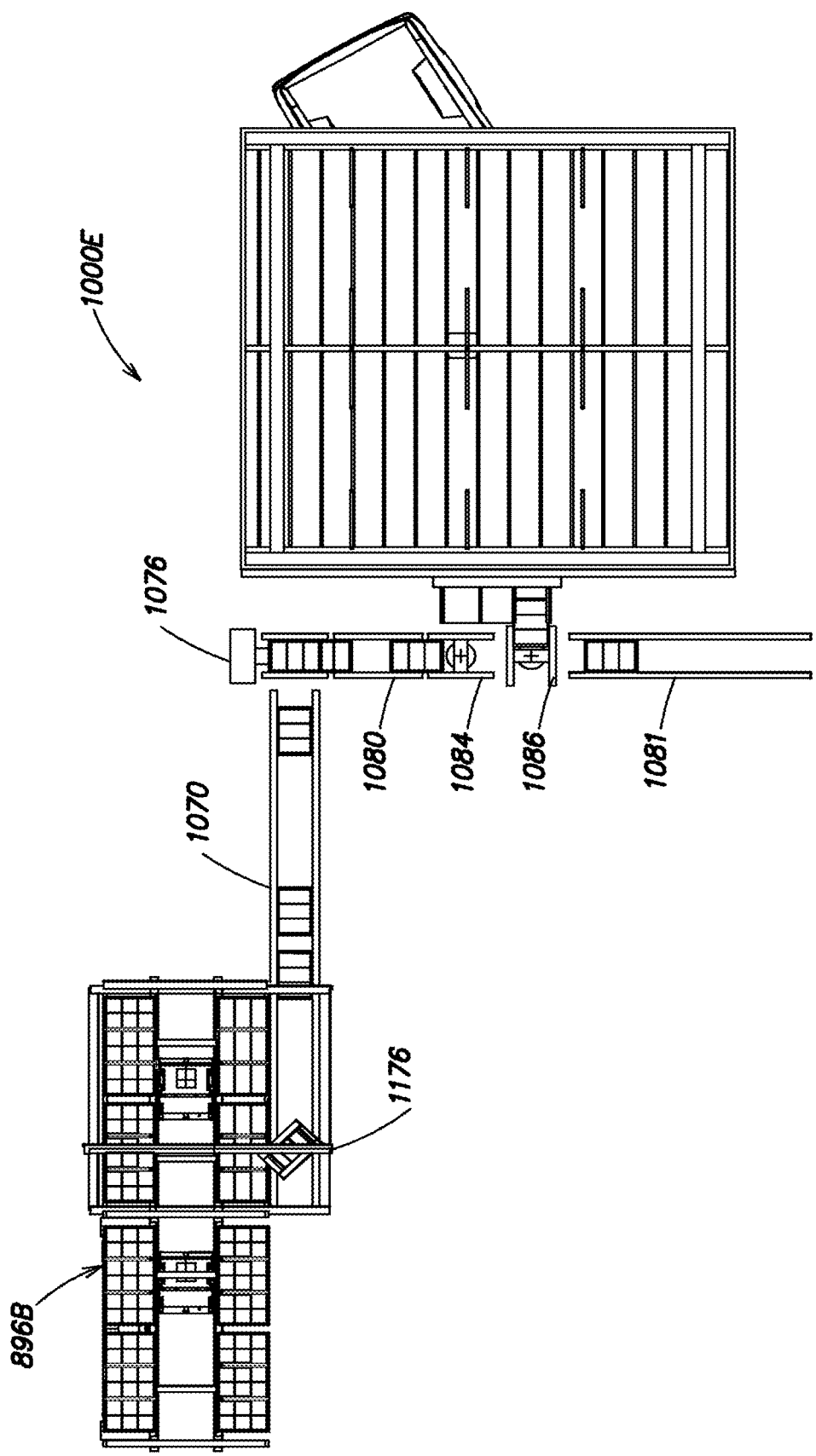
FIG. 17C shows a top of the customer access system of FIG. 17A.

FIGS. 17A-17C show another example customer access system 1000E, which is a variant of the customer access system 1000D that includes the storage structure 896B and the customer access portal 310G. As shown, the customer access system 1000E includes a tote transfer system 1010E, which utilizes the same conveyor system as the tote transfer system 1010D to transport totes 932 between the storage structure 896B and the customer access portal 310G. The difference here is that the conveyor 1070 is coupled to the storage structure 896B via a gantry 1176. As shown in FIG. 17B, the gantry 1176 may include a picking arm 1177 that may move within an area 1178 to pick up, transfer, and drop off totes 932 between the storage structure 896B and the conveyor 1070. In some implementations, the picking arm 1177 may be a 6-axis articulated robot with a gripper designed to pick up totes 932.

Additional examples of a gantry 1176 may be found in U.S. Patent Publication No. 2020/0156871 published May 21, 2020, having U.S. application Ser. No. 16/676,732, filed on Nov. 7, 2019, and entitled "System having robotic workstation", which is incorporated herein in its entirety for all purposes.

3.5 An Example Decontamination Module

In some implementations, the G2P system 160 may periodically decontaminate a tote 932 before the tote 932 is reused to reduce or, in some instances, eliminate the exposure of various contaminants (e.g., pathogens) to workers and customers. For example, the customer access portals 310 described herein are generally designed to service multiple customers over time. When the customer interacts with the customer access portals 310, they may physically touch one or more totes 932 when retrieving ordered items or placing returned items, which may contaminate the totes 932 with pathogens. The totes 932 are typically reused over time, thus repeated handling of the totes 932 may cause pathogens to pass onto other customers or workers. Therefore, it's desirable to decontaminate the tote 932 after each time a customer or a worker handles the tote 932.

Figure 18B:
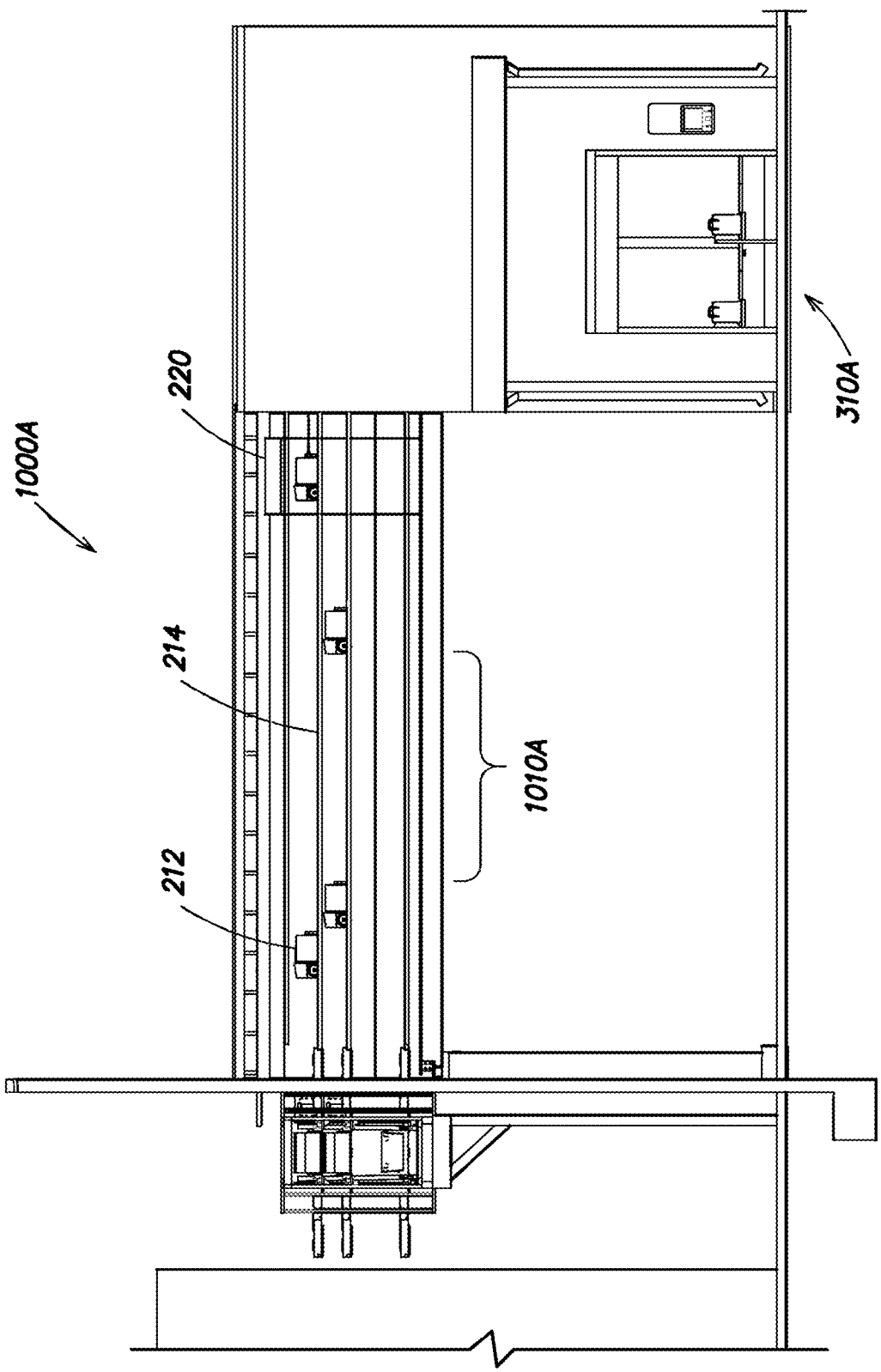
FIG. 18B shows a front view of the tote transfer system and the decontamination module of FIG. 18A.

This may be accomplished by incorporating one or more decontamination modules throughout the G2P system 160, such as near the entrance/exit of the workstation 168, near the entrance/exit of the customer access system 1000, and/or the near the entrance/exit of the container storage 164. For example, FIGS. 18A and 18B show a decontamination module 220 (also referred to herein as a "UV Tote/Bot Decontamination Unit 220" or "Tote cleaner 220") installed in the customer access system 1000A, specifically, the transit rails 214 of the tote transfer system 1000A. The decontamination module 220 may be configured to decontaminate totes 932 returning from the customer access portal 310A, which may include empty totes and return totes containing one or more return items. However, it should be appreciated the decontamination module 220 may also decontaminate totes 932 traveling to the customer access portal 310A to account for workers who may also contaminate the totes 932 when picking items from the sales floor area 130 and/or at the workstation 168.

In one example, the decontamination module 220 may include one or more ultraviolet (UV) light sources to illuminate the various surfaces of the tote 932 and/or the items contained within the tote 932. For example, multiple UV sources may be deployed around the transit rails 214 so that the robot 212 and the tote 932 are exposed to UV light from multiple directions as the robot 212 moves towards the G2P system 160.

The decontamination module 220 may be configured to sufficiently expose the tote 932 to UV light such that the various human-accessible surfaces are sterilized once the robot 212 passes through the decontamination module 220. Said in another way, the decontamination module 220 ensures the totes 932 are exposed to UV light for a sufficiently long dwell time to ensure the totes 932 are sterilized. In general, the overall size of the decontamination module 220 may vary depending on the velocity of the robot 212 and the intensity of the UV light emitted by the UV light sources. For example, a robot 212 traveling at a slower speed or a UV light source that emits higher intensity UV light may result in a smaller decontamination module 220. In contrast, a robot 212 traveling at a higher speed or a UV light source that emits lower intensity UV light may result in a larger decontamination module 220.

In some implementations, the velocity of the robots 212 traveling through the decontamination module 220 may be varied to ensure the totes 932 are exposed to UV light for a sufficient period of time. For example, the robots 212 may travel at a lower velocity through the decontamination module 220 and a higher velocity elsewhere in the G2P system 160.

It should be appreciated the use of UV lights is one non-limiting example and that other systems may be deployed to decontaminate the totes 932. For example, the decontamination module 220 may spray a sanitizing fluid or cleaning solution that is food safe.

3.6 Example Totes

As described above, the various items processed and handled by the customer access system 1000 may be transported in one or more totes 932. The totes 932 may generally provide a standardized container to store items of different sizes and shapes, which aids the automation of the customer access system 1000 and, more generally, the automation of the G2P system 160 and the store 110. For example, the customer access system 1000 may utilize the same tote transfer mechanisms to transport totes 932 between the storage structure 896 and the customer access portal 310 as used elsewhere in the G2P system 160, such as the workstations 168 or the container storage 164. However, it should be appreciated the standardization of the totes 932 does not preclude tailoring the totes 932 to meet the storage needs of different types of items.

In some implementations, each tote 932 may include a tag or an ID to identify and distinguish the tote 932 from other totes 932 in the G2P system 160. For example, each tote 932 may include a radio frequency identification (RFID) tag on an exterior side that is scannable by the robot 212. The tag may be used, for example, to associate the tote 932 with a particular location in the G2P system 160 in the inventory management computing device 120 or the MCS 162. For example, when a robot 212 places the tote 932 at a particular location in the container storage 164, the database of the inventory management computing device 120 may record the location of the tote 932. Later, when retrieving the tote 932, the MCS 162 may instruct another robot 212 to travel to the location recorded in the database and scan the RFID tag on the tote 932 to verify the ID of the tote 932 before retrieval.

The tag of the tote 932 may also be associated with other information, such as whether the tote 932 is a product tote, a return tote, or an empty tote. The database may also contain a record of the items stored in the tote 932 if any. It should be appreciated, that the information associated with a particular tote 932 is not static, but rather may change over time. For example, if one tote 932 is used as an order tote, the database my contain a record of the ordered items contained in the tote 932 after the order is picked. Once the customer picks up the ordered items, the database may be updated to indicate the tote 932 is now an empty tote. Once the tote 932 is reused, for example, as a product tote, the database may be updated again to include the stock items contained in the tote 932.

Figure 19A:
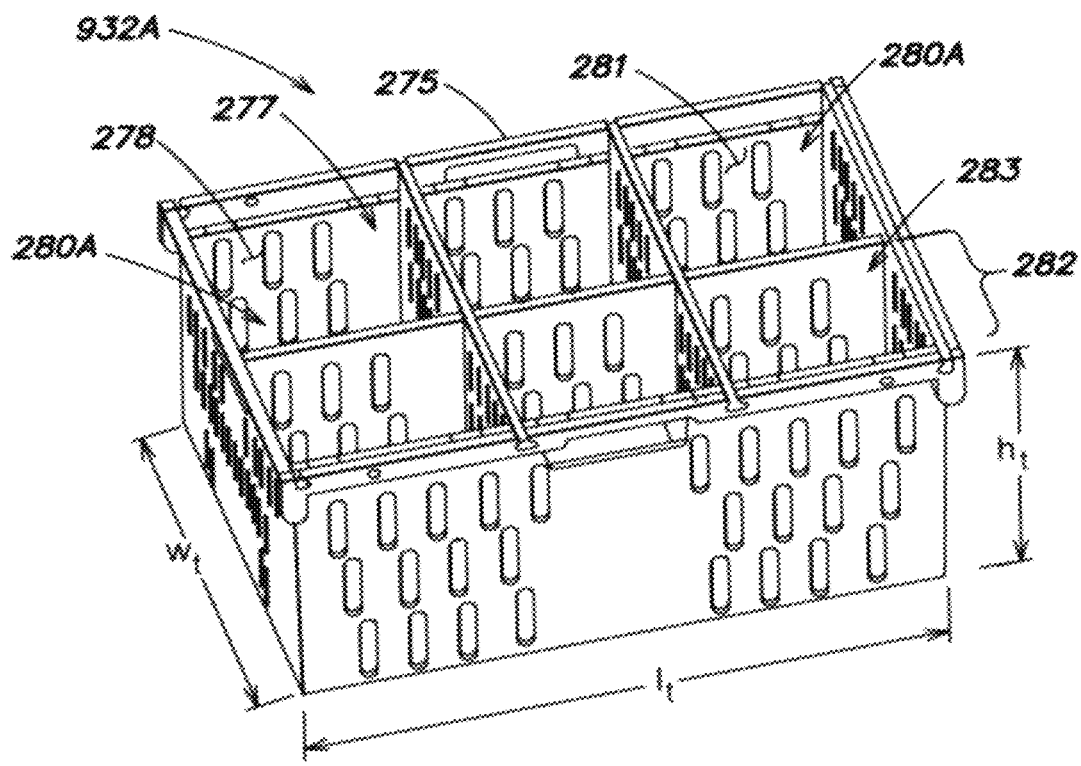
FIG. 19A shows a perspective view of an example tote with multiple sub-totes that divide the tote into six sub-tote compartments according to various inventive implementations of the present application.

In one example, FIG. 19A shows a tote 932A with multiple sub-totes 280A where each sub-tote 280A may be used to store different items. As shown, the tote 932A may generally include a sidewall 275 and a bottom side 276 that define a tote compartment 278 with an open top portion 277 to access the tote compartment 278. Items and/or sub-totes 280A may be placed into or removed from the tote compartment 278 through the open top portion 277. Each sub-tote 280A may similarly include a sidewall 281 and a bottom side (not shown) that define a sub-tote compartment 282 with an open top portion 283 to place items into or remove items from the sub-tote compartment 282. In some implementations, the tote 932A may include a divider instead of a sub-tote 280A to divide the tote compartment 278 into smaller compartments. The divider may be a wall that is inserted into the tote compartment 278. Thus, the combination of the divider, the sidewall 275, and the bottom side 276 may define the smaller compartment. The divider may be used in combination with the sub-tote 280A.

Each sub-tote 280A is fully disposed within the tote compartment 278 of the tote 932A. Thus, the sub-totes 280A effectively divide the tote compartment 278 into smaller sub-tote compartments 282 without increasing the overall size of the tote 932A. Additionally, each sub-tote 280A may be individually installed or removed from the tote 932A, for example, by a human or robotic picker at a workstation 168. In this manner, the sub-totes 280A may be used to store smaller quantities of items in a separate container while utilizing the standardized mechanical interface of the tote 932A to facilitate transport of these items throughout the G2P system 160. For example, the sub-totes 280A may be used to store low-velocity items, which are items that are sold at slower rates (e.g., spices) and thus typically require less stock in the store 110 to meet customer demand.

In some implementations, the sub-totes 280A may rest within the tote 932A without being securely coupled to the tote 932A. For example, the tote compartment 278 may fully filled with multiple sub-totes 280A where each sub-tote 280A is wedged into place due to contact with the sidewall 275 of the tote 932A and/or other sub-totes 280A. In some implementations, the tote 932A may include multiple registration features to align and position each individual sub-tote 280A within the tote compartment 278. For example, the sidewall 275 of the tote 932A may include multiple slots, notches, and/or ribs, which align with corresponding slots, notches, and/or ribs on each sub-tote 280A to constrain lateral movement of the sub-totes 280A regardless of whether other sub-totes 280A are installed in the tote 932A. In other words, a single sub-tote 280A may be installed into the tote 932A and constrained laterally by the registration features.

Figure 19B:
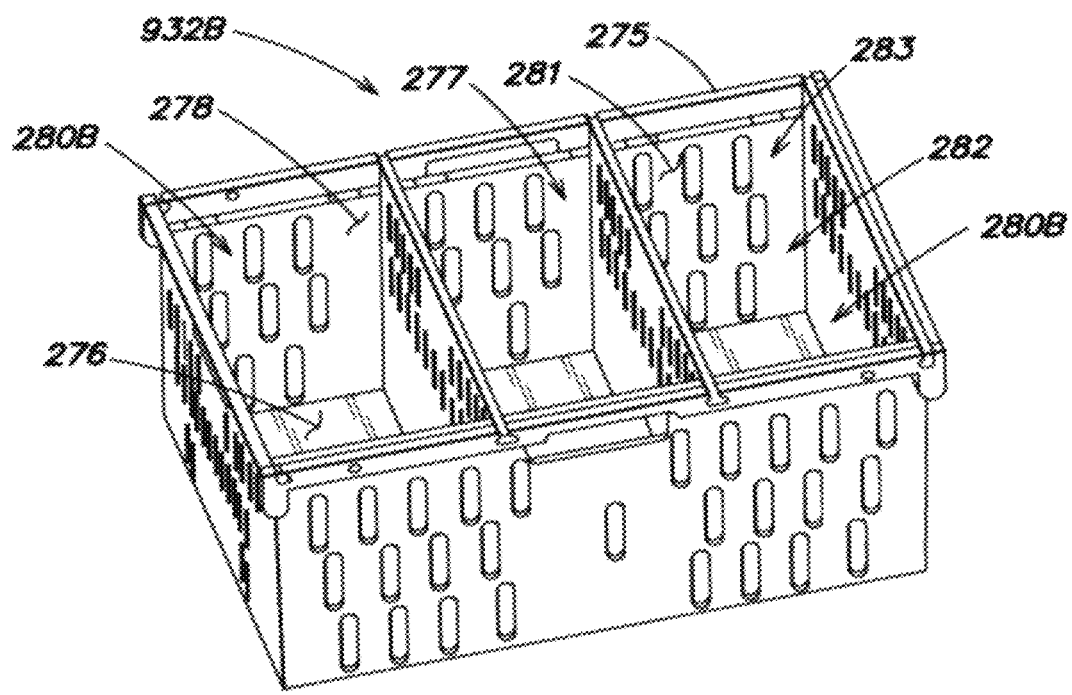
FIG. 19B shows a perspective view of another example tote with multiple sub-totes that divide the tote into three sub-tote compartments according to various inventive implementations of the present application.

The sub-totes may also be shaped to divide the tote compartment 278 into nominally equal-sized compartments. For example, FIG. 19A shows the sub-tote 280A may have a sub-tote compartment 282 that is about one-sixth of the tote compartment 278. FIG. 19B shows another example tote 932B with sub-totes 280B that each have a sub-tote compartment 282 that is about one-third of the tote compartment 278. As shown, the sub-totes 280B may be installed into the same tote as the sub-totes 280A. In some implementations, the tote may incorporate a combination of sub-totes 280A and 280B. For example, the tote 932 may contain one sub-tote 280B and four sub-totes 280A.

As shown in FIG. 19A, the tote 932A may generally be shaped as a five-sided container with an exterior length, $l_t$, an exterior width, $w_t$, and an exterior height, $h_t$. The exterior length, $l_t$, may be about 22 inches. More generally, the exterior length, $l_t$, may range from about 16 inches to about 28 inches. The exterior width, $w_t$, may be about 14 inches. More generally, the exterior width, $w_t$, may range from about 10 inches to about 18 inches. The exterior height, $h_t$, may be about 10 inches. More generally, the exterior height, $h_t$, may range from about 6 inches to about 14 inches.

The term "about," when used to describe the dimensions of the tote 932A, are intended to cover manufacturing tolerances. For example, "about 22 inches" may correspond to the following dimensional ranges: 21.78 to 22.22 inches (+/−1% tolerance), 21.824 to 22.176 inches (+/−0.8% tolerance), 21.868 to 22.132 inches (+/−0.6% tolerance), 21.912 to 22.088 inches (+/−0.4% tolerance), 21.956 to 22.044 inches (+/−0.2% tolerance), including all values and sub-ranges in between.

Additional examples of totes 932 with sub-totes may be found in U.S. Patent Publication No. 2019/0047787 published Feb. 14, 2019, having U.S. application Ser. No. 16/058,065, filed on Aug. 8, 2018, and entitled "Universal gripper for tote and sub-tote transport", which is incorporated herein in its entirety for all purposes.

Figure 20B:
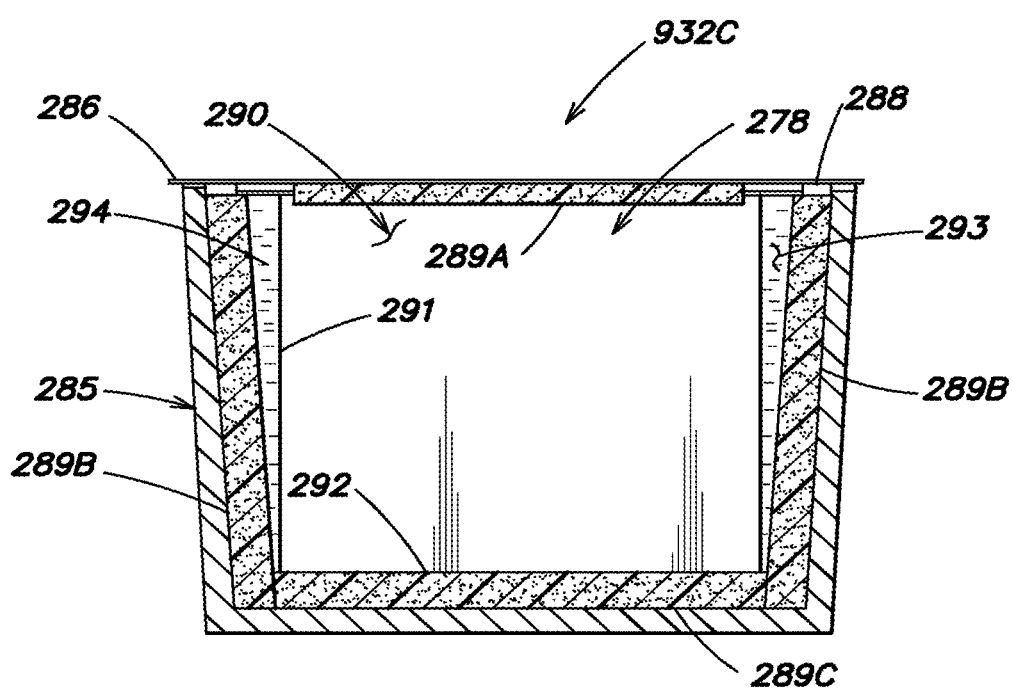
FIG. 20B shows a cross-sectional view of the tote of FIG. 20A.

In another example, FIGS. 20A and 20B show a tote 932C configured to store items at a chilled temperature or a frozen temperature. Generally, a chilled temperature may range from 0° F. to 34° F. and a frozen temperature may be less than or equal to 0° F. As shown, the tote 932C includes an enclosure 285 and a lid 286 coupled to the enclosure 285 via a hinge 288. The lid 286 may be opened when items are placed into or removed from the tote compartment 278 or to expose the tote compartment 278 to cooler temperatures when, for example, the tote 932C is placed into a chilled or frozen section of the container storage 164. Otherwise, the lid 286 may be closed to cover the open top portion 277 in order to better maintain the tote compartment 278 at the desired chilled or frozen temperature. The tote 932C may also include a sensor 287 to provide various data to the G2P system 160. For example, the sensor 287 may include a temperature sensor to monitor the temperature of the tote compartment 278. Additionally, the sensor 287 may also function as a tag or an ID, as described above, to identify the tote, its function within the G2P system 160 and the items contained in the tote 932 (if any). For example, the sensor 287 may include an RFID tag, which may be scanned by the robot 212 to identify the tote 932C for retrieval.

As shown in FIG. 20B, the tote 932C may include multiple thermally insulating panels disposed along the interior surfaces of the enclosure 285 and the lid 286. Specifically, the tote 932C includes an insulating panel 289A directly coupled to the lid 286, insulating panels 289B disposed along the sides of the enclosure 285, and an insulating panel 289C disposed on the bottom of the enclosure 285. The insulating panels 289A-289C may be formed from various materials including, but not limited to, polystyrene foam and urethane foam.

The tote 932C may further include a thermal insert 290 to maintain the tote compartment 278 at the desired temperature. As shown in FIG. 20B, the thermal insert 290 may include a sidewall 291 and a bottom side 292 disposed around and along the interior surfaces of the insulating panels 289B and 289C to contain the chilled or frozen items. The sidewall 291 and the bottom side 292 may also define a cavity 293 to store a material 294. The material 294 may be a phase change material that utilizes the latent heat of a phase transition to maintain a chilled or frozen temperatures for longer periods of time. Various phase change materials may be used including, but not limited to, pure water, water mixed with propylene glycol, ethylene glycol, glycerin, and/or salt, sodium polyacrylate, and dry ice.

It should be appreciated the various features described above with respect to the totes 932A-932C may be readily incorporated into other inventive implementations of totes. Additional examples of totes 932C configured to store chilled and/or frozen items may be found in U.S. Patent Publication No. 2020/071076 published Mar. 5, 2020, having U.S. application Ser. No. 16/554,512, filed on Aug. 28, 2019, and entitled "Tote handling for chilled or frozen goods" and U.S. Patent Publication No. 2021/0300664 published Sep. 30, 2021, having U.S. application Ser. No. 16/831,468, filed on Mar. 26, 2020, and entitled "Tote handling for chilled or frozen goods", each of which is incorporated herein in its entirety for all purposes.

3.7 An Example Computing Device for the Store

Figure 21:
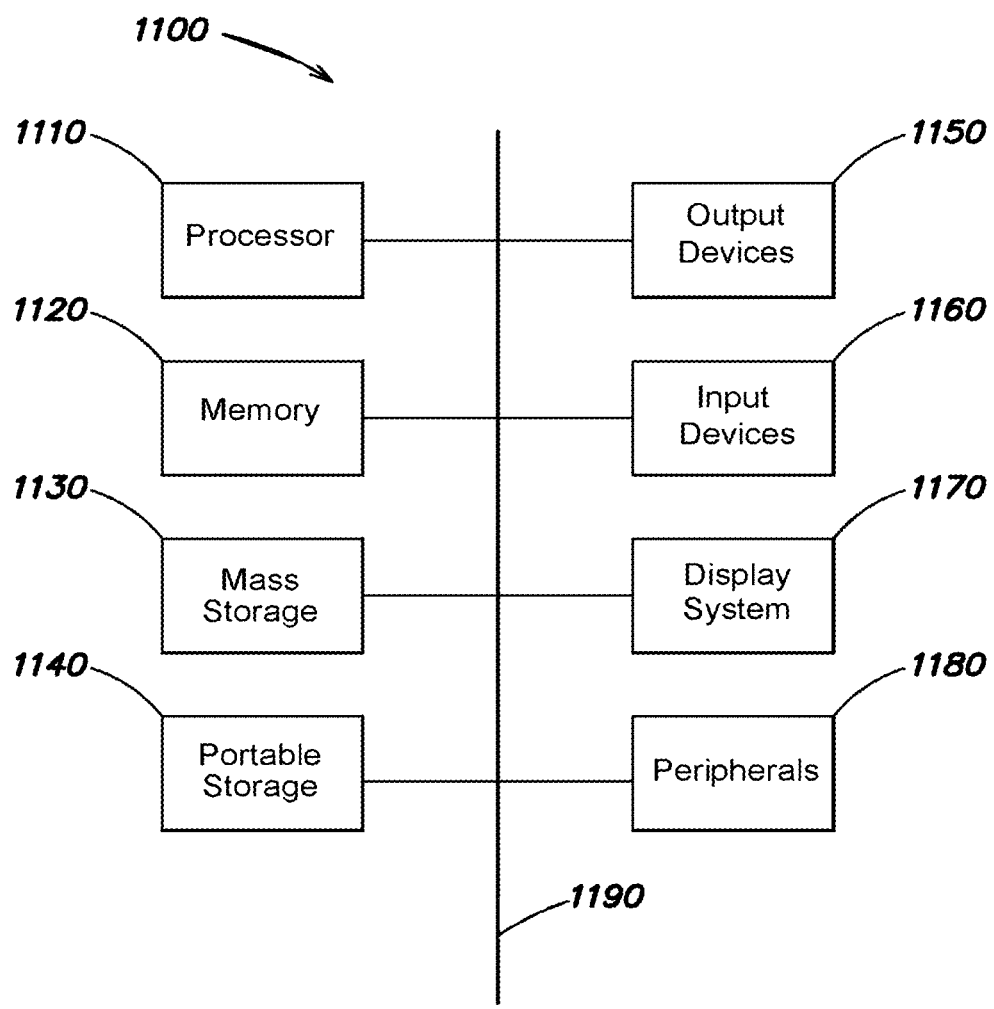
FIG. 21 shows a block diagram of an example computing device to facilitate operation of a store with a customer access portal and/or user interaction with the customer access portal according to various inventive implementations of the present application.

The various computing devices used to manage, control, and interface a store, such as the MCS 162 or the inventory management computing device 120, may generally include various computing components in various forms. For example, FIG. 21 shows a computing device 1100 that includes one or more processors 1110 and main memory 1120. The processor 1110 may execute various instructions and/or transmit various data associated with the various software applications used to operate the store, such as the site data application 126 or the inventory management application 128. The main memory 1120 may store executable code, instructions, and/or data for execution by the processor 1110.

The computing device 1100 may further include a mass storage device 1130, a portable storage medium drive(s) 1140, output devices 1150, user input devices 1160, a display system 1170, and/or other peripheral devices 1180. Furthermore, in some implementations, the various components of the computing device 1100 may be electrically and communicatively coupled via a bus 1190. However, it should be appreciated that, in some implementations, the various components of the computing device 1100 may be electrically and communicatively coupled together via multiple buses. For example, the processor 1110 and the main memory 1120 may be connected via a local microprocessor bus. In another example, the mass storage device 1130, peripheral device(s) 1180, portable storage medium drive(s) 1140, and display system 1170 may be connected via one or more input/output (I/O) buses.

The mass storage device 1130 may be a non-volatile storage device that stores various data, instructions, executable code (e.g., system software) for use by processor 1110, which may be loaded into the main memory 1120 before use. For example, the mass storage device 1130 may be a magnetic hard disk drive, a solid-state drive (e.g., non-volatile semiconductor memory), or an optical disk drive.

The portable storage medium drive(s) 1140 may operate in conjunction with a portable non-volatile storage medium, such as a floppy disk, a compact disk (CD), or a digital video disc (DVD), to input and output data and code to and from the computing device 1100. In some implementations, the system software for the store may be stored on a portable medium and run by the computing device 1100 via the portable storage medium drive(s) 1140.

The output devices 1150 may include various devices that provide a user (e.g., a customer, a store operator) information about the store. For example, the output devices 1150 may be various input devices including, but not limited to, a speaker, a printer, a network interface, and a monitor. In some implementations, the computing device 1100 may form part of a mechanical client device, thus the output device 1150 may include servo controls for motors within the mechanical device. For example, the computing device 1100 may be integrated into a customer's phone and the motors in the phone may be triggered to vibrate when the customer's order is ready for pickup.

The input devices 1160 may facilitate user interaction with the computing device 1100. For example, the input devices 1160 may be various input devices including, but not limited to, an alpha-numeric keypad (e.g., a keyboard) for inputting alpha-numeric and other information, a pointing device (e.g., a mouse, a trackball, stylus, or cursor direction keys), and a touch-sensitive display screen.

The display system 1170 may include a liquid crystal display (LCD) or any other suitable display device. The display system 1170 may generally receive textual and graphical information and process the information for display. For example, the display system 1170 may form part of a user interface for customers to interact and use a customer access portal. In another example, the display system 1170 may be a display screen used by a worker to supervise and operate the workstation 168 in the G2P system 160.

The peripheral device(s) 1180 may include other computing devices and accessories to facilitate operation and/or use of a store. For example, the peripheral device 1180 may include a modem or a router to network various computing devices and systems in the stores together.

The various components of the computing device 1100 are intended to cover components that are well known in the art. The computing device 1100 may come in various forms including, but not limited to, a personal computer, a handheld computing device, a telephone, a mobile computing device, a workstation, a server, a minicomputer, a mainframe computer, or any other computing device known to one of ordinary skill in the art. The computing device 1100 may also have different bus configurations, networked platforms, and/or multi-processor platforms. Furthermore, the computing device 1100 may support various operating systems including, but not limited to, UNIX, Linux, Windows, Macintosh OS, Android, and other suitable operating systems known to one of ordinary skill in the art.

4. Example Methods for Using a Customer Access System

The customer access system may be used in several ways to facilitate dispensing of ordered items to customers and/or retrieval and dispositioning of returned items from customers. The following are several example methods of operating and using the various customer access systems disclosed herein. It should be appreciated that these example methods are non-limiting examples and that one or more of the steps disclosed in one method may be incorporated in another method provided such steps are not mutually inconsistent or contradictory. Furthermore, the following methods may generally utilize one or both of the user interface 316A and 316B to facilitate interaction with the customer access portal 310.

Figure 22:
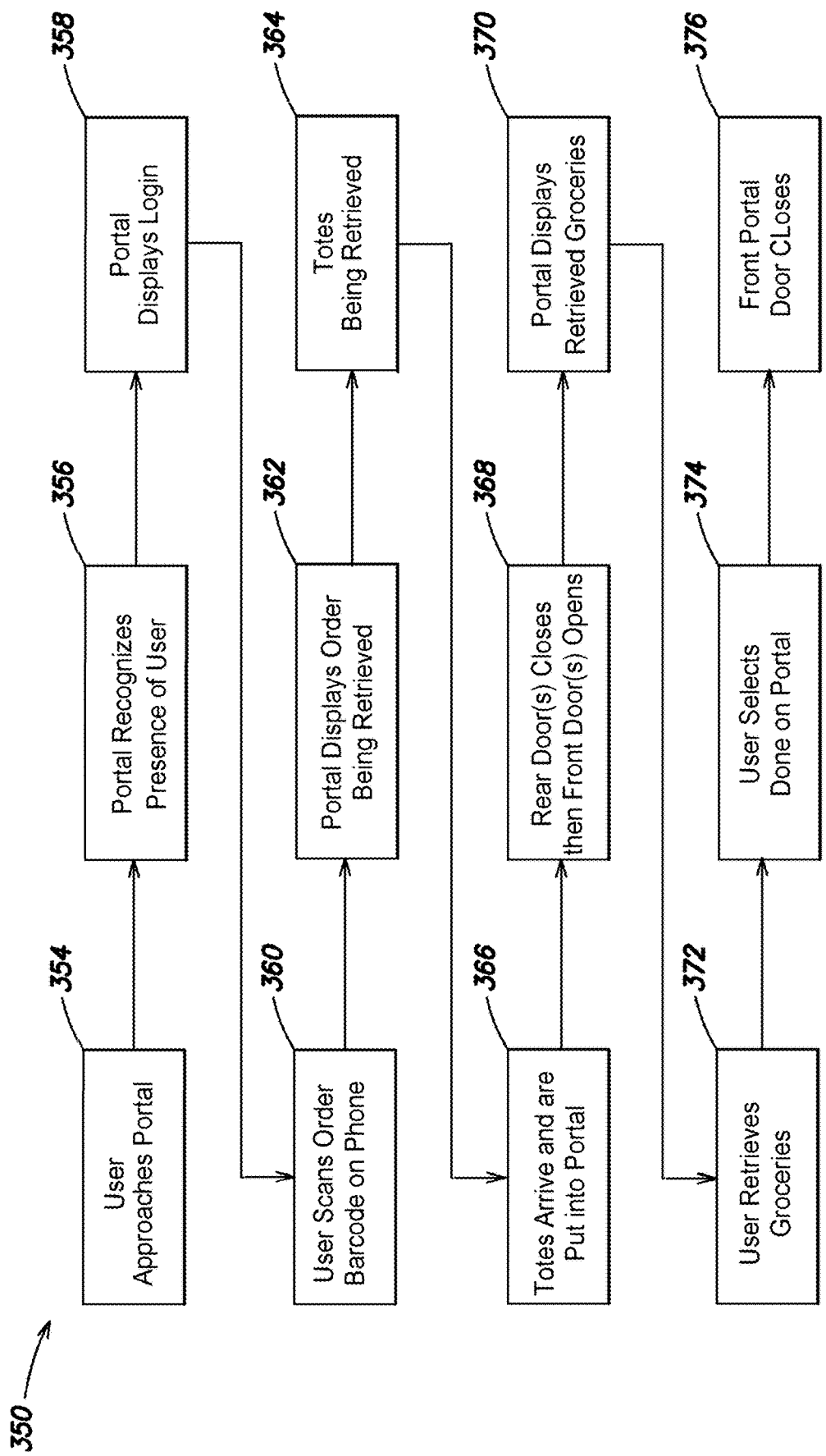
FIG. 22 shows a flow chart of an example method for dispensing an order to a customer according to various inventive implementations of the present application.

FIG. 22 shows a flowchart of a method 350 for dispensing an order to a customer. In the following, the method 350 is presented using the customer access portal 310A of FIG. 6A. However, it should be appreciated one or more steps of method 350 may also be applied to other customer access portals disclosed herein. As shown, the method 350 may begin with the customer approaching the customer access portal 310A (step 354). The customer access portal 310A may then recognize the presence of the customer (e.g., via a camera, a proximity sensor) (step 356). The user interface 316A then displays a login request for the customer (step 358). The customer may then provide an input to the user interface 316A to identify the customer's order (e.g., scanning a barcode, a product code, a QR code on a phone, swiping a credit card) (step 360). The customer access portal 310A may then provide the customer information related to the customer's order (e.g., display the customer's order on a display screen, provide an auditory message containing information related to the customer's order) (step 362). The user interface 316A may then identify one or more totes 932 are being retrieved from the G2P system 160 (e.g., the container storage 164) or the storage structure 896 (step 364). Once the totes 932 arrive to the customer access portal 310A and are loaded, the user interface 310A may inform the customer the totes 932 arrived and are loaded (step 366). The interior safety door 318 may then close and the external portal door 314 may then open to present the totes 932 containing the ordered items to the customer (step 368). The user interface 316A may then display the various ordered items (e.g., groceries) the customer ordered (step 370). The customer may then retrieve the ordered items from the totes 932 (step 372). Once the customer is finished, the customer may then provide an input to the user interface 316A the order pickup is complete (e.g., by selecting a "done" or "complete" option on the user interface 316A) (step 374). Thereafter, the external portal door 315 may then close (step 376).

Figure 23:
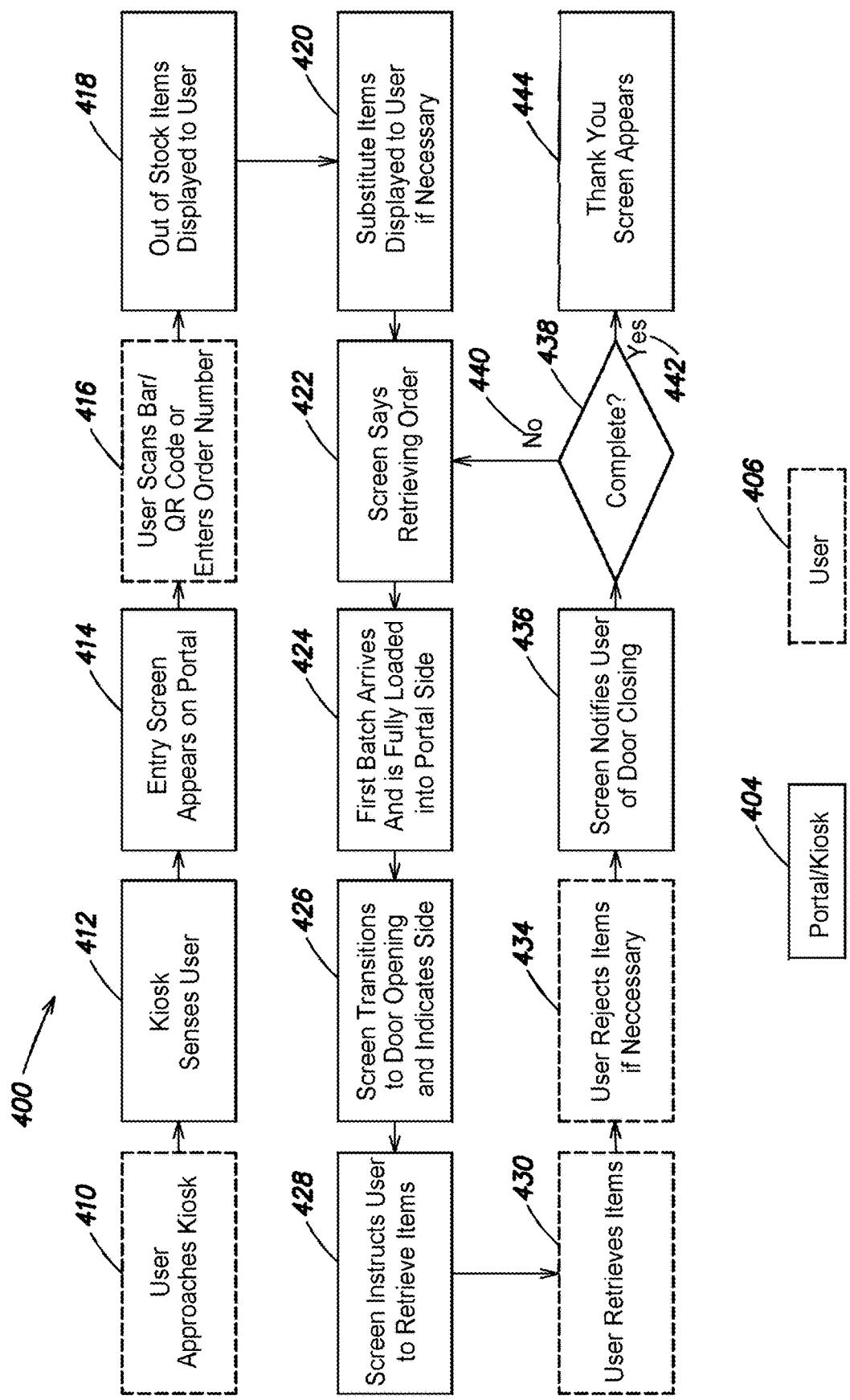
FIG. 23 shows a flow chart of an example method for dispensing an order using a customer access portal with the option of providing substitute items according to various inventive implementations of the present application.

FIG. 23 shows a flow chart of another example method 400 for dispensing an order using a customer access portal 310 with the option of providing substitute items. As shown, the method 400 may begin with the customer approaching the customer access portal 310 (or kiosk) (step 410). The customer access portal 310 may sense or recognize the presence of the customer (e.g., via a camera, a proximity sensor) (step 412). The user interface 316A then displays an entry screen and/or a login request for the customer (step 414). Alternatively, the customer may scan a bar code, a product code, or a QR code on a phone or enter an order number using a touch screen or a keypad (step 416). If any of the ordered items are out of stock, the user interface 316A may display or inform the customer which items are out of stock (step 418). The user interface 316A may then provide or suggest substitute items, which may be displayed (step 420) The user interface 316A may then identify the order is being retrieved from the G2P system 160 (e.g., the container storage 164) or the storage structure 896 (step 422). Once one or more totes 932 arrive at the customer portal 310, the user interface 316A informs the customer a first batch of totes 932 have arrived and are loaded into the customer access portal 310 (step 424). The user interface 316A may then provide an animation showing a door opening and indicate which door or drawer of the customer access portal 310 is opening (step 426). If the customer access portal 310 is the customer access portal 310A, the interior safety door 318 may then close and the external portal door 314 may then open to present the totes 932 containing the ordered items to the customer. The user interface 316A may then display the various ordered items (e.g., groceries) the customer ordered (step 428). The customer may then retrieve the ordered items from the totes 932 (step 430). While retrieving the ordered items, the customer may reject any items they no longer want to take (e.g., unwanted substitute items) (step 434). Once the customer is finished, the customer may then provide an input to the user interface 316A the order pickup is complete (e.g., by selecting a "done" or "complete" option on the user interface 316A) and the door or drawer may then close (step 436). The user interface 316A may then check if the order is complete (step 438). If the order is not complete (step 440), the method may return to step 422 and the user interface 316A may indicate more items are being retrieved. If the order is complete (step 442), the user interface 316A provides the customer a thank you screen (step 444). FIG. 23 shows different methods steps performed by the customer access portal 310 in solid blocks (404) and steps performed by the customer in dotted blocks (406).

Figure 24:
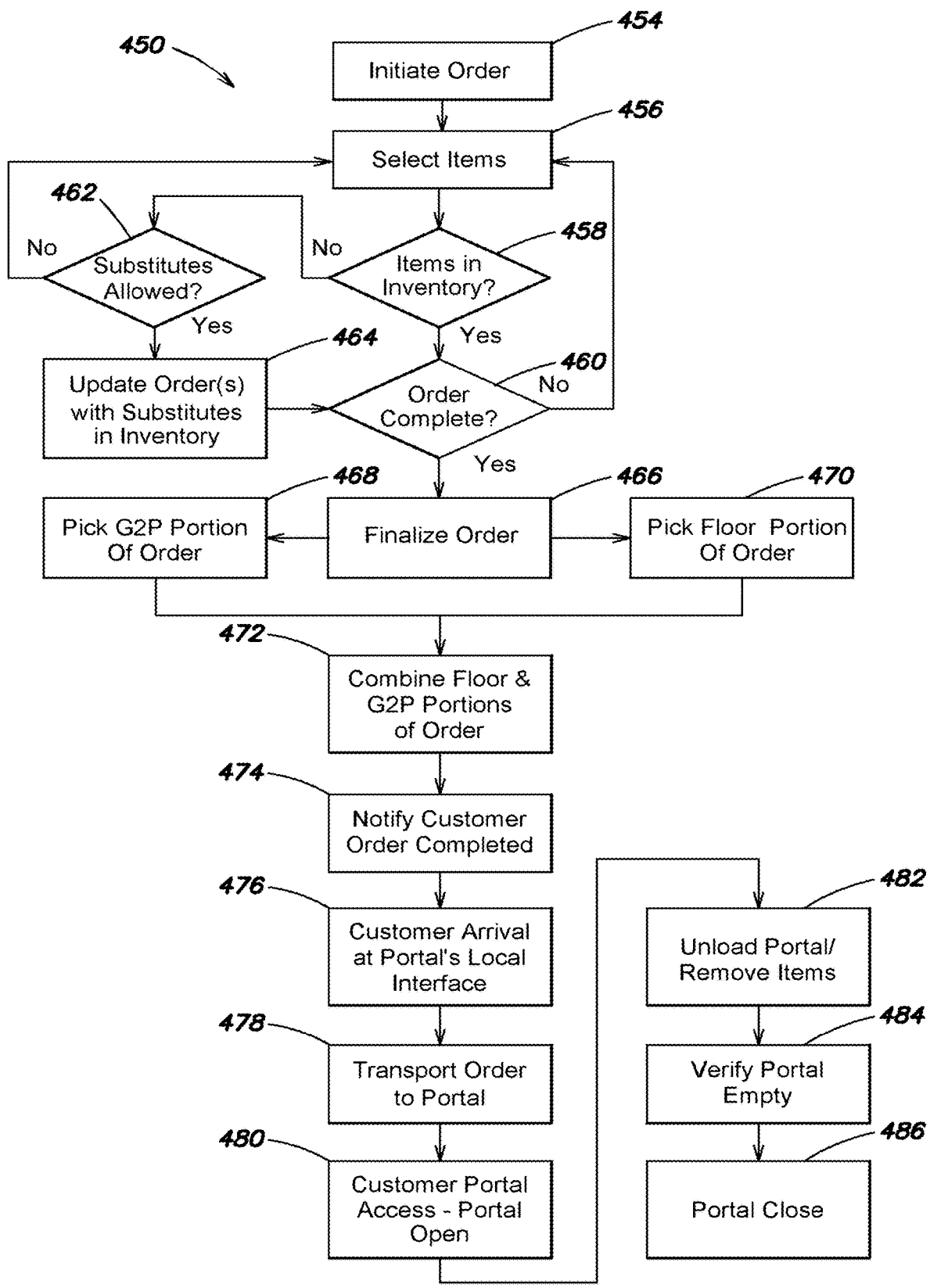
FIG. 24 shows a flow chart of an example method for placing an order, picking the order, and dispensing the order using a customer access portal according to various inventive implementations of the present application.

FIG. 24 shows a flow chart of another example method 450 for placing an order, picking the order, and dispensing the order using a customer access portal 310. In general, the method 450 may cover a typical use case where the customer may travel to one customer access portal 310 (e.g., the customer is out of their vehicle and standing in front of the user interface 316A). The customer access system 1000 may then collect, consolidate, and load the customer access portal 310. Once the customer access portal 310 is loaded, the drawer or door may open for the customer to retrieve their order. In some implementations, the customer access system 1000 may wait until the customer arrives at the customer access portal 310 before loading the totes 932 into the customer access portal 310.

As shown, the method 450 may begin by the customer initiating an order via, for example, the user interface 316A or 316B (step 454). Once an order is initiated, the customer may then select one or more items for purchase (step 456). The G2P system 160 and/or the inventory management computing device 120 may then check the inventory regarding the availability of the selected items (step 458). If the selected items are available, the order may then be checked for completion (step 460). If one or more of the selected items are not available and the customer indicates substitute items are not allowed, the customer is prompted to select another item by returning to step 456 (step 462). If one or more of the selected items are not available and the customer indicates substitute items are allowed, the order is updated to include the substitute items (step 464). The order is then checked for completion again at step 460. If the customer indicates the order is not complete, the method may return to step 456 and the customer is prompted to select additional items for purchase. If the order is complete, the order is finalized (step 466). At an appropriate time (e.g., when the customer is in transit to the store 110, before a scheduled pickup time), the workstation(s) 168 of the G2P system 160 picks a portion of the order if at least one ordered item originates from the G2P system 160 (step 468). At the same time, a portion of order is picked from the sales floor area 130 (e.g., by a worker) if at least one ordered item originates from the sales floor area 130 (step 470). If the order contains items sourced from the G2P system 160 and the sales floor area 130, the items may then be combined and consolidated (step 472). The customer is then notified the order is complete (e.g., via the user interface 316A or 316B) (step 474). The customer then travels to the customer access portal 310 to pick up the order (step 476). The totes 932 containing the ordered items are transported to the customer access portal 310 (step 478). The customer then accesses the customer access portal 310 (step 480) and thereafter unloads the ordered items from the customer access portal 310 (step 482). Once the customer finishes retrieving the ordered items, the customer access portal 310 verifies the totes 932 are empty (e.g., via the camera 322) (step 484). If the customer access portal 310 determines the totes 932 are empty, the drawer or door is closed (step 486) and the customer then leaves.

Figure 25:
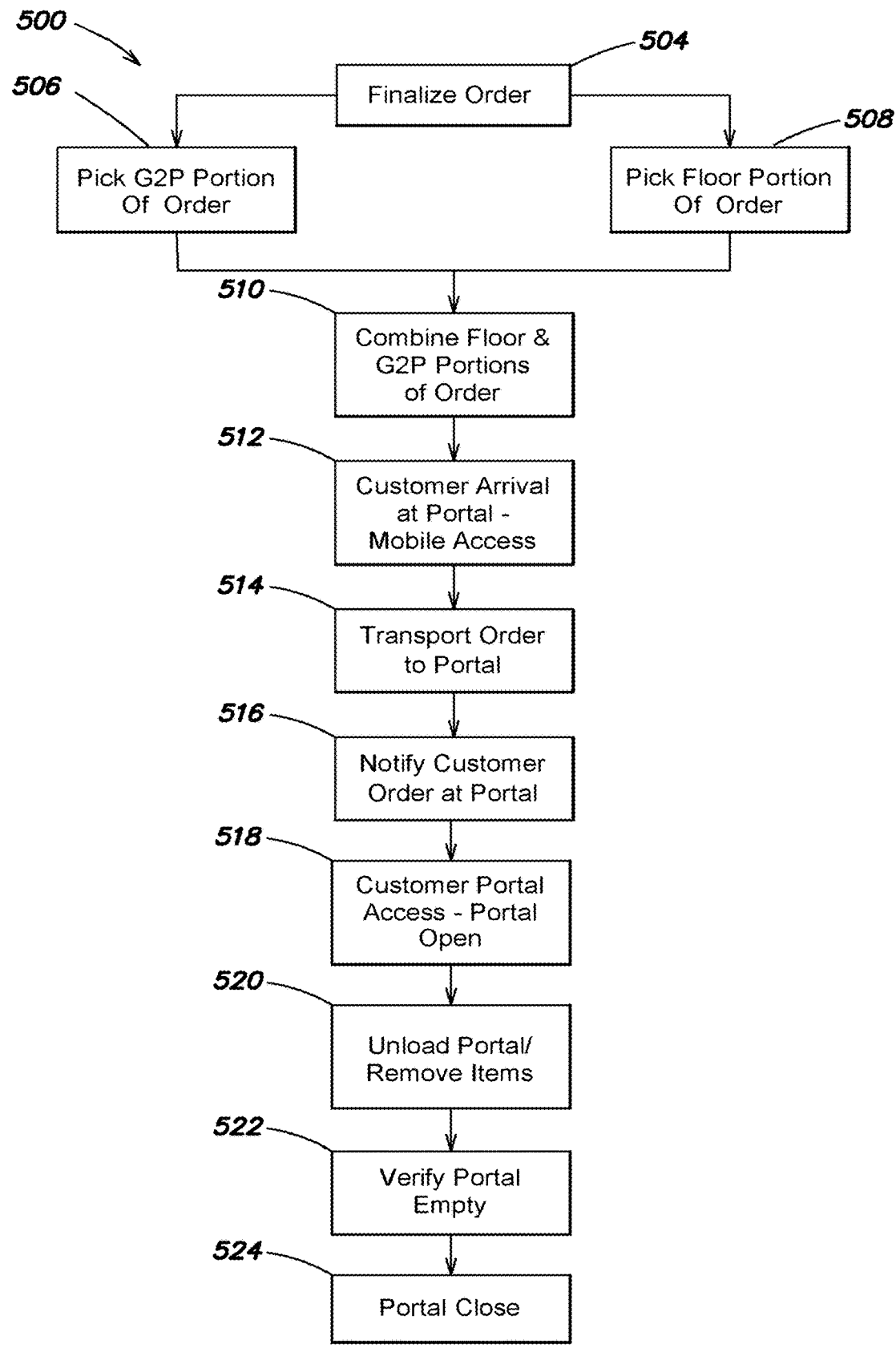
FIG. 25 shows a flow chart of an example method for picking an order and dispensing the order using a customer access portal that is accessed via a mobile computing device according to various inventive implementations of the present application.

FIG. 25 shows a flow chart of another example method 500 for picking an order and dispensing the order using a customer access portal that is accessed via a mobile computing device. The method 500 may be similar to the method 450 with the difference being the customer may initially remain in their vehicle when picking up an order. Specifically, the customer may arrive at a designated area near the customer access portal 310 (e.g., a parking spot) and interact with the customer access portal 310 via a mobile computing device (e.g., a smartphone) with the user interface 316B. The customer may then wait in their vehicle until the customer access portal 310 is filled with their order totes. The customer may then be notified via their mobile computing device the customer access portal 310 is loaded. Then, the customer may exit their vehicle and use the user interface 316A of the customer access portal 310 or the user interface 316B to access and/or open the customer access portal 310.

As shown, the method 500 may begin with the customer's order being finalized (step 504). At an appropriate time (e.g., when the customer is in transit to the store 110, before a scheduled pickup time), the workstation(s) 168 of the G2P system 160 picks a portion of the order if at least one ordered item originates from the G2P system 160 (step 506). At the same time, a portion of order is picked from the sales floor area 130 (e.g., by a worker) if at least one ordered item originates from the sales floor area 130 (step 508). If the order contains items sourced from the G2P system 160 and the sales floor area 130, the items may then be combined and consolidated (step 510). The customer than travels to the customer access portal 310 to pick up the order. Once the customer arrives at the customer access portal 310, the customer may inform the customer access system 1000 of their arrival via their mobile computing device (step 512). The totes 932 containing the ordered items are transported to the customer access portal 310 (step 514). The customer is then notified when the order is loaded into the customer access portal 310 (step 516). The customer then accesses the customer access portal 310 (e.g., by exiting their vehicle) (step 518) and thereafter unloads the ordered items from the customer access portal 310 (step 520). Once the customer finishes retrieving the ordered items, the customer access portal 310 verifies the totes 932 are empty (e.g., via the camera 322) (step 522). If the customer access portal 310 determines the totes 932 are empty, the drawer or door is closed (step 524) and the customer then leaves.

Figure 26:
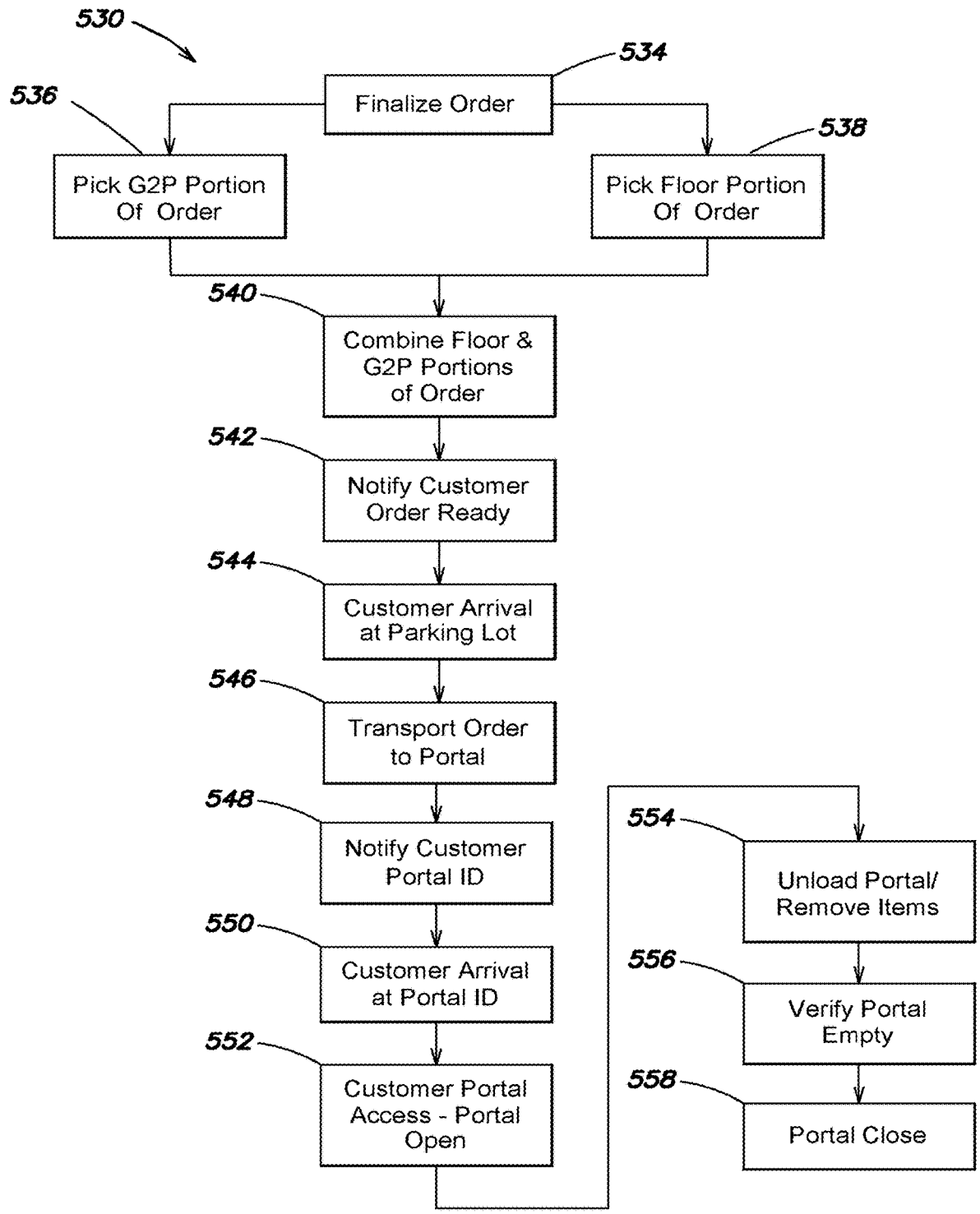
FIG. 26 shows a flow chart of an example method for picking an order and dispensing the order using a customer access portal where the customer is directed to a waiting area and then to a specific customer access portal according to various inventive implementations of the present application.

FIG. 26 shows a flow chart of another example method 530 for picking an order and dispensing the order using a customer access portal where the customer is directed to a waiting area and then to a specific customer access portal. The method 530 may be similar to the method 450 with the difference being the customer may first arrive and wait at the waiting area before moving to the customer access portal 310 to pick up their order. When the customer waits at the waiting area, the totes 932 containing the customer's ordered items are collected and transported to the customer access portal 310. Once the customer access portal 310 is loaded, the customer may then be directed to drive their vehicle to a spot near the customer access portal 310. The customer may then access the customer access portal 310 (e.g., via the user interface 316A or the user interface 316B). In some implementations, the designated waiting area may be a parking space in a parking lot. In some implementations, the customer access system 1000 may rely upon the customer to inform the customer access system 1000 the customer is present. In some implementations, the customer access system 1000 may track the customer's location (e.g., via GPS on their mobile computing device). After the customer access portal 310 is loaded, the customer may be instructed which customer access portal 310 to go to.

As shown, the method 530 may begin with the customer's order being finalized (step 534). At an appropriate time (e.g., when the customer is in transit to the store 110, before a scheduled pickup time), the workstation(s) 168 of the G2P system 160 picks a portion of the order if at least one ordered item originates from the G2P system 160 (step 536). At the same time, a portion of order is picked from the sales floor area 130 (e.g., by a worker) if at least one ordered item originates from the sales floor area 130 (step 538). If the order contains items sourced from the G2P system 160 and the sales floor area 130, the items may then be combined and consolidated (step 510). The customer is then notified the order is complete (e.g., via the user interface 316A or 316B) (step 542). The customer then travels to the customer access portal 310, waits at a nearby parking lot, and informs the customer access system 1000 the customer is waiting (step 544). The totes 932 containing the ordered items are transported to the customer access portal 310 (step 546). Once a particular customer access portal 310 is loaded with the customer's order, the customer may then be informed which customer access portal 310 to go to (step 548). The customer then goes to the appropriate customer access portal 310 (step 550). The customer then accesses the customer access portal 310 (step 552) and thereafter unloads the ordered items from the customer access portal 310 (step 554). Once the customer finishes retrieving the ordered items, the customer access portal 310 verifies the totes 932 are empty (e.g., via the camera 322) (step 556). If the customer access portal 310 determines the totes 932 are empty, the drawer or door is closed (step 558) and the customer then leaves.

Figure 27:
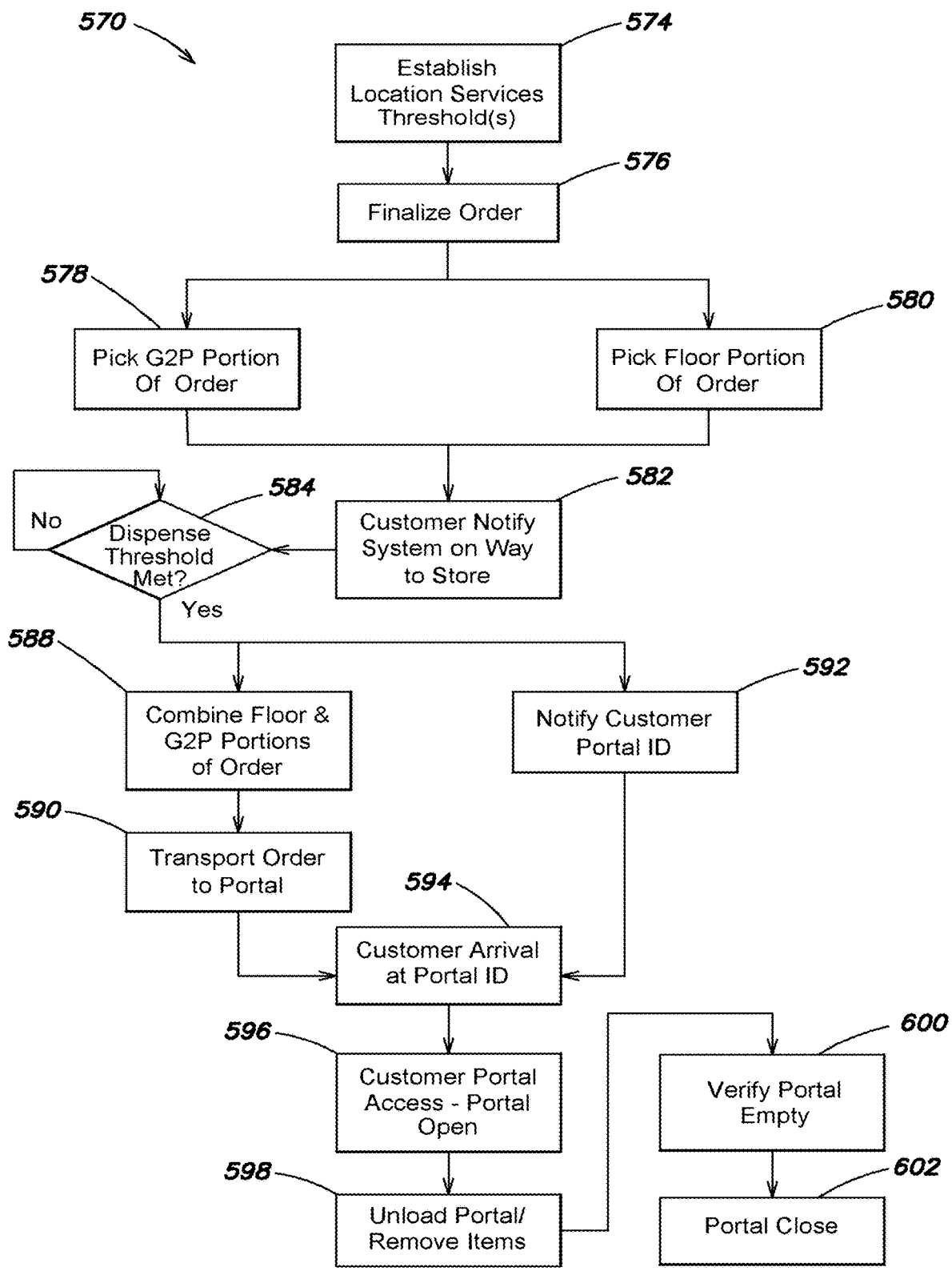
FIG. 27 shows a flow chart of an example method for picking an order and dispensing the order using a customer access portal based on the customer's location and estimated time of arrival to the customer access portal according to various inventive implementations of the present application.

FIG. 27 shows a flow chart of another example method 570 for picking an order and dispensing the order using a customer access portal 310 based on the customer's location and estimated time of arrival to the customer access portal 310. The method 570 may be executed, in part, by the customer activating a location-tracking system or service (e.g., global positioning system (GPS)) on a personal computing device (e.g., a smart phone, a cellular device) to indicate they are in transit to the store 110. When the customer is within a specified estimated time of arrival or distance, the customer access system 1000 may begin loading the customer access portal 310 with one or more totes 932 for the customer. For example, the estimated time of arrival to the store 110 may be less than 10 minutes or the customer may be less than 1 mile from the store 110. It should be appreciated the foregoing estimate time of arrival and the distance are non-limiting examples and that any estimated time of arrival and/or distance may be set as a condition to initiate loading of the customer access portal 310.

When the customer arrives at the store 110 (e.g., the parking lot), the customer's personal computing device may direct them to the specific customer access portal 310 containing their order. For example, the user interface 316B may instruct the customer to go to a customer access portal 310 with a particular portal ID or number. Once the customer arrives at the customer access portal 310 containing their order, the customer may indicate their arrival via the user interface 316A on the customer access portal 310 or the user interface 316B on their person computing device. The customer access portal 310 may then immediately open to present the customer their order. In some implementations, the method 570 may utilize geofencing to determine the customer access portal 310 to load the totes 932 for the customer and to direct the customer to the appropriate customer access portal 310 for pickup.

In some implementations, the method 570 (and the method 530) may also determine which customer access portal 310 to load and the timing to load the tote(s) 932 into the customer access portal 310 based on the customer's previous pickups to the same store. For example, the customer access system 1000 may adjust the timing to load the tote(s) 932 based on the customer's previous travel time to the store 110 and/or the time of day of the pickup (e.g., during the afternoon in low traffic conditions, during high traffic conditions such as morning or evening rush hour). In another example, the customer access system 1000 may also compensate for the customer's history of arriving at the customer access portal 310 at a scheduled pickup time. If the customer repeatedly arrives at the customer access portal 310 ten minutes after a scheduled pickup time, the customer access system 1000 may delay loading the customer access portal by up to ten minutes to compensate for the customer's previous delayed arrival. However, it should be appreciated the customer access system 1000 may rely on other information (e.g., customer location, ETA) and prioritize loading the totes 932 closer to the scheduled pickup time.

As shown, the method 570 may begin with establishing a location services threshold (step 574). The location services threshold (also referred to as a dispense threshold) may include one or more conditions, which when met, may trigger the customer access system 1000 to dispense and load the tote(s) 932 for the customer. For example, the conditions may include a threshold ETA for the customer's arrival to the store 110 below which the tote(s) 932 are dispensed and loaded into the customer access portal 310. In another example, the conditions may include a threshold distance between the customer and the store 110 below which the tote(s) 932 are dispensed and loaded into the customer access portal 310. It should be appreciated the location services threshold may not be fixed, but instead may dynamically change in response to unexpected events (e.g., a traffic accident occurs between the customer and the store 110 that causes a delay).

After establishing a location services threshold, the customer's order may then be finalized (step 576). At an appropriate time (e.g., when the customer is in transit to the store 110, before a scheduled pickup time), the workstation(s) 168 of the G2P system 160 picks a portion of the order if at least one ordered item originates from the G2P system 160 (step 578). At the same time, a portion of order is picked from the sales floor area 130 (e.g., by a worker) if at least one ordered item originates from the sales floor area 130 (step 580).

When the customer begins to travel to the store 110, the customer may notify the customer access system 1000 they are on their way (step 582). This may be accomplished by pressing a button on the GUI of the user interface 316B to inform the customer access system 1000 they are in transit. The customer access system 1000 may then monitor and track the customer's location to evaluate their ETA and/or distance relative to the ETA threshold and/or distance threshold of the location services threshold before proceeding to the next steps of the method 570. Once the location services threshold is met, if the order contains items sourced from the G2P system 160 and the sales floor area 130, the items may then be combined and consolidated (step 588). The totes 932 containing the ordered items are then transported to the customer access portal 310 (step 590). At the same time as steps 588 and 590 are executed, the customer access system 1000 may designate a particular customer access portal 310 for the customer's order and then inform the customer which customer access portal 310 will contain their order (e.g., based on the customer access portal ID or number) (step 592). The customer then goes to the appropriate customer access portal 310 when they arrive at the store 110 (step 594). The customer then accesses the customer access portal 310 (step 596) and thereafter unloads the ordered items from the customer access portal 310 (step 598). Once the customer finishes retrieving the ordered items, the customer access portal 310 verifies the totes 932 are empty (e.g., via the camera 322) (step 600). If the customer access portal 310 determines the totes 932 are empty, the drawer or door is closed (step 602) and the customer then leaves.

Figure 28:
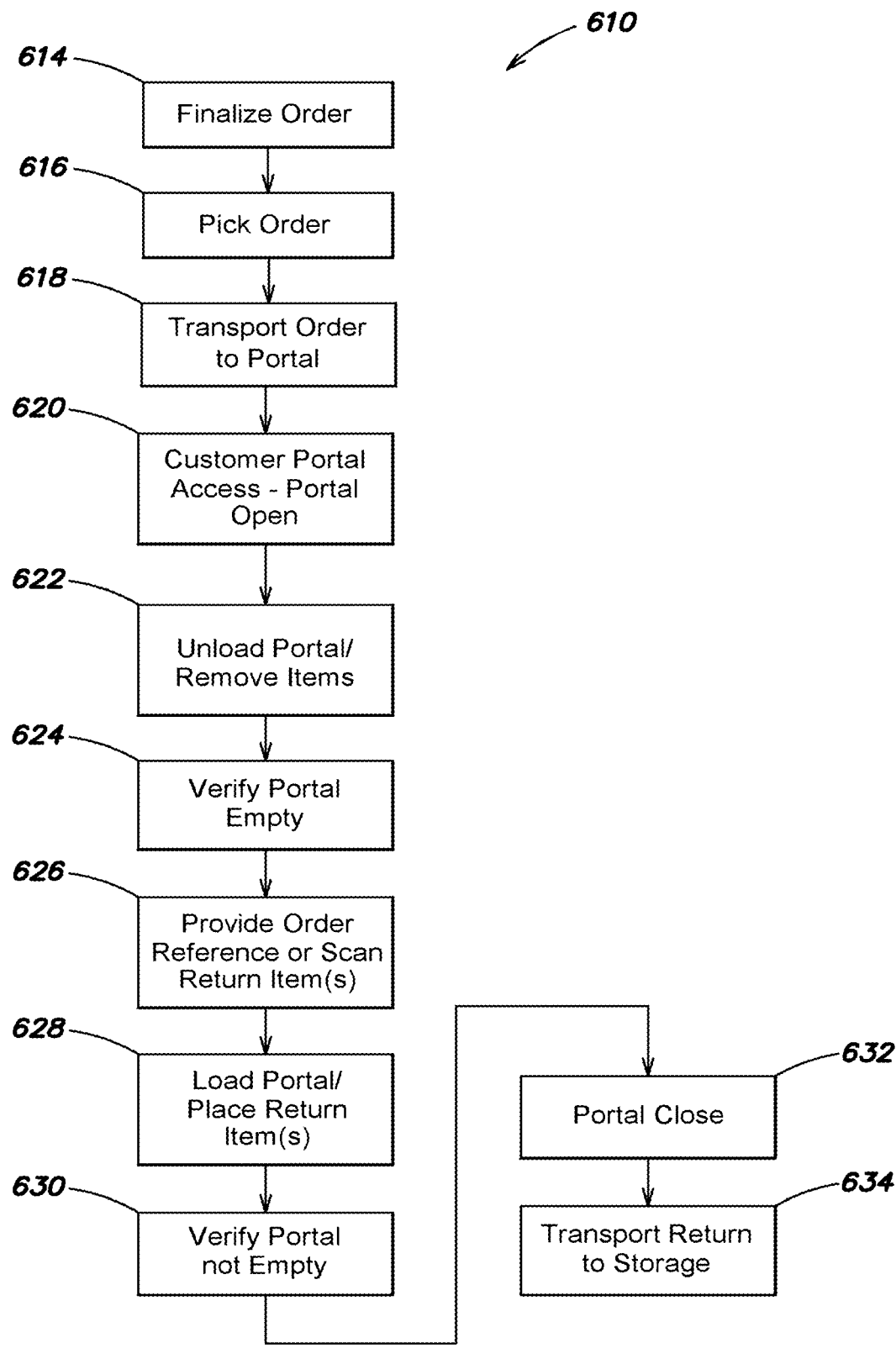
FIG. 28 shows a flow chart of an example method for dispensing an order and returning another order using a customer access portal according to various inventive implementations of the present application.

FIG. 28 shows a flow chart of another example method 610 for dispensing an order and returning another order using the customer access portal 310 (recall that, earlier in connection with FIGS. 2A, 2B and 2C, methods for returning one or more items of an order via a customer access portal, whether or not an order was being dispensed to a customer, previously were disclosed above). As shown in FIG. 28, the method 610 may begin with the customer's order being finalized (step 614). At an appropriate time (e.g., when the customer is in transit to the store 110, before a scheduled pickup time), the customer's may be picked (e.g., via one or more workstations 168 system 160 or a worker) (step 616). The totes 932 containing the ordered items are transported to the customer access portal 310 (step 618). The customer then accesses the customer access portal 310 (step 620) and thereafter unloads the ordered items from the customer access portal 310 (step 622). Once the customer finishes retrieving the ordered items, the customer access portal 310 verifies the totes 932 are empty (e.g., via the camera 322) (step 624). If the customer access portal 310 determines the totes 932 are empty, the order pickup is determined to be complete. At this stage, the customer may then proceed with processing their returned items. This may begin by the customer inputting information on the items being returned via the user interfaces 316A or 316B. This may be accomplished, for example, by scanning a QR code, a bar code, or a product code or swiping a credit card to identify the customer's order and/or the returned items (step 626). Additionally, the customer may provide an item description or a picture to identify the items being returned. The customer may then load the returned item(s) into the customer access portal 310 (step 628). Once the customer finishes placing the returned items, the customer access portal 310 verifies the totes 932 are not empty (e.g., via the camera 322) (step 630). If the customer access portal 310 determines the totes 932 are not empty (i.e., the totes 932 contain the returned item(s)), the drawer or door is closed (step 632) and the returned items are transported for dispositioning (step 634).

Figure 29:
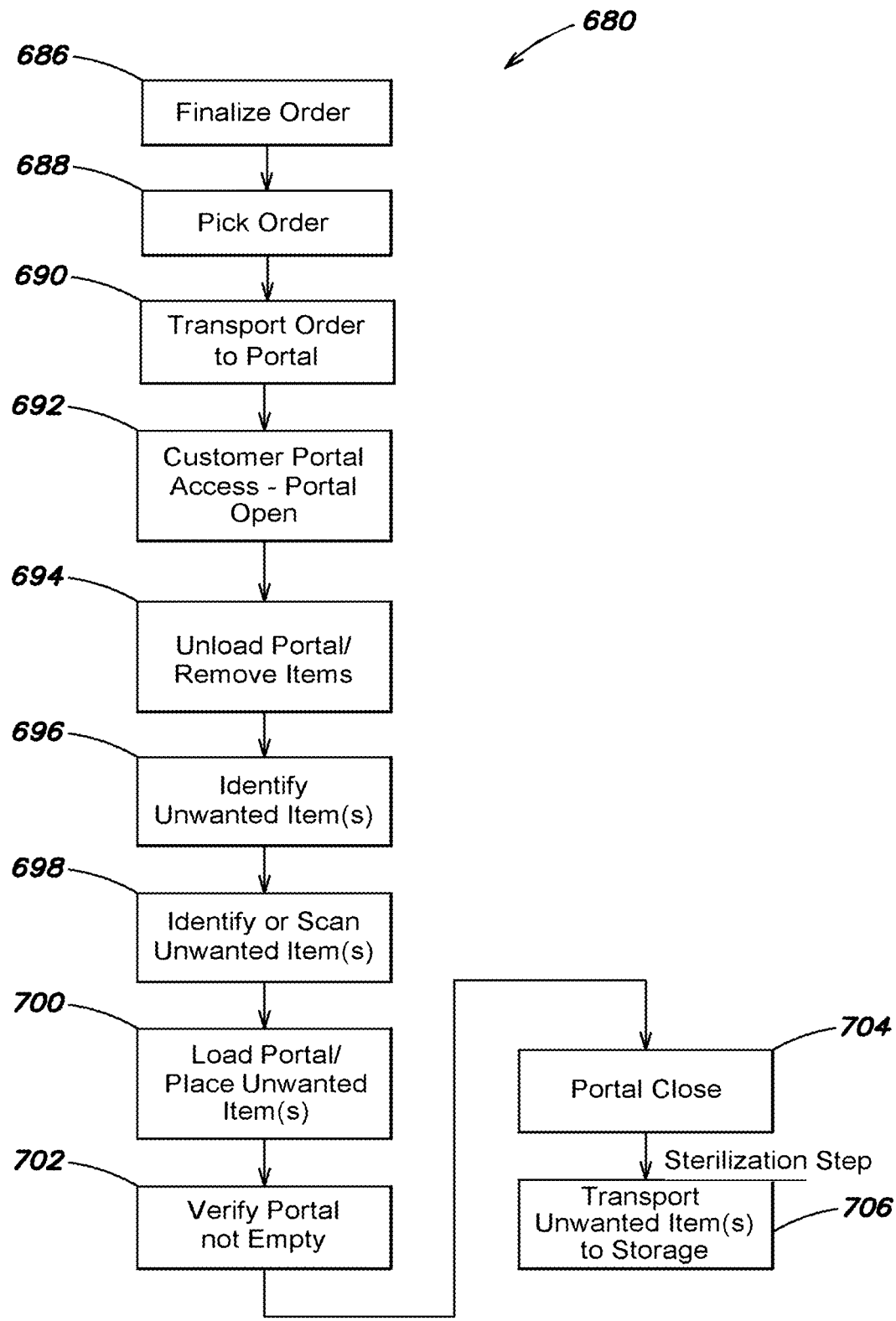
FIG. 29 shows a flow chart of an example method for dispensing an order and returning items from the order using a customer access portal according to various inventive implementations of the present application.

FIG. 29 shows a flow chart of another example method 680 for dispensing an order and returning items from the order using the customer access portal 310. The method 680 may facilitate returns, for example, of one or more, unwanted, damaged, and/or substitute items at the same time as the customer is picking up their ordered items. As shown, the method 680 may begin with the customer's order being finalized (step 686). At an appropriate time (e.g., when the customer is in transit to the store 110, before a scheduled pickup time), the customer's may be picked (e.g., via one or more workstations 168 system 160 or a worker) (step 688). The totes 932 containing the ordered items are transported to the customer access portal 310 (step 690). The customer then accesses the customer access portal 310 (step 692) and thereafter may unload one or more of the ordered items from the customer access portal 310 (step 694). At this stage, the customer may determine which items (if any) they do not want to keep (step 696). If the customer determines they want to return one or more items, they may then input information on the returned items via the user interfaces 316A or 316B, for example, by scanning a QR code, a bar code, or a product code or swiping a credit card to identify the customer's order and/or the returned items (step 698). The customer may then load the returned item(s) into the customer access portal 310 (step 700). Once the customer finishes placing the returned items, the customer access portal 310 verifies the totes 932 are not empty (e.g., via the camera 322) (step 702). If the customer access portal 310 determines the totes 932 are not empty (i.e., the totes 932 contain the returned item(s)), the drawer or door is closed (step 704) and the returned items are transported for dispositioning (step 706). In some implementations, the returned item(s) and/or the tote(s) 932 containing the returned item(s) may be disinfected or sterilized (e.g., via the decontamination module 220).

Figures 1, 30:
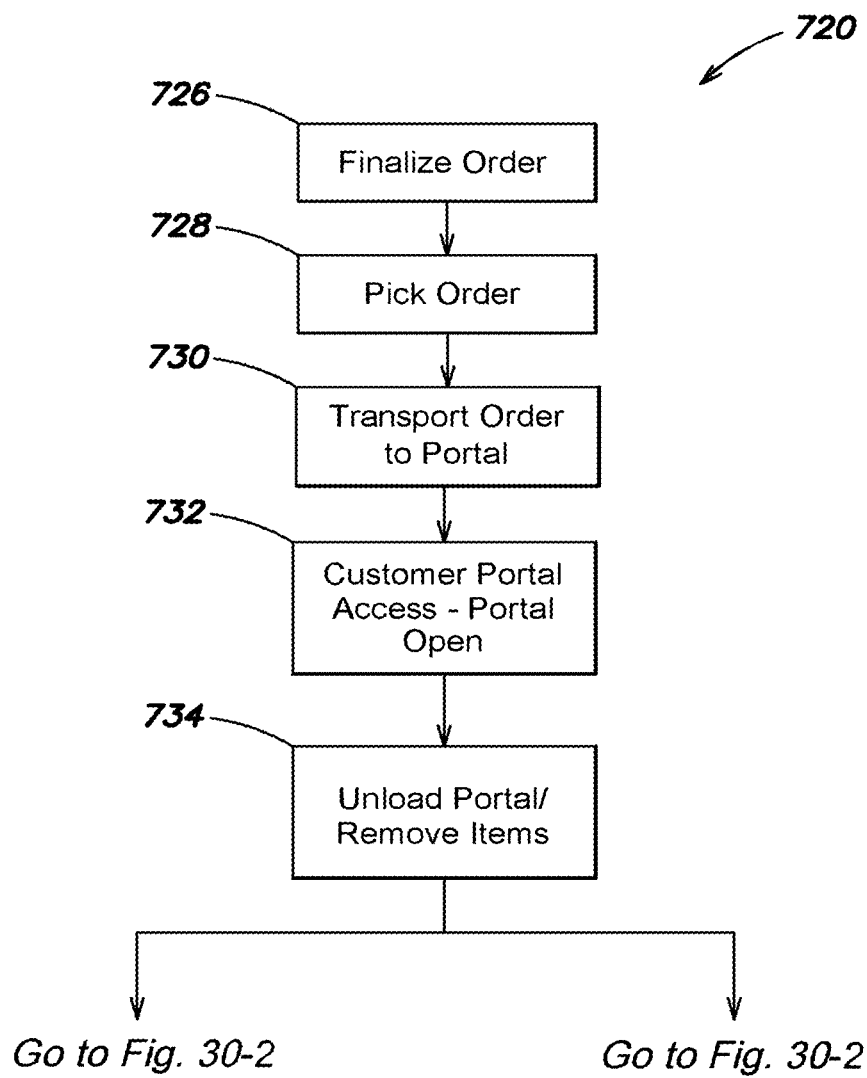
FIG. 30 shows a flow chart of an example method for dispensing an order, returning items from the order, and replacing items in the order with substitute items using a customer access portal according to various inventive implementations of the present application.
Figures 2, 30:
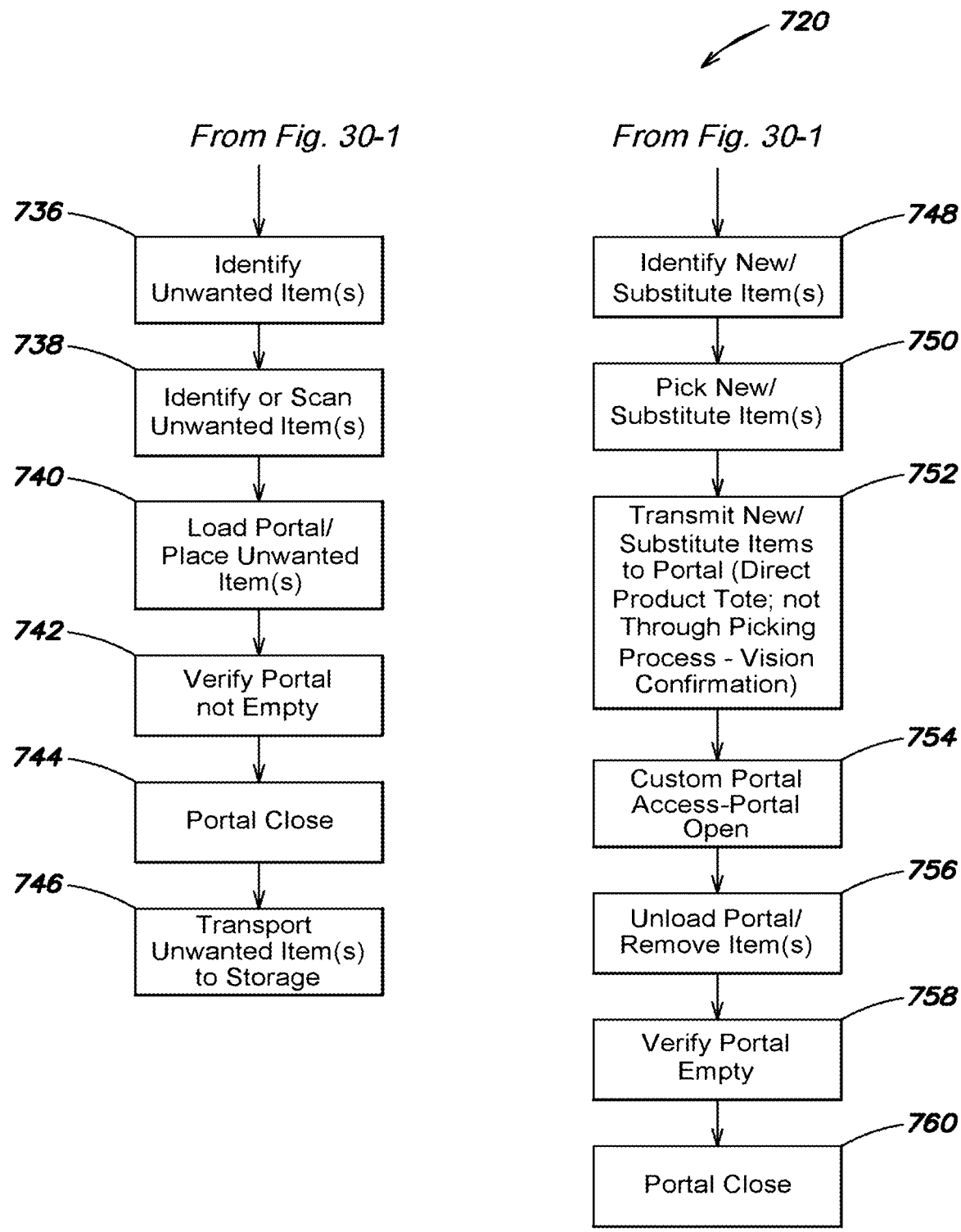

FIG. 30 shows a flow chart of another example method 720 for dispensing an order, returning items from the order, and replacing items in the order with substitute items using the customer access portal 310. The method 720 may be similar to the method 680 with the difference being the added option to replace returned items (e.g., unwanted or damaged goods) with other substitute items.

As shown, the method 720 may begin with the customer's order being finalized (step 726). At an appropriate time (e.g., when the customer is in transit to the store 110, before a scheduled pickup time), the customer's may be picked (e.g., via one or more workstations 168 system 160 or a worker) (step 728). The totes 932 containing the ordered items are transported to the customer access portal 310 (step 730). The customer then accesses the customer access portal 310 (step 732) and thereafter may unload one or more of the ordered items from the customer access portal 310 (step 734). At this stage, the customer may determine which items (if any) they do not want to keep (step 736). If the customer determines they want to return one or more items, they may then input information on the returned items via the user interfaces 316A or 316B, for example, by scanning a QR code, a bar code, or a product code or swiping a credit card to identify the customer's order and/or the returned items (step 738). The customer may then load the returned item(s) into the customer access portal 310 (step 740). Once the customer finishes placing the returned items, the customer access portal 310 verifies the totes 932 are not empty (e.g., via the camera 322) (step 742). If the customer access portal 310 determines the totes 932 are not empty (i.e., the totes 932 contain the returned item(s)), the drawer or door is closed (step 744) and the returned items are transported for dispositioning (step 746). In some implementations, the returned item(s) and/or the tote(s) 932 containing the returned item(s) may be disinfected or sterilized (e.g., via the decontamination module 220).

During or after the customer returns an item, the customer access portal 310 may identify and offer a new item or a substitute item to the customer (step 748). The customer is then presented the option to select one or more of the substitute items or none at all (step 750). If the customer selects one or more of the substitute items, the substitute items may be picked and transported to the customer access portal 310 (step 752). This may be accomplished, for example, by consolidating the substitute items into one or more order totes. In another example, one or more product totes may be transported to the customer so that the customer may manually pick the substituted item from multiples of the same item. The customer access system 310 may verify the customer did not retrieve more items than allocated for their order (e.g., via the camera 322). The customer then accesses the customer access portal 310 (step 754) and thereafter unloads the substitute items from the customer access portal 310 (step 756). Once the customer finishes retrieving the ordered items, the customer access portal 310 verifies the totes 932 are empty (e.g., via the camera 322) (step 758). If the customer access portal 310 determines the totes 932 are empty, the drawer or door is closed (step 760) and the customer then leaves.

In some implementations, the method 680 may also provide the option for the customer to select one or more substitute items at the time of making and finalizing the order (see method 450). It should be appreciated the substitute items accepted (or rejected) at the time the customer places the order and when the customer picks up the order (step 736) may differ. For example, the customer may change their mind and decide they no longer want the substitute items originally accepted when placing the order. In another example, the store 110 may offer alternative substitute items between order and pick up (step 748) due, for example, to new stock supplied to the store 110 after the customer made their order. Thus, the process of choosing substitute items when the customer picks up their order (step 750) may provide the customer a second opportunity to change their order.

Figure 31:
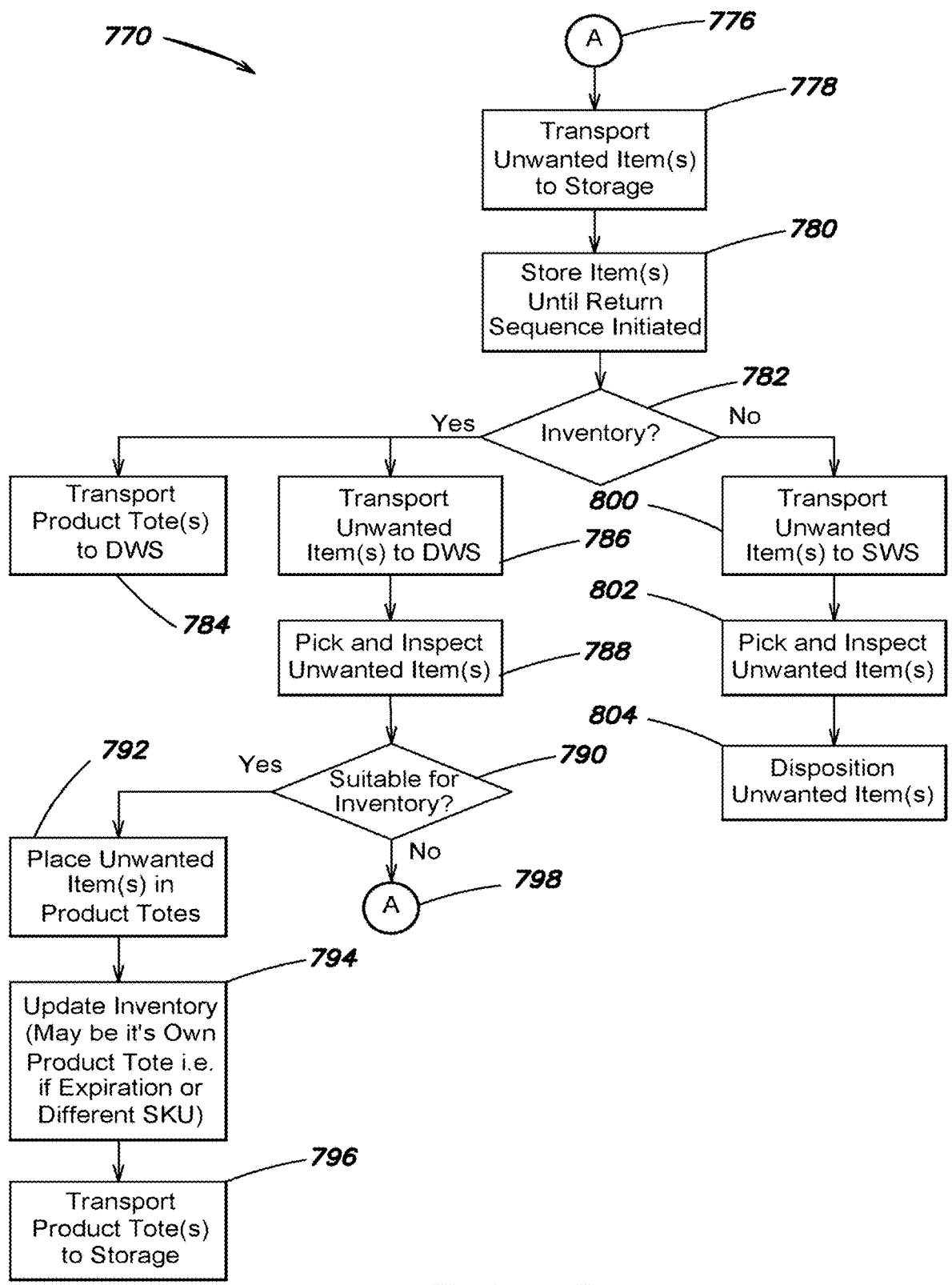
FIG. 31 shows a flow chart of an example method for processing returned items received at a customer access portal according to various inventive implementations of the present application.

FIG. 31 shows a flow chart of another example method 770 for processing returned items received at the customer access portal 310 for dispositioning. In general, the returned items may include items returned by the customer from a previous order picked up at the store 110 or another store and substitute items the customer did not want to keep when picking up an order. The returned items may initially be kept separate from the inventory in the store 110 until being processed for dispositioning via one or more workstations 168. During dispositioning, the returned item may be restocked in the inventory of the store 110 (e.g., in the container storage 164 or the sales floor area 130), disposed or scrapped, or returned to the manufacturer. When disposed or returned to the manufacturer, additional logistics may be processed, such as a possible return to a distribution center first or consolidation and/or sorting of the returned items before removal from the store 110.

As shown, the method 770 may start at step 776 and proceed to the returned item(s) being transported from the customer access portal 310 for temporary storage (e.g., the return staging area 900 of the storage structure 896, the container storage 164, sales floor area 130) (step 778). The returned items may remain stored until being dispositioned (e.g., a return sequence is initiated for a particular returned item) (step 780). During dispositioning (step 782), if the returned item(s) are determined to be removed from the store 110 (i.e., the returned items are not designated for inventory due to damage, or being spoiled), the returned items are then transported to a workstation 168 for removal (step 800). Once the returned items arrive at the workstation 168, the returned items are picked and inspected (step 802), and thereafter trashed or returned to another location (e.g., the manufacturer, a distribution center) (step 804). If the returned item(s) are designated to be added back into the inventory of the store 110, then one or more product totes 932 are transported to a workstation 168 (step 784). At the same time, the returned item(s) are also transported to the workstation 168 (step 786). Once the returned item(s) and the product tote(s) arrive at the workstation 168, the returned item(s) are then picked and inspected, e.g., via a human or a robot (step 788). During inspection (step 890), if the returned items are deemed to be unsuitable for inventory, they are returned to temporary storage (step 798), in effect going back to step 776. If the returned items are deemed to be suitable for inventory, the returned item(s) are placed into appropriate product tote(s) (step 792). In some implementations, the returned item(s) may be placed into a separate product tote with no other items if, for example, the returned items have a different expiration date or a different SKU number. The inventory may then be updated (e.g., via the inventory management computing device 120) (step 794) and the product totes may be transported back to inventory (e.g., the container storage 164, the sales floor area 130) (step 796).

In the above examples of methods to facilitate a return of one or more items, it should be appreciated the customer access system 1000 may preposition an appropriate number of return toes to each customer access portal 310, for example, via geofencing.

CONCLUSION

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein.

In addition, any combination of two or more such features, systems, articles, materials, kits, and/or methods, if such features, systems, articles, materials, kits, and/or methods are not mutually inconsistent, is included within the inventive scope of the present disclosure. Other substitutions, modifications, changes, and omissions may be made in the design, operating conditions and arrangement of respective elements of the exemplary implementations without departing from the scope of the present disclosure. The use of a numerical range does not preclude equivalents that fall outside the range that fulfill the same function, in the same way, to produce the same result.

The terms "top" and "bottom," "upper" and "lower" and "vertical" and "horizontal" as may be used herein are by way of example and illustrative purposes only and are not meant to limit the description of the embodiments inasmuch as the referenced item can be exchanged in position and orientation.

Certain dimensions and features of the customer access system are described herein using the terms "approximately," "about," "substantially," and/or "similar." As used herein, the terms "approximately," "about," "substantially," and/or "similar" indicates that each of the described dimensions or features is not a strict boundary or parameter and does not exclude functionally similar variations therefrom. Unless context or the description indicates otherwise, the use of the terms "approximately," "about," "substantially," and/or "similar" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

The above-described embodiments can be implemented in multiple ways. For example, embodiments may be implemented using hardware, software or a combination thereof. When implemented in software, the software code can be executed on a suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in a suitable form, including a local area network or a wide area network, such as an enterprise network, an intelligent network (IN) or the Internet. Such networks may be based on a suitable technology, may operate according to a suitable protocol, and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Some implementations may specifically employ one or more of a particular operating system or platform and a particular programming language and/or scripting tool to facilitate execution.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method for transporting a first grocery item (102) between a customer (104) and a store (110) via a customer access portal (310) coupled to the store, wherein:

the store comprises at least one inventory management computing device (120) including memory (124) storing an inventory management application (128) executed by the inventory management computing device and a database storing product information for the plurality of products, the product information including a product code for each product of the plurality of products;

the customer access portal (310) comprises:
 a user interface (316 A);
 a user interaction area (320);
 a portal door (314) to control access by the customer to the user interaction area; and
 an interior safety door (318) to control access to an aisle space (312) that facilitates transport of the first grocery item between the user interaction area and the store;

the first grocery item is identified by a first product code (106); and the customer places an order with the store and receives an order number (108) corresponding to the order, via a user software application operating on a computer, cellular device, or other device (316B) communicatively coupled to the inventory management computing device or via the user interface (316 A) of the customer access portal (310), wherein the order includes the first product code for the first grocery item, the method comprising:
 A) receiving, via the user interface (316 A) of the customer access portal (310) or the computer, cellular device or other device used by the customer (316B), the order number (108) corresponding to the order; and
   B) automatically opening the portal door (314) of the customer access portal to allow access by the customer to the user interaction area (320) while maintaining the interior safety door (318) closed to prevent access by the customer to the aisle space between the user interaction area and the store.

2. The method of claim 1, wherein the store (110) further comprises:
   container storage (164) including at least one multi-level rack structure to hold inventory comprising a plurality of products constituting picking stock, the plurality of products including frozen products and chilled products; and
   container transport (166) including a plurality of mobile robots (212) to transport at least some of the inventory to and from the multi-level rack structure.

3. The method of claim 1, wherein A) comprises:
   A1) scanning, via the user interface of the customer access portal, a code for the order number.

4. The method of claim 3, wherein the code for the order number comprises one of a barcode or a QR code.

5. The method of claim 3, wherein A) further comprises at least one of:
   A2) displaying on the user interface the order corresponding to the order number;
   A3) displaying on the user interface that the order is being retrieved from the store; or
   A4) displaying on the user interface that the order has arrived at the customer access portal.

6. The method of claim 3, wherein B) comprises:
   B1) transporting a first tote (932) containing the first grocery item to the interior safety door via the aisle space;
   B2) opening the interior safety door and placing the first tote into the user interaction area; and
   B3) closing the interior safety door and opening the portal door to expose the first tote containing the first grocery item to the customer.

7. The method of claim 6, wherein B1) comprises: transporting the first tote from the store to the interior safety door using a first mobile robot of the plurality of mobile robots (212).

8. The method of claim 7, wherein: the store (110) is coupled to the customer access portal (310) via a plurality of transit rails (214); and
   B1) comprises transporting the first tote from the store to the interior safety door along the plurality of transit rails using the first mobile robot.

9. The method of claim 6, wherein B1) comprises: transporting the first tote from the store to the interior safety door using at least one of a conveyor (1070) or a gantry (1176).

10. The method of claim 6, wherein B1) comprises: transporting the first tote from the store to the interior safety door using a vertical rack.

11. The method of claim 6, further comprising:
    C) receiving, via the user interface of the customer access portal, an indication that the customer is done retrieving the first grocery item from the first tote; and
    D) closing the portal door.

12. The method of claim 1, wherein A) comprises:
    A1) receiving a notification of a return of the first grocery item.

13. The method of claim 12, wherein A) comprises:
    A2) scanning, via the user interface of the customer access portal, at least one code for at least one of the order number or the first product code for the first grocery item.

14. The method of claim 13, wherein the at least one code comprises one of a barcode or a QR code.

15. The method of claim 13, further comprising:
    C) after automatically opening the portal door in B), automatically verifying that the first grocery item is in the user interaction area of the customer access portal.

16. The method of claim 15, wherein:
    the customer access portal further comprises at least one camera (322) having a view of the user interaction area; and
    C) comprises verifying that the first grocery item is in the user interaction area using the at least one camera.

17. The method of claim 15, further comprising:
    D) after C), closing the portal door; and
    E) returning the first grocery item to the store.

18. An automated dispense portal configuration to facilitate transport of a first item to or from a user, the automated dispense portal configuration comprising:
    a storage structure;
    a plurality of totes configured for storage in the storage structure;
    a tote transfer system, coupled to the storage structure, to transport the plurality of totes to and from the storage structure;
    a portal, coupled to the tote transfer system, to transport the first item between a first tote of the plurality of totes and the customer, the portal comprising: a tote location, coupled to the tote transfer system, in which the first tote is configured to be temporarily positioned, the tote transfer system moving the first tote into and out of the tote location, a safety door configured to prevent a user from accessing other portions of the tote transfer system; and
    wherein the tote location is disposed enabling a first robot to move the first tote into and out of the tote location, and a second robot to separately move a second tote into and out of the tote location.

19. The automated dispense portal configuration of claim 18, wherein the tote transfer system comprises a queuing area proximate the tote location where the first robot and the second robot queue up and stage before moving the respective first tote and second tote into the tote location.

* * * * *